(12) United States Patent
Hung

(10) Patent No.: US 10,627,629 B2
(45) Date of Patent: Apr. 21, 2020

(54) FIELD CURVATURE VIRTUAL IMAGE DISPLAY SYSTEM

(71) Applicant: Wei-Yi Hung, Zhubei (TW)

(72) Inventor: Wei-Yi Hung, Zhubei (TW)

( * ) Notice: Subject to any disclaimer, the term of this patent is extended or adjusted under 35 U.S.C. 154(b) by 0 days.

(21) Appl. No.: 15/796,182

(22) Filed: Oct. 27, 2017

(65) Prior Publication Data

US 2018/0129051 A1    May 10, 2018

(30) Foreign Application Priority Data

Oct. 28, 2016 (TW) .............................. 105134924 A

(51) Int. Cl.
| | |
|---|---|
| *G02B 27/01* | (2006.01) |
| *G02B 13/06* | (2006.01) |
| *G09G 3/00* | (2006.01) |
| *G02B 27/00* | (2006.01) |
| *G06T 5/00* | (2006.01) |
| *G02B 1/11* | (2015.01) |

(52) U.S. Cl.
CPC ......... *G02B 27/0172* (2013.01); *G02B 13/06* (2013.01); *G02B 27/0025* (2013.01); *G02B 27/0176* (2013.01); *G06T 5/006* (2013.01); *G09G 3/003* (2013.01); *G02B 1/11* (2013.01); *G02B 2027/011* (2013.01); *G02B 2027/013* (2013.01); *G02B 2027/0154* (2013.01); *G02B 2027/0178* (2013.01); *G09G 3/001* (2013.01)

(58) Field of Classification Search
CPC ........ G02B 27/00; G02B 27/01; G02B 27/18; G02B 1/11; G02B 2027/01; G06T 5/00; G09G 3/00
See application file for complete search history.

(56) References Cited

U.S. PATENT DOCUMENTS

| | | |
|---|---|---|
| 3,940,204 A | 2/1976 | Withrington |
| 4,026,641 A | 5/1977 | Bosserman et al. |
| 4,763,990 A | 8/1988 | Wood |
| 5,305,124 A | 4/1994 | Chern et al. |
| 5,576,887 A * | 11/1996 | Ferrin ................ G02B 27/0172 345/7 |
| 5,822,127 A | 10/1998 | Chen et al. |

(Continued)

OTHER PUBLICATIONS

Jannick P. Rolland, "Wide-angle, off-axis, see-through head-mounted display", Opt. Eng. 39(7) (Jul. 2000), p. 1760-1767.

*Primary Examiner* — Isiaka O Akanbi
*Assistant Examiner* — Danell L Owens
(74) *Attorney, Agent, or Firm* — Muncy, Geissler, Olds & Lowe, P.C.

(57) ABSTRACT

A field curvature virtual image display system applicable to a projection lens set comprises: an image source disposed in a partial region of an objective plane of the projection lens set; a first imaging group having a front lens group and a back lens group; and a second imaging group having a partial reflection and partial transmission surface and an antireflection surface and functioning as an image combiner. In a field curvature virtual image display system system, the objective plane is imaged as a virtual image surface with a specific field curvature type to generate an including angle between the optical axis of the first imaging group and the optical axis of active virtual image.

7 Claims, 47 Drawing Sheets

(56) References Cited

U.S. PATENT DOCUMENTS

| | | | |
|---|---|---|---|
| 5,886,822 A * | 3/1999 | Spitzer | G02B 27/0172 |
| | | | 359/630 |
| 7,369,317 B2 | 5/2008 | Li et al. | |
| 7,542,209 B2 | 6/2009 | McGuire, Jr. | |
| 2006/0098293 A1 | 5/2006 | Garoutte et al. | |
| 2007/0091445 A1 | 4/2007 | Amitai | |
| 2007/0177275 A1 * | 8/2007 | McGuire, Jr. | G02B 17/08 |
| | | | 359/630 |
| 2010/0214635 A1 * | 8/2010 | Sasaki | G02B 27/0101 |
| | | | 359/15 |

* cited by examiner

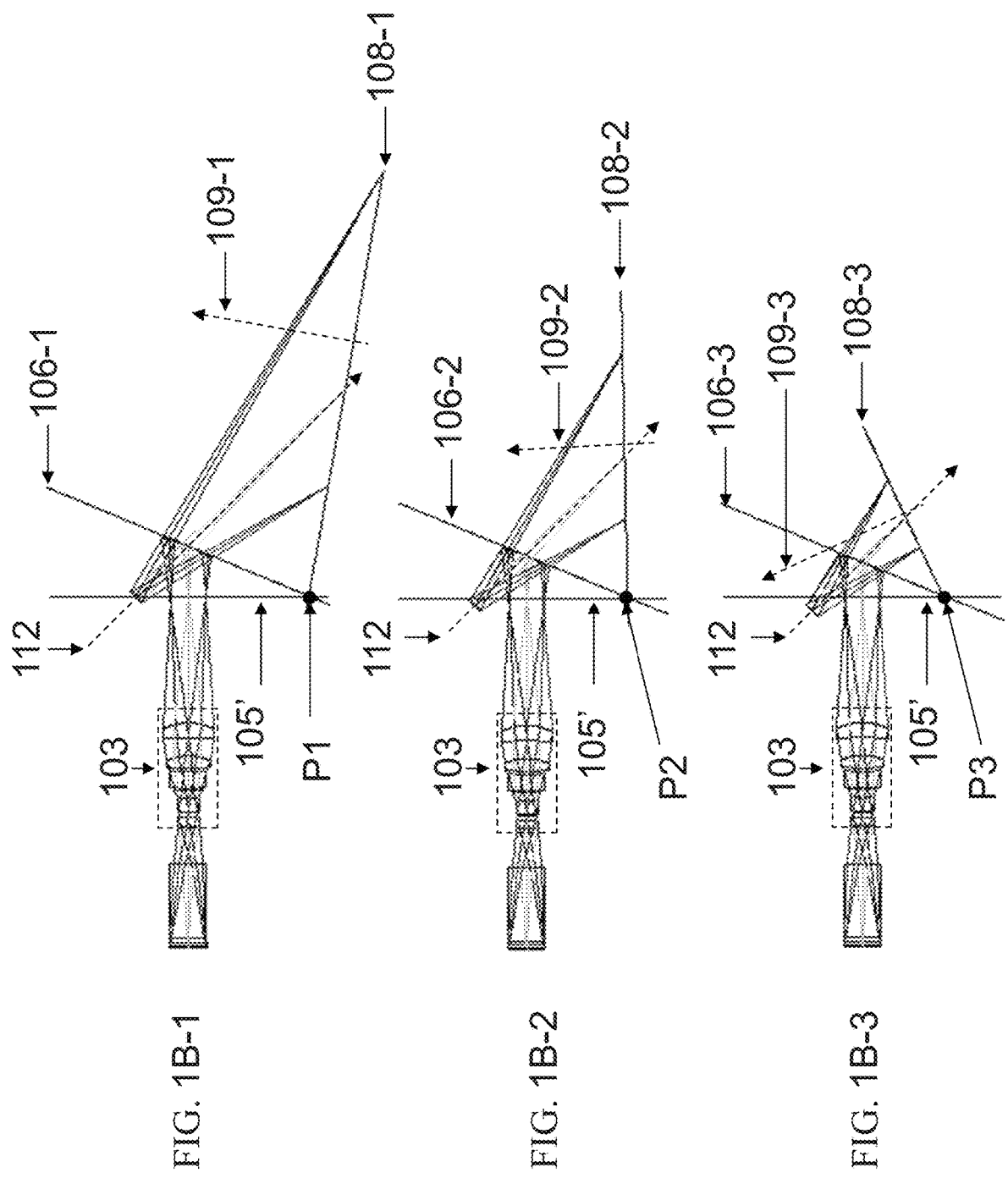

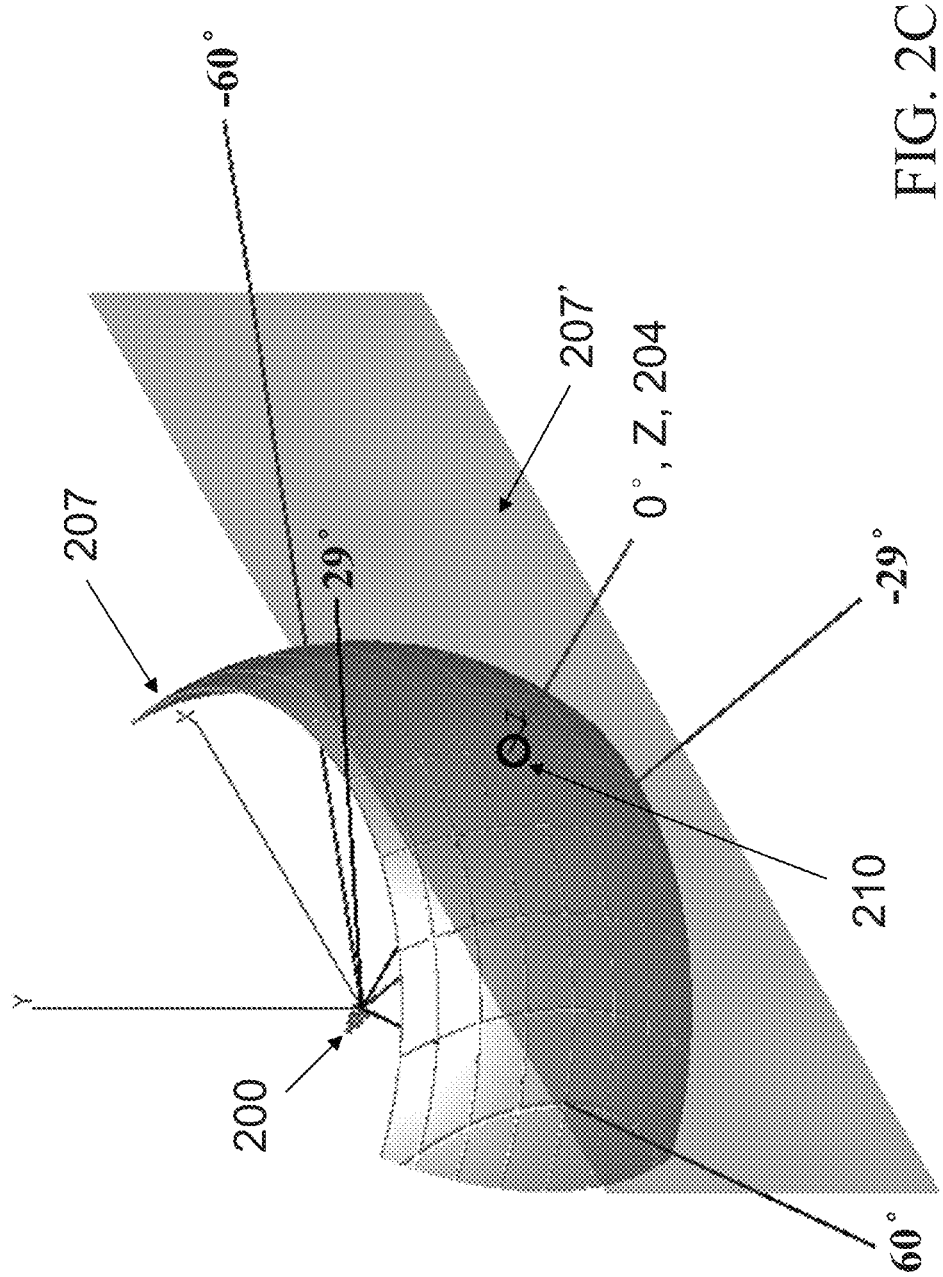

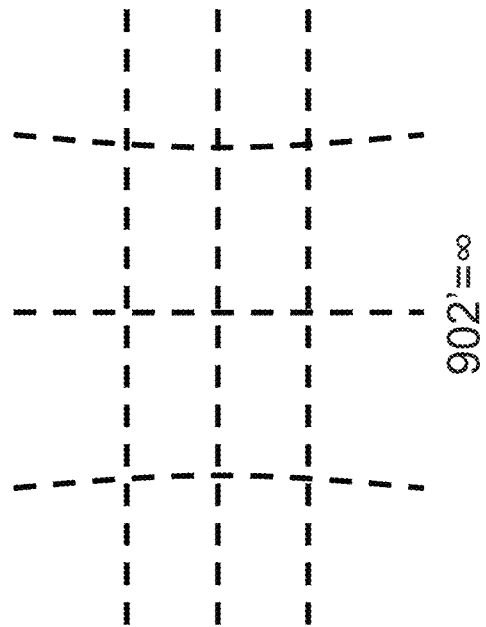
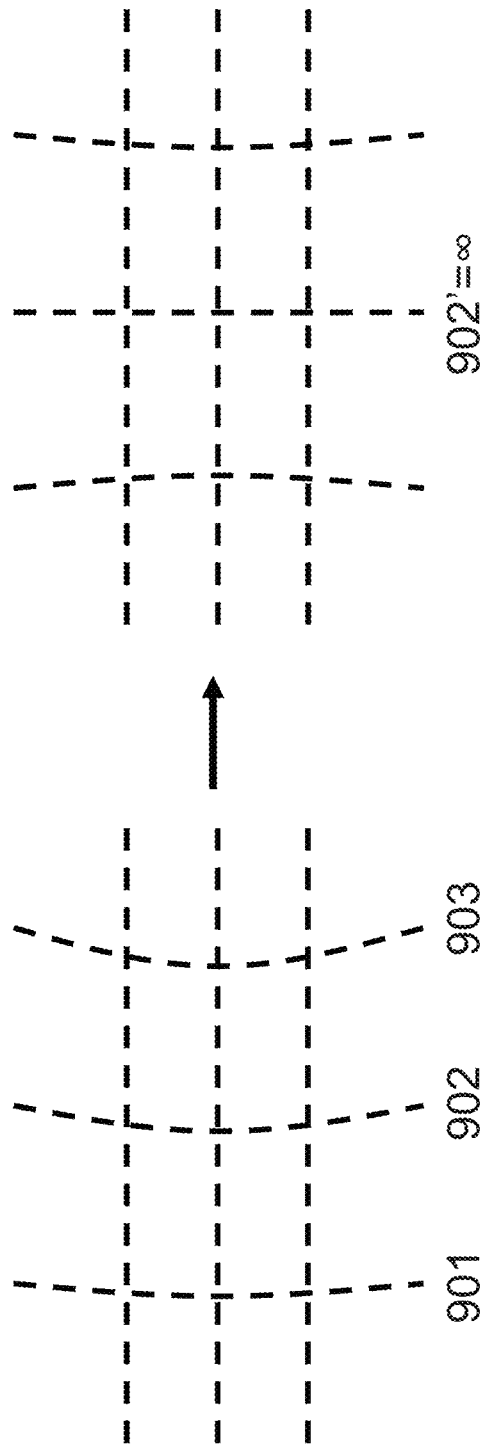

FIELD CURVATURE VIRTUAL IMAGE DISPLAY SYSTEM

BACKGROUND OF THE INVENTION

This application claims priority of No. 105134924 filed in Taiwan R.O.C. on Oct. 28, 2016 under 35 USC 119, the entire content of which is hereby incorporated by reference.

Field of the Invention

The invention relates to a virtual image display device, and more particularly to an augmented reality type wearable field curvature virtual image display system.

Description of the Related Art

The virtual image projection is to image an image source into a virtual image with a projection distance and a magnification power through an optical system. When the light of the image source is incident to a refractive type or reflective type optical system to cause the light divergence, a virtual image is produced at a position where no actual convergence of light beams occurs. So, a screen cannot receive a real image. An observer can see the complete virtual image when an exit pupil surface of the virtual image system coincides with the observer's pupil. In this case, a distance between the ocular lens and the pupil is an eye relief.

The refractive type virtual image optical system is mostly adopted in the device, such as a magnifier, a microscope or a telescope. Because its use relates to the observation of the specific target, it is unnecessary to observe the external environment in front of the eye at the same time. Also, the wear demand of the human body needs not to be considered. So, the number, volumes and weights of the optical assemblies in front of the eye are not the main factors to be considered upon design.

In the reflective type virtual image optical system, a reflective device may be utilized to generate the turning between the position of the virtual image and the optical axis of the optical system. So, most of the elements of the optical system can be transferred from the positions right ahead the eye to other positions. For the wearable application, the center of gravity of the optical system may be nearer to the head to decrease the torque and achieve the objective of beauty at the same time. The reflective device itself may be manufactured to have partial reflection and partial transmission properties, so that the wearer can observe a virtual image from the image source through the reflected light, and observe the external environment from the transmitting light at the same time. Such the element is referred to as an image combiner when being applied to the reflective type virtual image optical system.

The reflective type virtual image optical systems may be classified into an on-axis type and an off-axis type. The frequently seen types of the on-axis optical systems are classified according to the type of the image combiner, wherein the waveguide (see U.S. Pat. Pub. No. 2007/0091445), the polarizing beam splitter (see U.S. Pat. No. 7,369,317) and the half mirror (see U.S. Pat. No. 5,822,127) are frequently seen. The design of the on-axis reflective type virtual image optical system is adopted such that the virtual image looks like being located right ahead the user. In the architecture of the polarizing beam splitter and the half mirror, a reflective flat surface tilted by 45° needs to be equipped in front of the human eye to function as one portion of the image combiner. Thus, the image combiner becomes somewhat thick, and the thickness is increased with the increase of the design value of the system field angle.

The off-axis type optical systems may be classified into a holographic optical element (see U.S. Pat. No. 5,305,124) and an ordinary optical element according to the type of the image combiner. The invention relates to a reflective type off-axis type virtual image display system adopting the ordinary optical element functioning as the image combiner.

FIG. 1A shows a reflective type off-axis type virtual image projection system 1000. The system is applicable to a projection lens set 100, and the optical lens set in front of an image source 101 functions as a first imaging group 103. A partial reflection and partial transmission lens having the concave surface curvature functions as a second imaging group 106 while functioning as the image combiner. Upon operation, the image source 101 images a real image 105 within a focal length of the second imaging group 106 through the first imaging group 103 so that the system 1000 generates a virtual image plane 108 and an exit pupil 110. The two groups are not coaxial, so that a sufficient large included angle is formed between the main light 113 incident to the center of the second imaging group 106 and the reflected main light 113' reflected from the second imaging group 106, that the virtual image is disposed right ahead the observer, and that no interference is formed between the head tissue and the projection lens set when the virtual image is being observed.

It is assumed that the head mounted display device has the following specifications: (a) the virtual image frame having the aspect ratio of 16:9 and the diagonal length of 60 inches must be provided when the virtual image is distant from the observer by 2.5 meters, that is, the sagittal effective field angle needs to be equal to about 30°; (2) the virtual image needs to be located right ahead of the observer and rightly faces the observer; and (3) the optical system cannot shield the field of vision of the human eye 111 and also cannot interface with any tissue of the head. The above-mentioned three conditions are concurrently satisfied, the following conditions must be achieved: (1) an included angle of 15° must be formed between the reflected main light 113' and each of the reflected main lights 114' and 115', generated when the second imaging group 106 reflects the main lights 114 and 115 coming from two sides of the real image 105, so that the observer can see the virtual image frame with the equal width on the left and right sides, and the sagittal effective viewing angle of 30° may be provided; (2) an optical axis 109 of the virtual image must be coaxial with an eye's optical axis 112 so that the virtual image frame rightly faces the observer, wherein the optical axis 109 of the virtual image is defined as a normal passing through the geometric center of the virtual image frame; (3) the included angle of at least 45° must be present between an optical axis 104 of the first imaging group of the projection lens set 100 and the eye's optical axis 112 at the eye relief of 25 mm, that is, the system 1000 must have the lateral projection of more than 45° so as to avoid the interference between the human body and the optical system; and (4) the eye's optical axis 112 must overlap with the reflected main light 113' so that the center of the virtual image frame is disposed right ahead the human eye. In other words, the eye's optical axis 112 must be determined according to the reflected main light 113'.

The first condition may be achieved by controlling the ratio of the height of the real image 105 to the focal length of the second imaging group 106 as 2 tan(15°). In order to satisfy the third condition, rotation is made about the apex of the second imaging group 106 serving as a center until the optical axis 104 of the first imaging group and an optical axis 107 of the second imaging group form an included angle of 22.5° so that the main light 113 and the reflected main light 113' form the included angle of 45°. The off-axis design causes different light paths on two sides of the virtual image to generate the keystone distortion of FIG. 1C. In addition, the optical axis 109 of the virtual image plane 108 formed in the system cannot be coaxial with the eye's optical axis 112 and does not satisfy the second condition. The frame keystone distortions caused by the second condition, which is not held, and the third condition, which is held, result from that the optical axis 109 of the virtual image and the reflected main light 113' are not coaxial. In this case, it is possible to select an observation surface 116 functioning as the virtual image frame to improve the keystone distortion and solve the problem that the optical axis 109 of the virtual image and the eye's optical axis 112 are not coaxial. However, because the real imaging surface is the virtual image plane 108, the clarity of the observation surface 116 is deteriorated due to the factor of the requirement on the depth of field.

The keystone distortion of the virtual image is calculated as follows:

the sagittal field angle of the virtual image:

$$\theta_{FOV} = 2\tan^{-1}\left(\frac{H_{horizontal} \cdot M_{image\_real}}{2 f_{combiner}}\right) \quad \text{(Equation 1)}$$

where $H_{horizontal}$=the height of the image source in the sagittal direction;
$M_{image\_real}$=the magnification power of the first group of the imaging system;
$-f_{combiner}$=the equivalent focal length of the second imaging group;
the center magnification power of the virtual image:

$$M_{VC} + \frac{q_C}{f_{combiner}} + 1; \quad \text{(Equation 2)}$$

where $q_c$=the center image distance of the virtual image; and the real image serving as the center object distance of the object:

$$p_C = \frac{q_C}{M_{VC}}. \quad \text{(Equation 3)}$$

In order to make the optical axis 109 of the virtual image and the main light 113 form the sagittal included angle, the optical axis 107 of the second imaging group needs to tilt on the sagittal plane to make the optical axis 107 of the second imaging group and the optical axis 104 of the first imaging group form an included angle $\theta_t$ therebetween. According to the light beam travelling direction:
the left-side object distance of the sagittal direction of the real image:

$$p_L = p_C + \frac{H_{horizontal} \cdot M_{image\_real}}{2} \cdot \sin\theta_t \quad \text{(Equation 4)}$$

the right-side object distance of the real image of the sagittal direction:

$$p_R = p_C - \frac{H_{horizontal} \cdot M_{image\_real}}{2} \cdot \sin\theta_t \quad \text{(Equation 5)}$$

According to the virtual image observing direction of the human eye:
the left-side magnification power of the sagittal direction of the virtual image:

$$M_{VL} = \frac{f_{combiner}}{f_{combiner} - p_L} = \frac{q_L}{f_{combiner}} + 1 \quad \text{(Equation 6)}$$

where $q_L$=the left-side image distance of the virtual image,
the right-side magnification power of the sagittal direction of the virtual image:

$$M_{VR} = \frac{f_{combiner}}{f_{combiner} - p_R} = \frac{q_R}{f_{combiner}} + 1 \quad \text{(Equation 7)}$$

where $q_R$=the right-side image distance of the virtual image.
According to (6)/(7) is obtained that the ratio of the left-side magnification power to the right-side magnification power of the virtual image is:

$$\text{Ratio}_{MLR} = \frac{f_{combiner} - p_R}{f_{combiner} - p_L} \quad \text{(Equation 8)}$$

It is assumed that:
the height of the image source 101 in the sagittal direction is 8 mm,
the first imaging group 103 has the magnification power of 1.1,
the effective field angle of the virtual image is 30°,
in order to turn the light path by 45°, the inclination angle $\theta_t$ of the second imaging group must be 22.5°, and
the center image distance of the virtual image is 45 mm.
It is obtained from (Equation 1) that $$\theta_{FOV} = 30° = 2\tan^{-1}\left(\frac{8 \text{ mm} \times 1.1}{2 f_{combiner}}\right) \rightarrow f_{combiner} = 16.42 \text{ mm}.$$

It is obtained from (Equation 2) that $$M_{VC} = \frac{45 \text{ mm}}{16.42 \text{ mm}} + 1 = 3.74.$$

It is obtained from (Equation 3) that $$p_C = \frac{45 \text{ mm}}{3.74} = 12.03 \text{ mm}.$$

It is obtained from (Equation 4) that $$p_L = 12.03 \text{ mm} + \frac{8 \text{ mm} \times 1.1}{2} \cdot \sin 22.5° = 13.71 \text{ mm}.$$

It is obtained from (Equation 5) that $$p_R = 12.03 \text{ mm} - \frac{8 \text{ mm} \times 1.1}{2} \cdot \sin 22.5° = 10.35 \text{ mm}.$$

It is obtained from (Equation 6) that $$M_{VL} = \frac{16.42 \text{ mm}}{16.42 \text{ mm} - 13.71 \text{ mm}} = 6.07.$$

It is obtained from (Equation 7) that $$M_{VR} = \frac{16.42 \text{ mm}}{16.42 \text{ mm} - 10.35 \text{ mm}} = 2.70.$$

It is obtained from (Equation 8) that $$\text{Ratio}_{MLR} = \frac{f_{combiner} - p_R}{f_{combiner} - p_L} = \frac{16.42 \text{ mm} - 10.35 \text{ mm}}{16.42 \text{ mm} - 13.71 \text{ mm}} \cong 2.24.$$

It is obtained, from the above-mentioned Equations, that the left-side image height is about 2.24 times of the right side image height in the virtual image, as shown in FIG. 1C. According to (Equation 8), it is obtained that the virtual image has no keystone distortion in the condition of $θ_r=0$ or $f_{combiner}=∞$. Because the off-axis type head wearable display device needs to avoid the interference with the head, $θ_r≠0$. In order to satisfy the magnification power of the virtual image, $f_{combiner}≠∞$. So, the keystone distortion of the frame caused by the implemented Equations is inevitably present in the conditions that the virtual image has the magnification power and that an included angle is formed between the second imaging group and the light path of the imaging system.

It is also possible to explain the problem that the optical axis 109 of the virtual image and the eye's optical axis 112 are not coaxial from the point of view of Scheimpflug principle. Scheimpflug principle describes that extensions of the objective plane, the image plane and the imaging system plane commonly intersect at one finite point when the objective plane is not parallel to the imaging system plane. As shown in FIG. 1B-1, the real image 105 caused by the first imaging group is the objective plane 105' and the second imaging group plane is the imaging system plane 106-1, and the included angle between the optical axes thereof is 22.5°, so that the first imaging group and the main light passing through the center of the virtual image form the included angle of 45°. In this case, the extension surfaces of the objective plane 105', the virtual image plane 108-1 and the imaging system plane 106-1 commonly intersect at the point P1.

Referring to FIGS. 1B-2 and 1B-3, the first imaging group 103, the objective plane 105' are the same as those of FIG. 1B-1; the imaging system plane 106-1 is moved closer to the objective plane 105' by 1.4 mm to generate the imaging system plane 106-2, the virtual image plane 108-2 and the optical axis 109-2 of the virtual image; and the imaging system plane 106-2 is further moved closer to the objective plane 105' by 2.1 mm to generate the imaging system plane 106-3, the virtual image plane 108-3 and the optical axis 109-3 of the virtual image. Thus, FIGS. 1B-1, 1B-2 and 1B-3 show the variation condition when the center distance between the objective plane 105' and the imaging system plane 106-1 gradually reduces from 10.8 mm to 7.3 mm, wherein the included angle between the optical axes of the two planes is kept unchanged. The system magnification power, the common intersection points P1, P2 and P3, the virtual image planes 108-1, 108-2 and 108-3 and the optical axes 109-1, 109-2 and 109-3 of the virtual image change with the change of the center distance. Observing FIGS. 1B-1, 1B-2 and 1B-3 can obtain that the included angles between the optical axes 109-1, 109-2 and 109-3 of the virtual image and the eye's optical axis 112 get smaller as the system magnification power gets smaller. On the contrary, the included angle between the two optical axes gets larger (i.e., the extent to which the wearer laterally observes the virtual image gets larger) as the system magnification power gets higher.

In order to solve the problem caused in the reflective type off-axis type virtual image projection system, a holographic optical element functioning as an image combiner has been proposed. For example, U.S. Pat. No. 3,940,204 discloses a holographic optical element functioning an as an image combiner, wherein the objective plane is inclined to the first imaging group. Also, U.S. Pat. No. 4,763,990 discloses a holographic optical element functioning as an image combiner, wherein the first imaging group is divided into at least two groups which are not coaxial. In addition, the holographic optical element is more sensitive to the wavelength variation. In order to process the color image, U.S. Pat. No. 5,305,124 adopts a three-layer holographic optical element to solve the band covering problem of the holographic optical element to achieve the full-color frame.

The system adopting the ordinary optical element functioning as an image combiner may also solve the problem caused by the reflective type off-axis type virtual image projection system. For example, U.S. Pat. No. 4,026,641 discloses a reflective surface adopting a toroidal surface functioning as an image combiner, wherein an object surface being a toroidal surface is needed to coordinate therewith. Also, U.S. Pat. No. 5,576,887 discloses a reflective surface using a toroidal surface functioning as an image combiner, wherein the objective plane is significantly inclined to and shifted from the first imaging group. Furthermore, U.S. Pat. No. 7,542,209 discloses a reflective surface using an elliptic surface functioning as an image combiner, wherein the first imaging group needs to have a wedged prism, the objective plane is inclined to and shifted from the first imaging group, and the first imaging group is divided into at least two groups, which are not coaxial.

SUMMARY OF THE INVENTION

According to the above-mentioned classifications, the invention relates to a reflective type off-axis type virtual image projection system adopting the ordinary optical element functioning as an image combiner.

The invention discloses a field curvature virtual image display system applicable to a projection lens set. The field curvature virtual image display system comprises: an image source disposed in a partial region of an objective plane of the projection lens set; a first imaging group having a front lens group and a back lens group; and a second imaging group having a partial reflection and partial transmission surface and an antireflection surface and functioning as an image combiner in the system. The objective plane and the first imaging group are coaxial with a first optical axis of the system. The second imaging group is coaxial with a second optical axis of the system. The objective plane forms a virtual image surface having a specific field curvature pattern through the first imaging group and the second imaging group. The image source is disposed in a partial region of the objective plane so that a partial region of the virtual image surface can be displayed. An objective offset is present between a center of a partial region where the image source is disposed and a center of the objective plane, so that a displayable region of the virtual image surface and a center of the virtual image surface concurrently generate an image offset. An included angle is formed between an optical axis of a virtual image occurred in the system and the first optical axis according to a field curvature property of the virtual image surface and the image offset of the displayable region of the virtual image surface. The properties make the system display a correct frame, and concurrently prevent an interference between the projection lens set and a head tissue when an optical axis of one eye is coaxial with the optical axis of the virtual image.

BRIEF DESCRIPTION OF THE DRAWINGS

FIG. 1B-1 is a schematic view showing a light path of the reflective type off-axis type virtual image projection system 1000 satisfying the Scheimpflug principle and the center object distance of about 10.8 mm.

FIG. 1B-2 is a schematic view showing a light path of the reflective type off-axis type virtual image projection system 1000 satisfying the Scheimpflug principle and the center object distance of about 9.4 mm.

FIG. 1B-3 is a schematic view showing a light path of the reflective type off-axis type virtual image projection system 1000 satisfying the Scheimpflug principle and the center object distance of about 7.3 mm.

FIG. 2C is a schematic view showing a three-dimensional model of the virtual image projection system 2000 having the concave type field curvature virtual image surface 207 and ±60° sagittal field angle, and an observation surface 207'.

FIG. 9B-1 is a schematic view showing the fitting of the lines of FIG. 9A using the radius of curvature.

FIG. 9B-2 is a schematic view showing the virtual image distortion of FIG. 9B-1 after the electronic signal of the image source is adjusted to generate an early distortion.

FIG. 12B-1 is a clarity simulation chart showing that light tracing using the wavelength of 626 nm is performed on the retina-like surface 1016 after the field curvature virtual image display system 10000 of the embodiment of the invention is equipped with the eye-like optical system.

FIG. 12B-2 is a clarity simulation chart showing that light tracing using the wavelength of 520 nm is performed on the retina-like surface 1016 after the field curvature virtual image display system 10000 of the embodiment of the invention is equipped with the eye-like optical system.

FIG. 12B-3 is a clarity simulation chart showing that light tracing using the wavelength of 454 nm is performed on the retina-like surface 1016 after the field curvature virtual image display system 10000 of the embodiment of the invention is equipped with the eye-like optical system.

DETAILED DESCRIPTION OF THE INVENTION

It is observed, from FIGS. 1A, 1B-1, 1B-2 and 1B-3, that the optical axis 109 of the virtual image having the high magnification power cannot be coaxial with the eye's optical axis 112. If the virtual image formed in the system can be configured to locate on the observation surface 116 of FIG. 1A, then the frame clarity can be enhanced, and the distortion caused by the difference between the light paths on two sides of the virtual image can be improved. The invention proposes a first view point to form a virtual image surface having a suitable concave type field curvature, so that the position of a partial region of the virtual image surface can be adapted to the observation surface 116 of FIG. 1A, wherein the properties function as the basic principle of the system optimization.

It is common for the optical camera system to have the barrel distortion on the image surface, especially in the ultra wide angle lens or fisheye lens. This condition represents that the imaging surface of the photographing lens has the convex surface type field curvature. When the camera system having this property is introduced into the application of the real image projection lens, the effect thereof is exactly opposite thereto. When the plane image source is projected onto the screen at finity, the pincushion distortion occurs. That is, the projected image forms the concave type field curvature; and the virtual image projection system can form the virtual image surface with the concave type field curvature according to the properties.

Figure 2A:
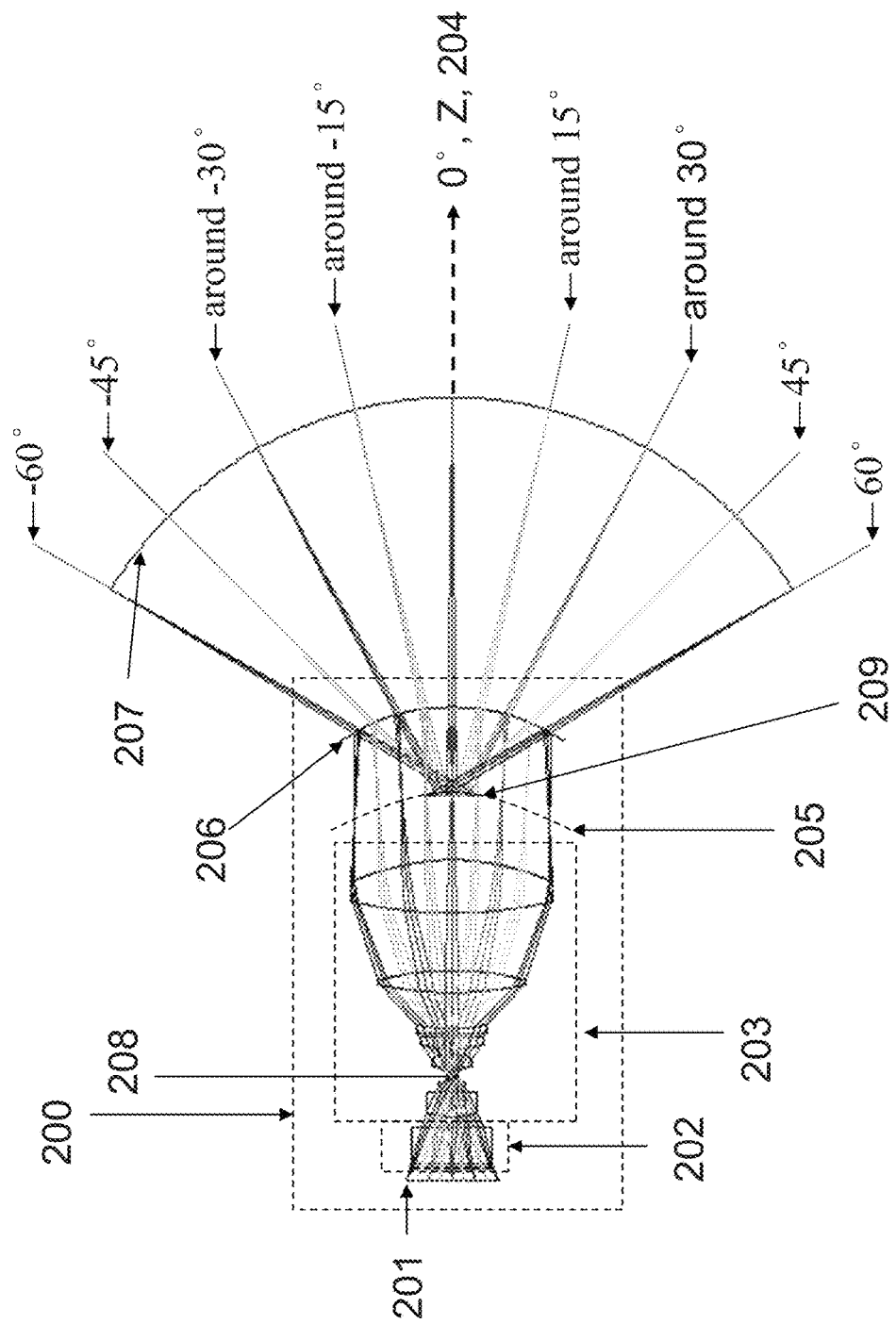
FIG. 2A is a schematic view showing a light path of a virtual image projection system 2000 having a concave type field curvature virtual image surface 207 and ±60° sagittal field angle.
Figure 2B:
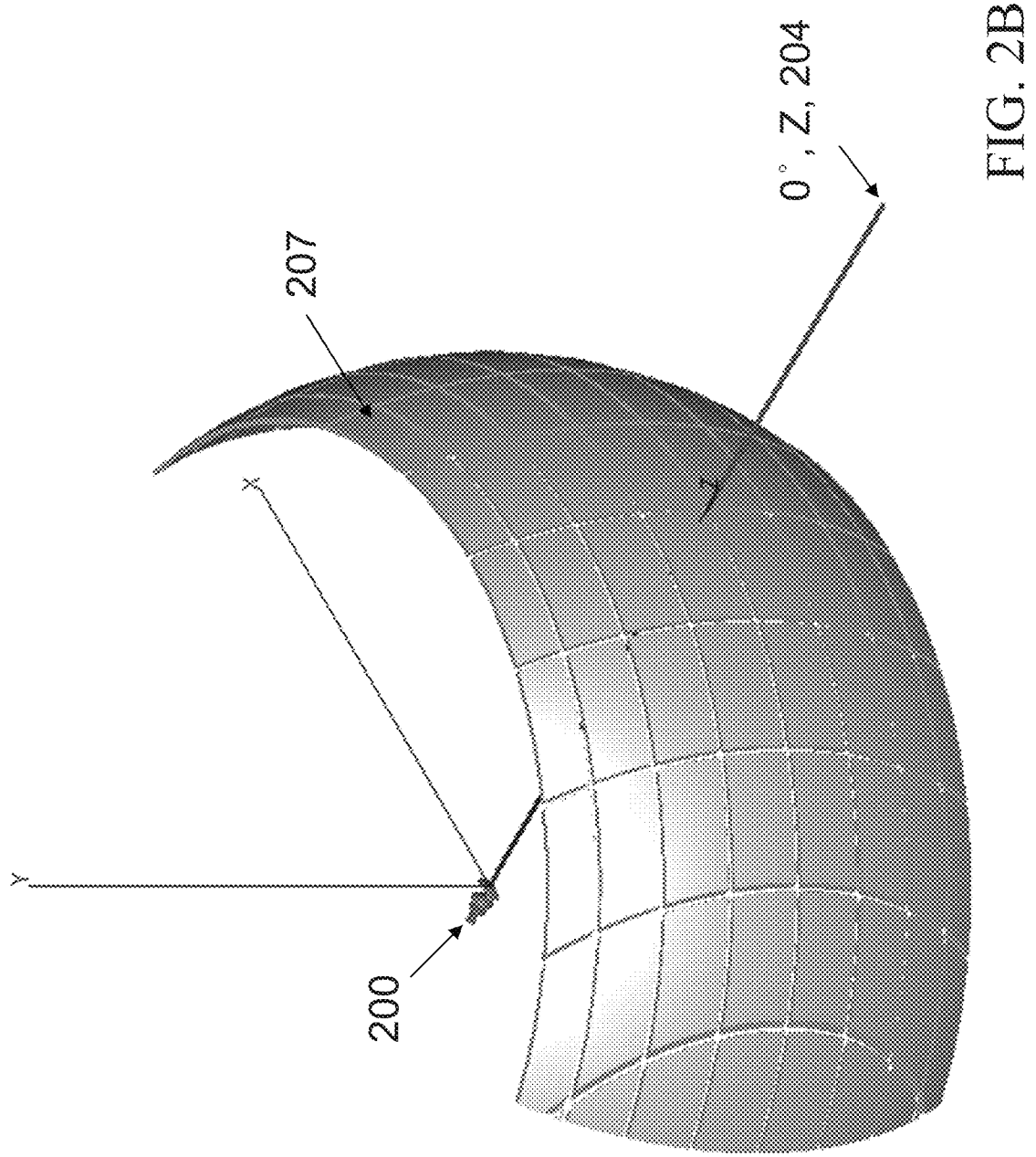
FIG. 2B is a schematic view showing a three-dimensional model of the virtual image projection system 2000 having the concave type field curvature virtual image surface 207 and ±60° sagittal field angle.
Figure 2D:
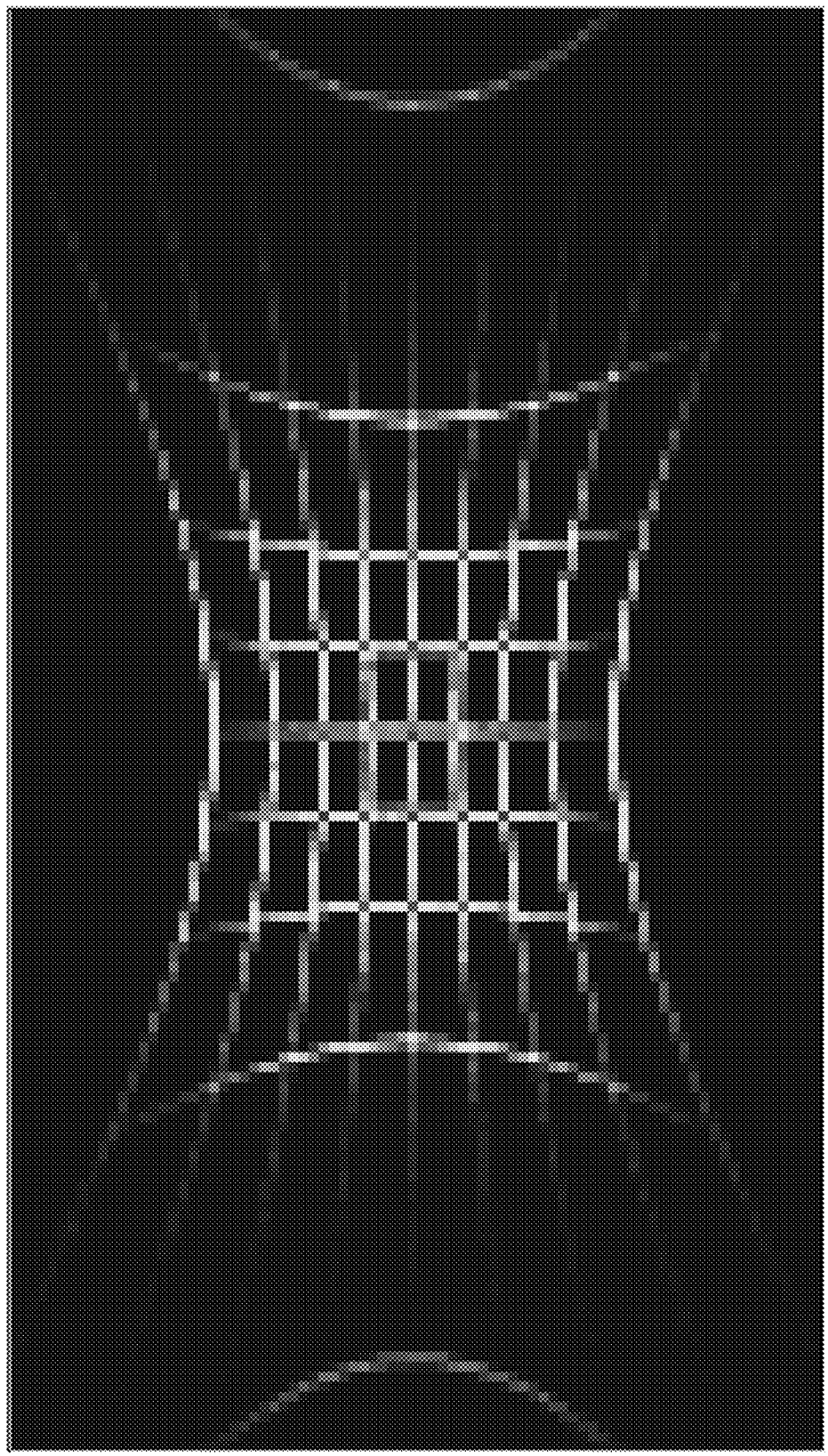
FIG. 2D is a schematic view showing an image distortion of the observation surface 207' in FIG. 2C.

FIG. 2A shows a field curvature virtual image projection system 2000 applicable to a projection lens set 200. The projection lens set 200 comprises: an objective plane 201, a back focus prism (set) 202, a first imaging group 203 and a second imaging group 206. The second imaging group 206 is a concave lens having the partial reflection and partial transmission function and functioning as an image combiner in the system 2000. The system 2000 utilizes the first imaging group 203 to image the objective plane 201 into a real image 205 with the concave type field curvature, wherein the real image 205 is disposed within the focal length of the second imaging group 206. The real image 205 is imaged into a magnified and non-inverted virtual image surface 207 at a distance through the second imaging group 206. The field curvature properties of the virtual image surface 207 and the real image 205 may similarly have the concave type field curvature. FIG. 2A is modeled into FIG. 2B to show the stereoscopic effect. For the sake of illustration, the field curvature pattern of the virtual image surface 207 of this embodiment is designed to have the spherical property, but the application of the invention is not restricted to the field curvature pattern with the spherical property. The center of curvature of the spherical type field curvature is located at the position of the exit pupil 209 of the projection lens set 200. The exit pupil 209 is defined as the entrance pupil of the human eye, wherein for the tangential plane formed on the arbitrary apex of the spherical surface, a normal passing through the apex passes through the center of the exit pupil 209. The Z-axis is coaxial with an optical axis 204 of the projection lens set 200. The X-axis represents the sagittal direction of the frame, and the Y-axis represents the meridional direction of the frame. The effective field angle in the sagittal direction is ±60°, and the effective field angle in the meridional direction is ±29°. As shown in this example of FIG. 2C, the intersection between the virtual image surface 207 and the optical axis 204 is a field curvature surface apex 210, and a tangential plane passing through the apex 210 and functioning as an image observation surface 207' is created, wherein the size of the observation surface 207' must cover the effective field angle range. In this case, the center normal of the observation surface 207' is coaxial with the optical axis (Z-axis) of the projection lens set. FIG. 2D shows the distortion frame of the observation surface 207'. It is obtained, from FIGS. 2A, 2B, 2C and 2D, that when the imaging surface of the virtual image projection system has the concave type field curvature virtual image surface, its frame has the pincushion distortion occurred.

Figure 3A:
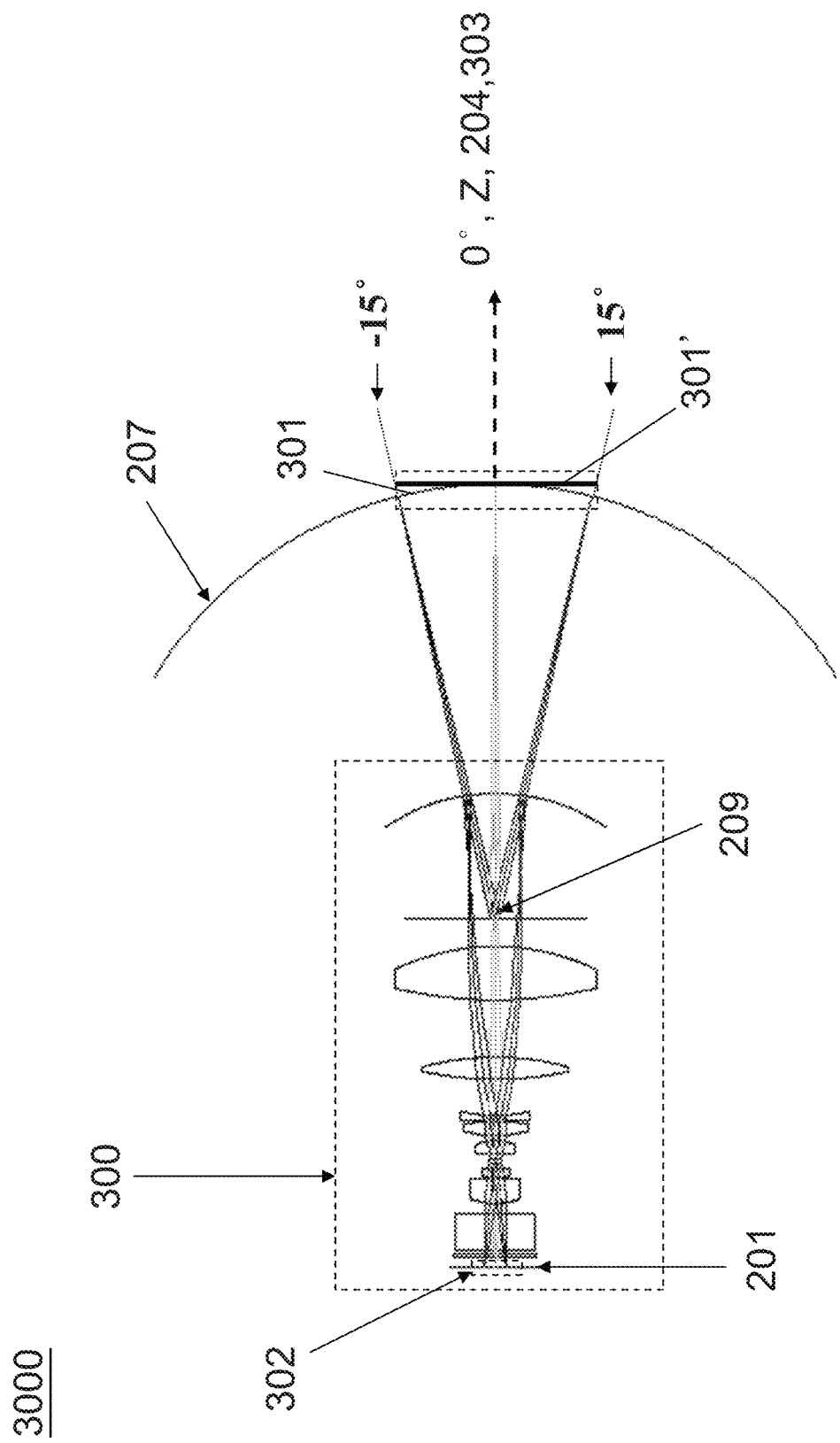
FIG. 3A is a is a schematic view showing a light path showing an area surface 301 comprising ±15° sagittal field angle and a virtual image projection system 3000.
Figure 3B:
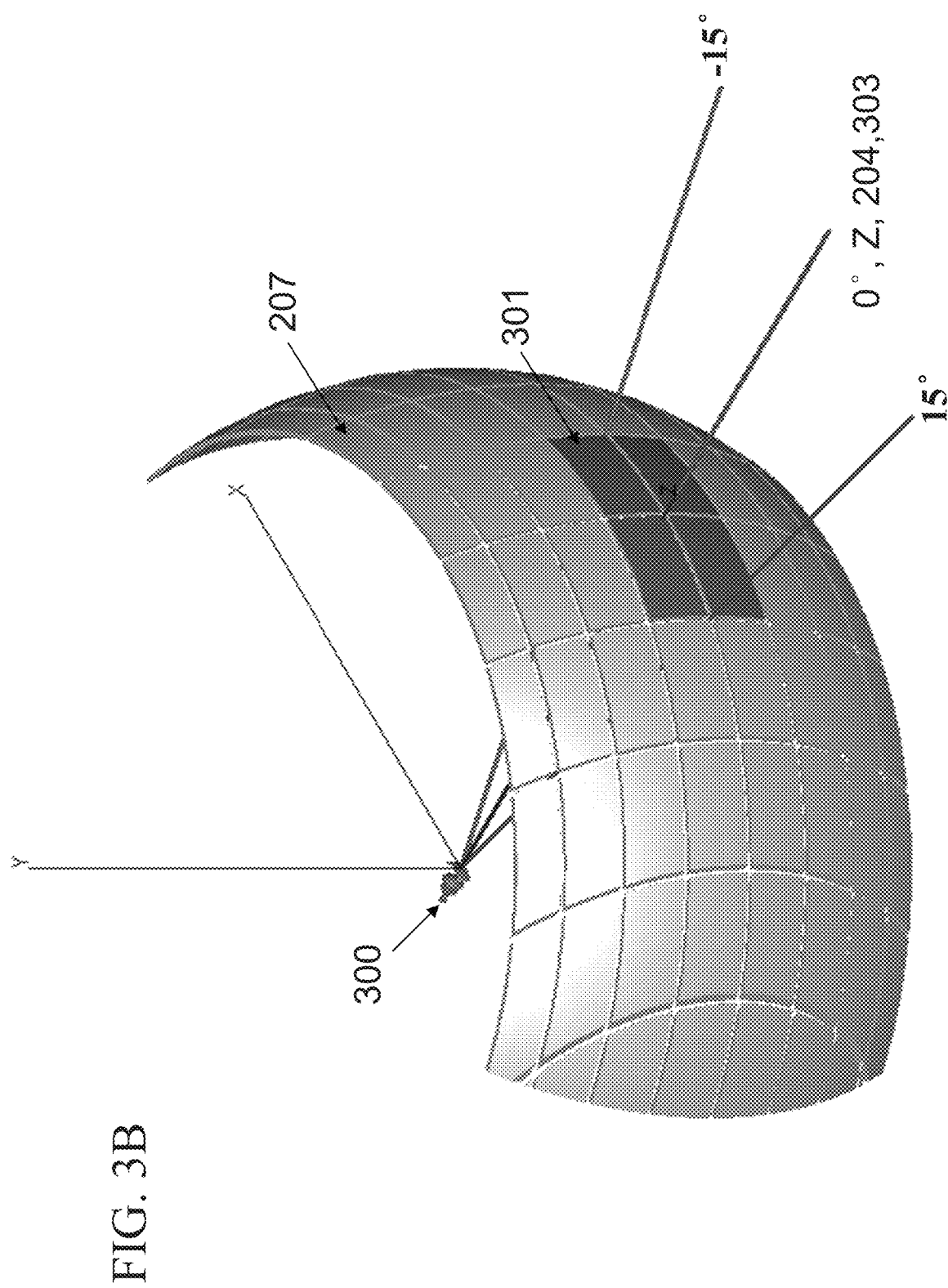
FIG. 3B is a schematic view showing a three-dimensional model of the area surface 301 comprising ±15° sagittal field angle and the reflective type virtual image projection system 3000.
Figure 3C:
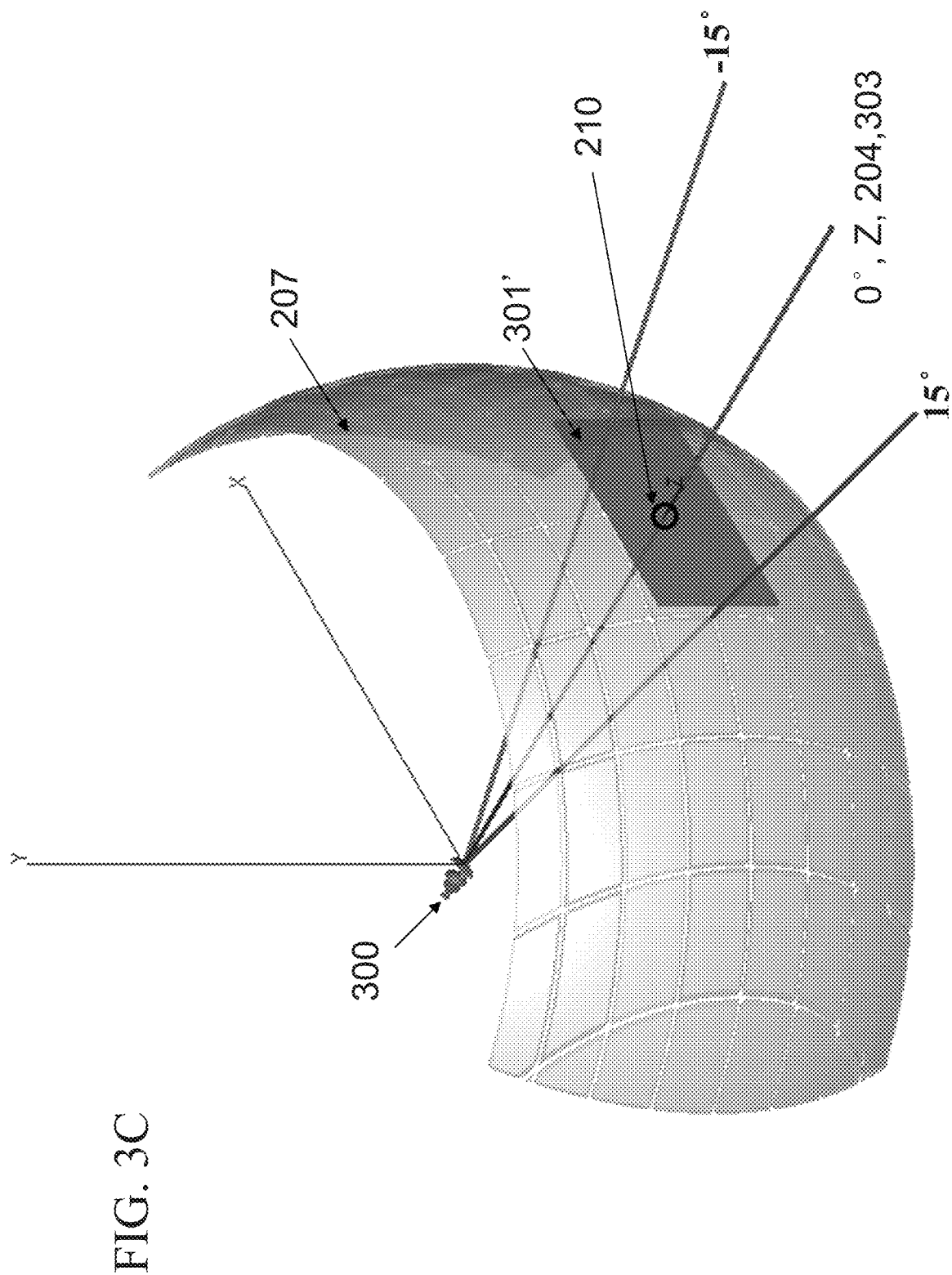
FIG. 3C is a schematic view showing a three-dimensional model of the area surface 301 comprising ±15° sagittal field angle and the reflective type virtual image projection system 3000, and an observation surface 301'.
Figure 3D:
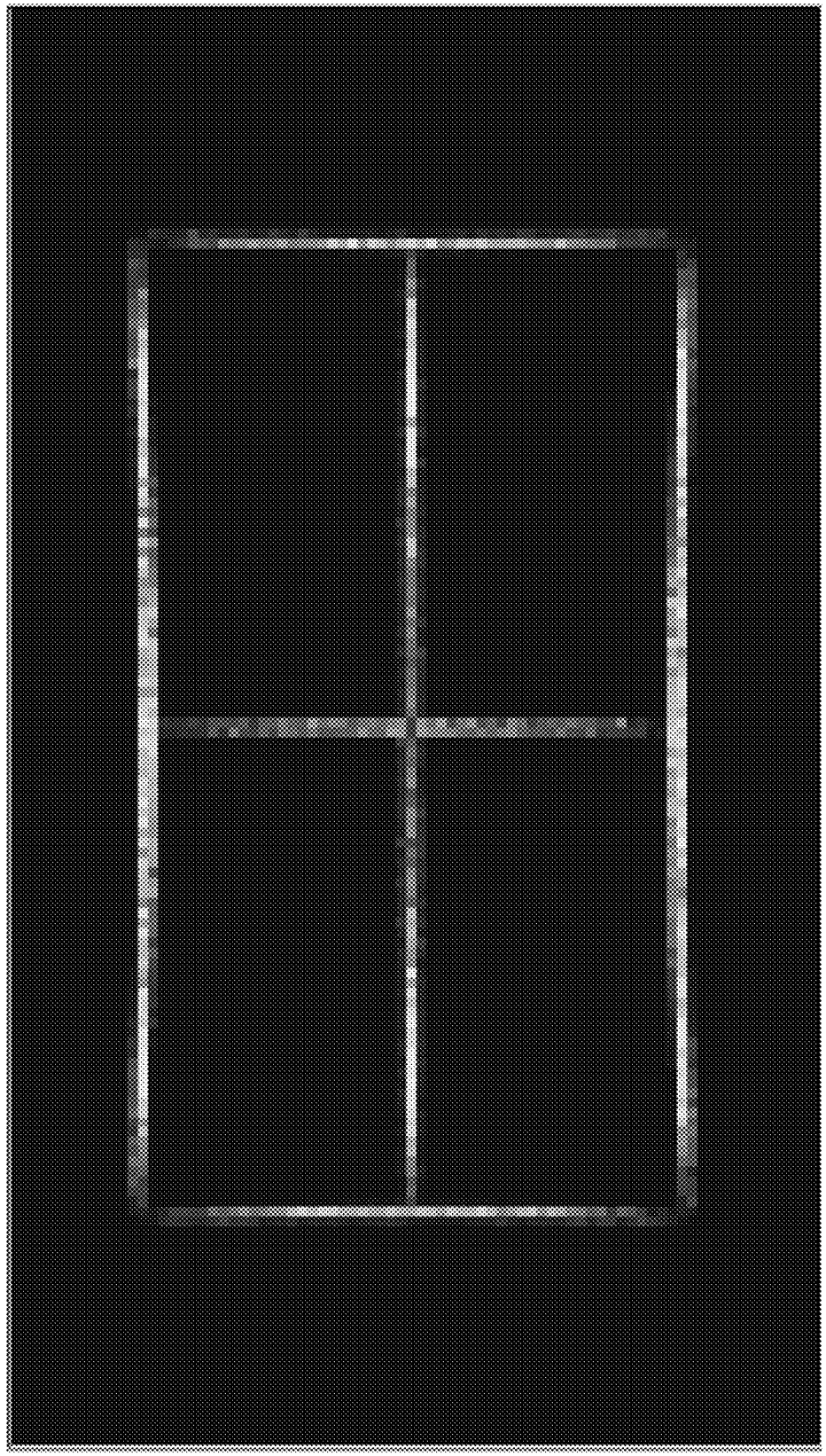
FIG. 3D is a schematic view showing an image distortion of the observation surface 301' in FIG. 3C.

As shown in FIG. 3A, a field curvature virtual image projection system 3000 is formed by placing an image source 302, having an effective area smaller than the objective plane, on the partial region of the objective plane of the projection lens set 200. The system 3000 is applicable to a projection lens set 300, wherein the projection lens set 300 and the projection lens set 200 have the same optical axis 204. The projection lens set 300 only images a virtual image area surface 301 smaller than the virtual image surface 207, wherein the area surface 301 has an optical axis 303. In this embodiment, the area and the position of the image source 302 are configured such that the optical axis 303 of the virtual image area surface 301 is coaxial with the optical axis 204 of the virtual image surface 207, and configured to have the effective field angle range within ±15° of the sagittal direction and the effective field angle range within about ±8.37° of the meridional direction. FIG. 3A is modeled into FIG. 3B to show the stereoscopic effect. As shown in this example of FIG. 3C, the intersection between the area surface 301 and the optical axis 204 is the apex 210 of the field curvature virtual image projection system 2000 of the above-mentioned example, so that a tangential plane passing through the apex 210 and functioning as an image observation surface 301' can be similarly created, wherein the size of the observation surface 301' must cover the effective field angle range. In this case, the center normal of the observation surface 301' is coaxial with the optical axis 204 (Z-axis) of the projection lens set 300. FIG. 3D shows the frame distortion of the observation surface 301'. It is obtained, from FIGS. 3A to 3D, that:

1. Selecting the partial region area on the objective plane 201 can obtain the virtual image displayable region disposed on the virtual image surface 207.
2. When the optical axis 303 of the virtual image is coaxial with the optical axis 204 of the projection lens set 300, the frame has no keystone distortion.
3. When a partial region of the concave type field curvature virtual image surface 207 is selected for projection, the distortion thereof is smaller than that of FIG. 2D.
4. When no included angle is present between the optical axis 303 of the virtual image and the optical axis 204 of the projection lens set 300, the exit pupil 209 is disposed in the valid region of the light path of the projection lens set 300. So, the interference with the wearer's head cannot be avoided.

Figure 4A:
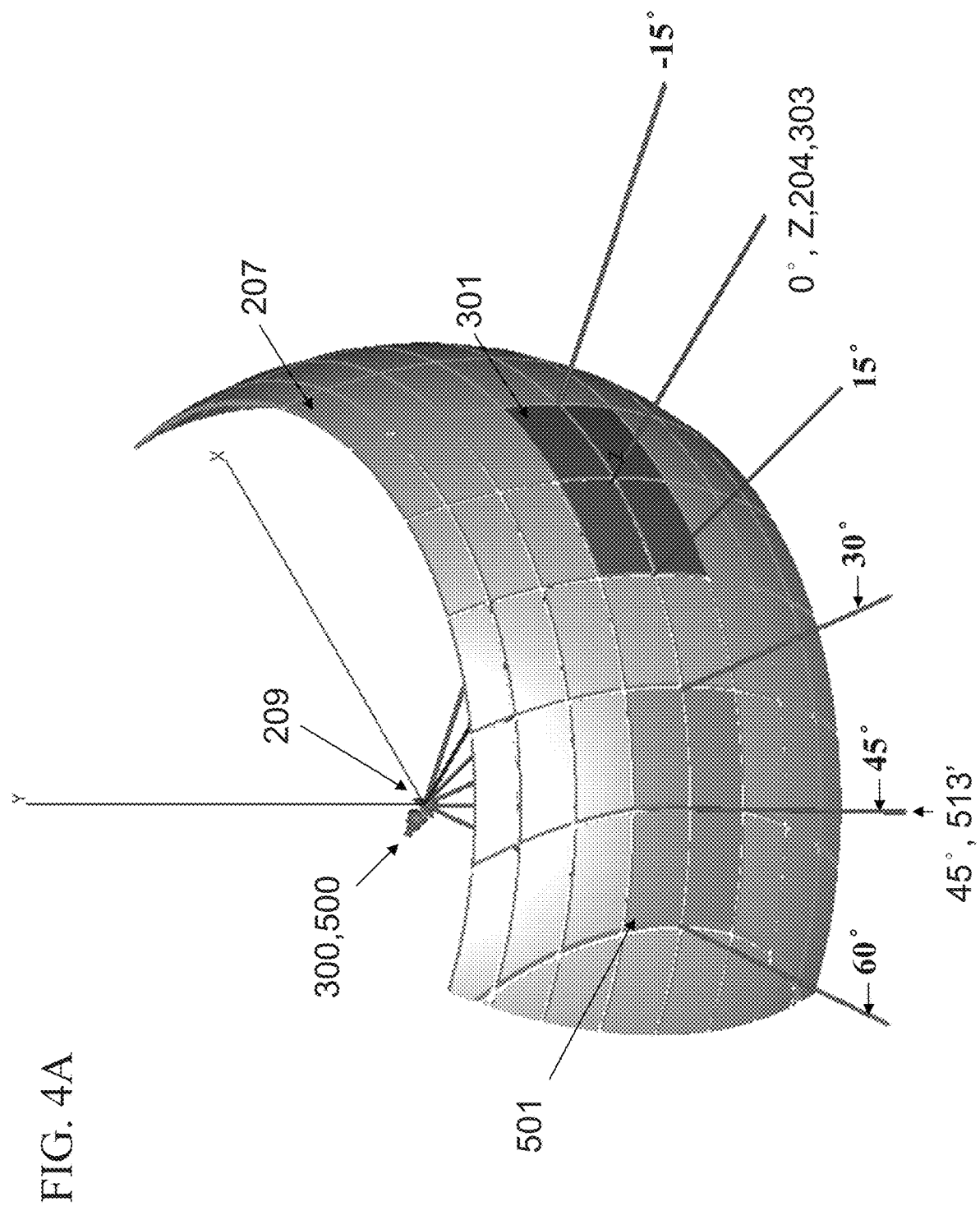
FIG. 4A is a schematic view showing a difference between three-dimensional models of the virtual image projection system 3000 and a virtual image projection system 5000, having the concave type field curvature virtual image surface comprising the area surface 301 of ±15° sagittal field angle and an area surface 501 of +30° to +60° sagittal field angle.
Figure 4B:
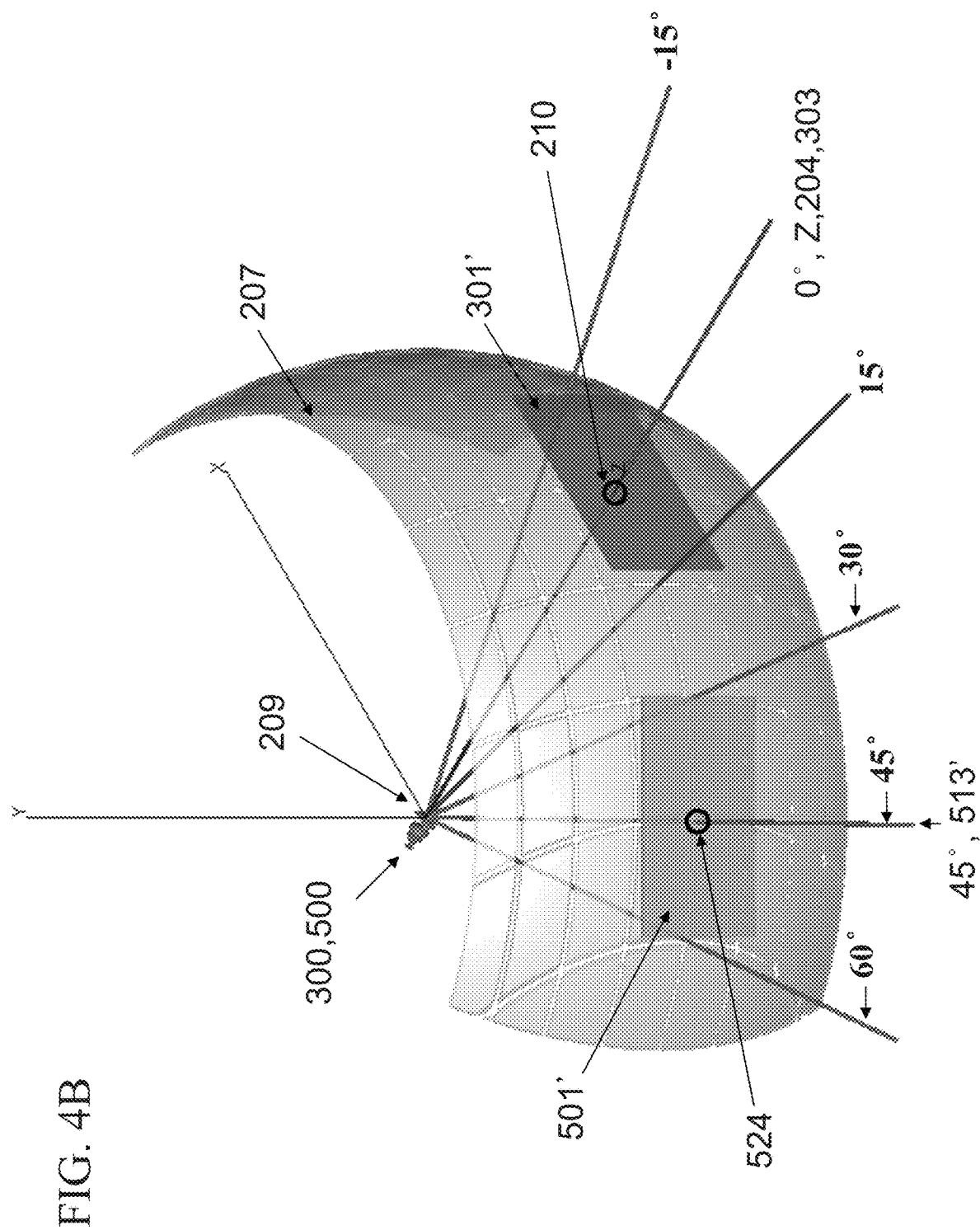
FIG. 4B is a schematic view showing a difference between three-dimensional models of the virtual image projection system 3000 and the virtual image projection system 5000, having the concave type field curvature virtual image surface comprising the observation surface 301' of ±15° sagittal field angle, and an observation surface 501' of +30° to +60° sagittal field angle.

In order to form an included angle between the projection lens set 200 and the optical axis of the virtual image to achieve the objective of the lateral projection, it is possible to adjust the position of the region of the objective plane occupied by the image source so that an offset is present between the center of the image source and the center of the objective plane. The above-mentioned adjustment is equivalent to the selection of another area surface, different from the area surface 301, on the virtual image surface 207, wherein an offset is present between the center of the area surface and the optical axis 204. As shown in FIG. 4A, the optical axis 204 of the projection lens set 200 in FIG. 2A is rotated by 45° about the Y-axis with the exit pupil 209 serving as a center to form an optical axis 513' passing through the center of another virtual image area surface 501. In addition, the intersection between the virtual image area surface 501 and the optical axis 513' functions as an apex 526 to define an observation surface 501' of FIG. 4B. Because the virtual image surface has the spherical type field curvature and the spherical center of curvature is located at the exit pupil 209, an included angle of 45° is present between the optical axis 513' of the observation surface 501' and the optical axis 204.

Figure 5A:
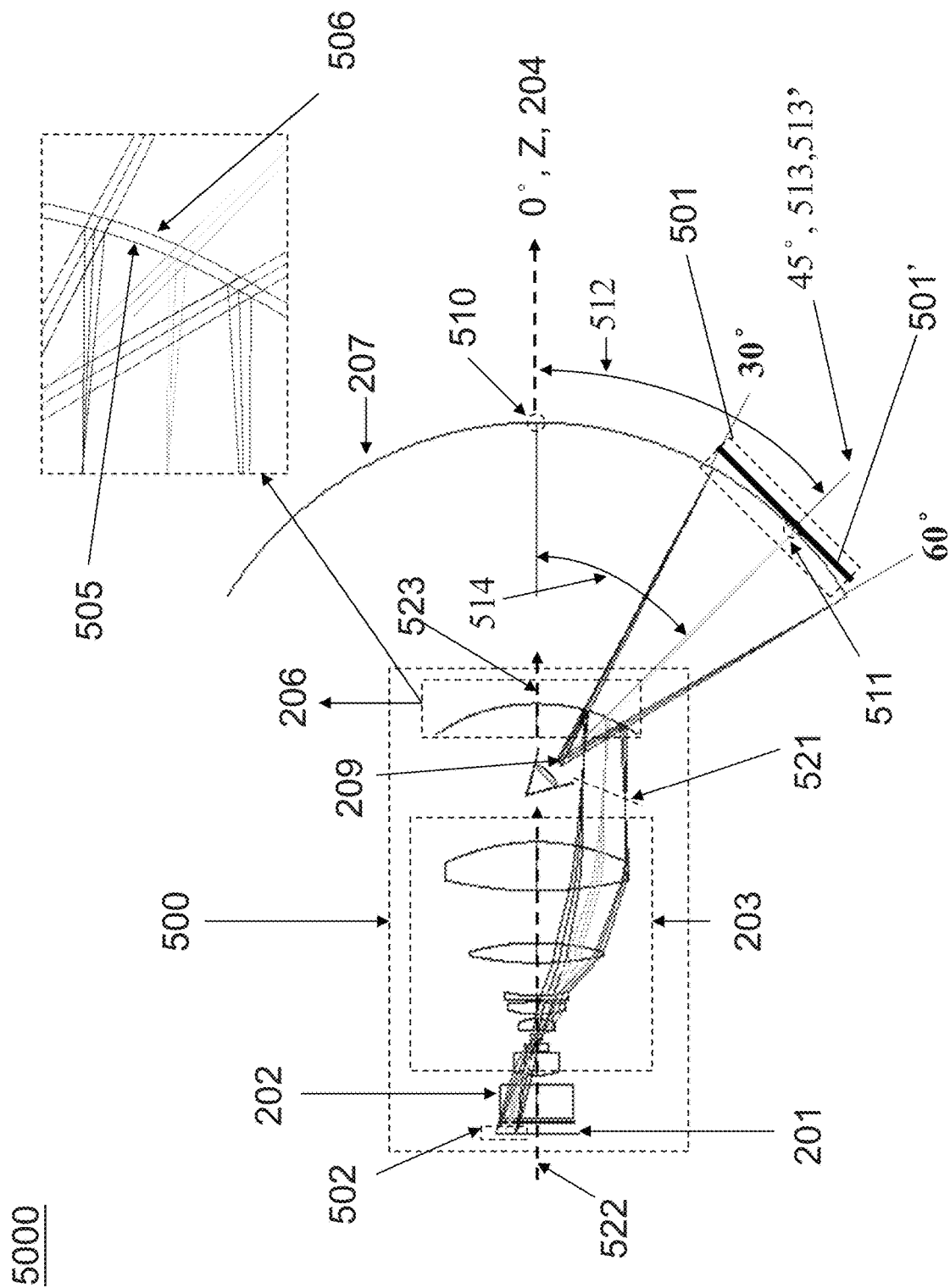
FIG. 5A is a schematic view showing a light path of the area surface 501 having +30° to +60° sagittal field angle and the virtual image projection system 5000.
Figure 5B:
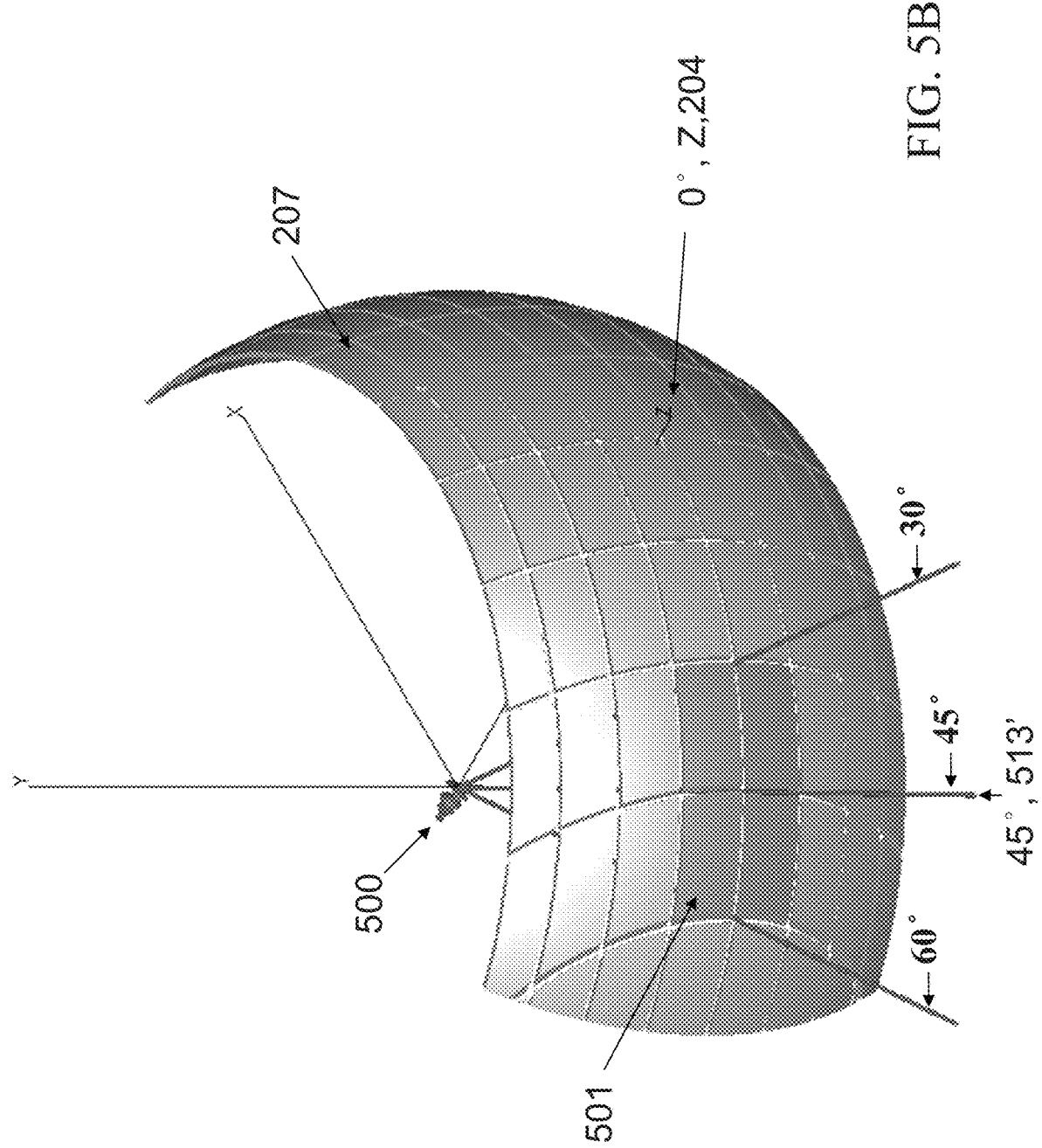
FIG. 5B is a schematic view showing a three-dimensional model of the area surface 501 having +30° to +60° sagittal field angle and the virtual image projection system 5000.
Figure 5C:
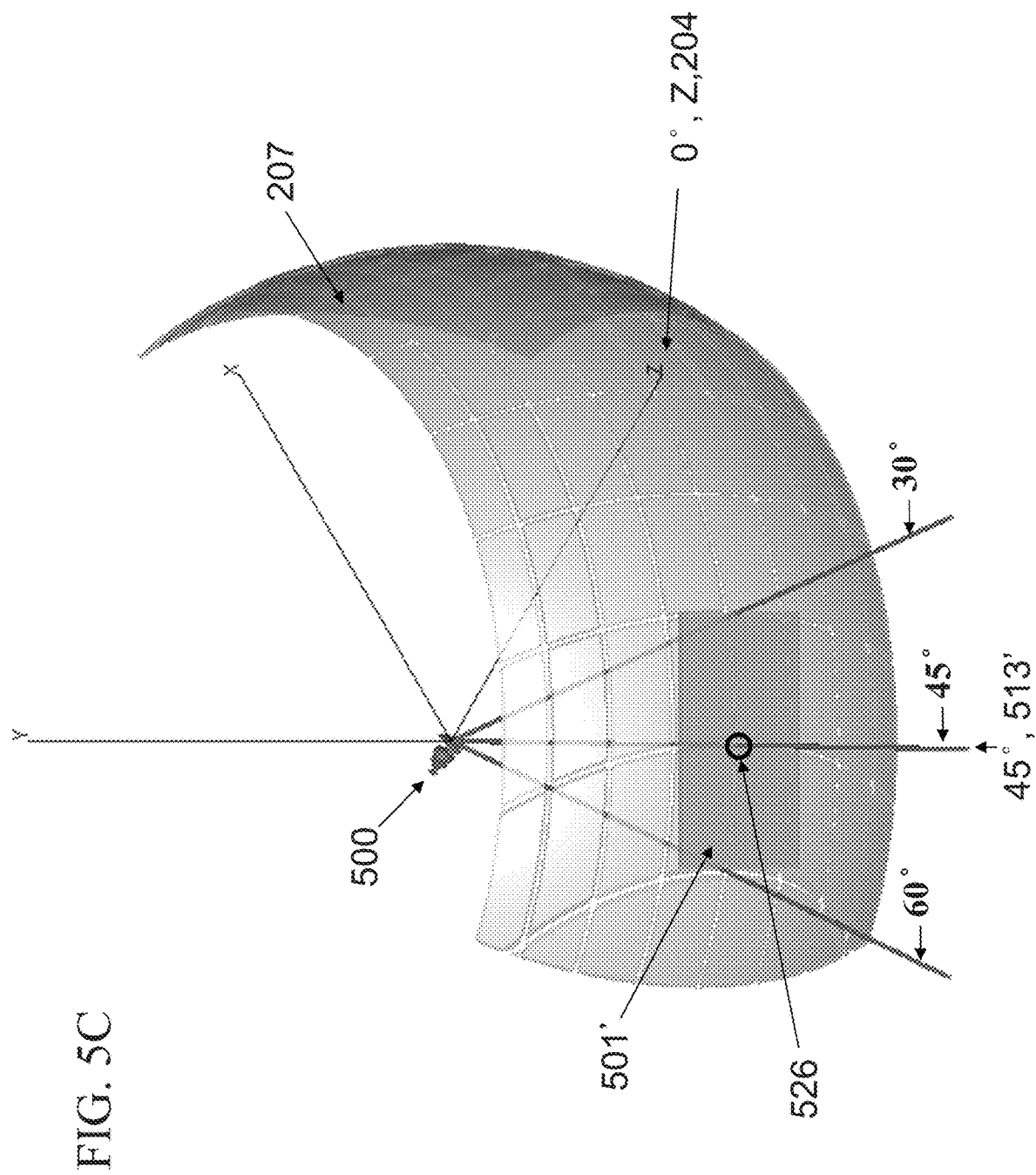
FIG. 5C is a schematic view showing a three-dimensional model of the observation surface 501' having +30° to +60° sagittal field angle and the virtual image projection system 5000.
Figure 5D:
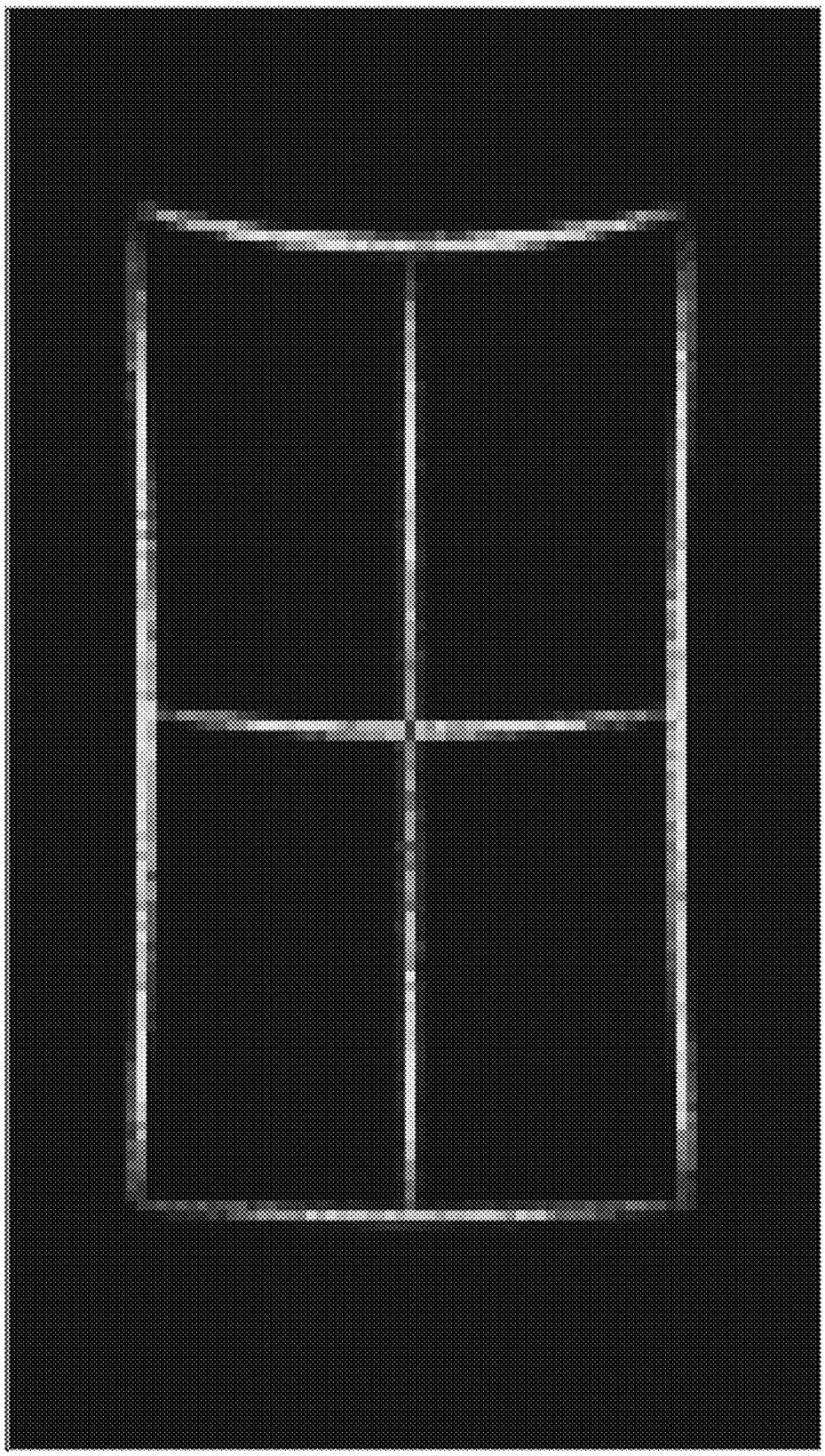
FIG. 5D is a schematic view showing an image distortion of the observation surface 501' in FIG. 5C.

As shown in FIG. 5A, an image source 502 having an effective area smaller than the objective plane is placed in the partial region of the objective plane of the projection lens set 200 of FIG. 2A to form a field curvature virtual image projection system 5000 applicable to a projection lens set 500. The projection lens set 500 and the projection lens set 200 have the same optical axis 204. In this case, the projection lens set 500 only images the virtual image area surface 501 smaller than the virtual image surface 207, wherein the area surface 501 has the optical axis 513'. In this embodiment, the area and the position of the image source 502 are configured such that the optical axis 513' is coaxial with the field angle of +45° in the sagittal direction of the virtual image surface 207, and the effective field angle range from +30° to +60° in the sagittal direction and the effective field angle range of about ±8.37° in the meridional direction are provided. FIG. 5A is modeled into FIG. 5B to show the stereoscopic effect. As shown in FIG. 5C, a tangential plane functioning as the image observation surface 501' may be created with the intersection between both of them serving as an apex, wherein the size of the observation surface 501' must cover the effective field angle range. In this case, the center normal of the observation surface 501' is coaxial with the optical axis 513' of the area surface 501, and an included angle of 45° is present between the optical axis 204 of the projection lens set 500 and the optical axis 513' of the area surface 501. This embodiment defines an eye's optical axis 513 being coaxial with the optical axis 513' to represent that the human eye positively observes the area surface 501. FIG. 5D shows the frame distortion of the observation surface 501'. As shown in this drawing, longitudinal lines of the entire frame are curved in the same direction but with different curvatures. This distortion is referred to as a sagittal moon shape distortion in the field curvature virtual image projection system of the invention. FIGS. 5A to 5D describe the following.

1. Selecting an effective region position center, deviating from the center of the objective plane, on the objective plane 201 can obtain a center 511 of a virtual image displayable region disposed on the virtual image surface 207 and deviating from a center 510 of the virtual image surface.
2. When an included angle of 45° is present between the optical axis 513' of the virtual image and the optical axis 204 of the projection lens set 500, the exit pupil 209 is not located in the valid region of the light path of the projection lens set 500, it is sufficient to avoid the interference with the wearer's head, and the frame has no keystone distortion.
3. When a partial region of the virtual image surface of the concave type field curvature is selected for projection, the distortion is smaller than that of FIG. 2D.
4. When the optical axis 513' is not coaxial with the optical axis 204, the frame has the moon shape distortion, and the frame curving extent ascends with the off-axis extent.

Figure 1A:
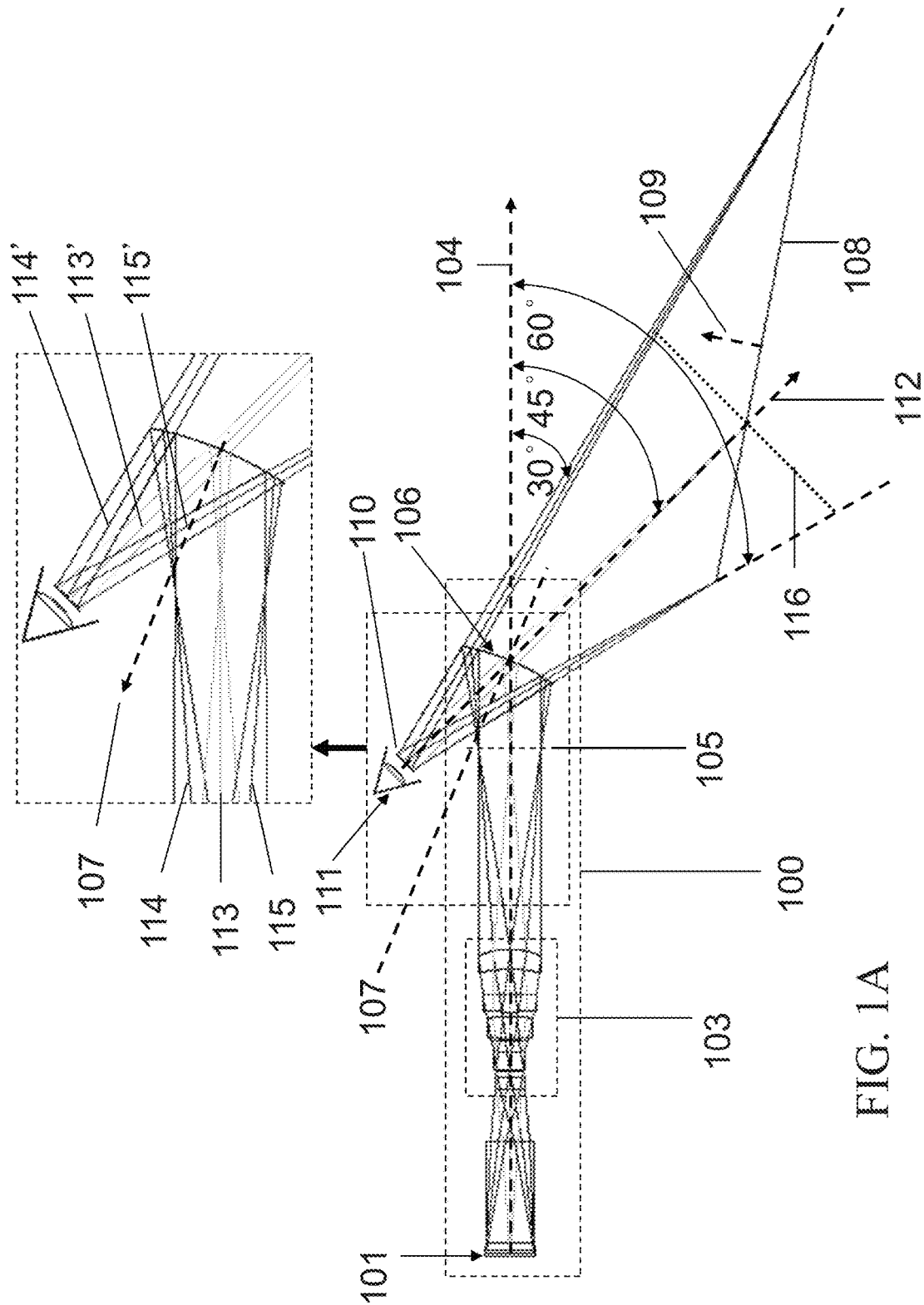
FIG. 1A shows a reflective type off-axis type virtual image projection system 1000.
Figure 1C:
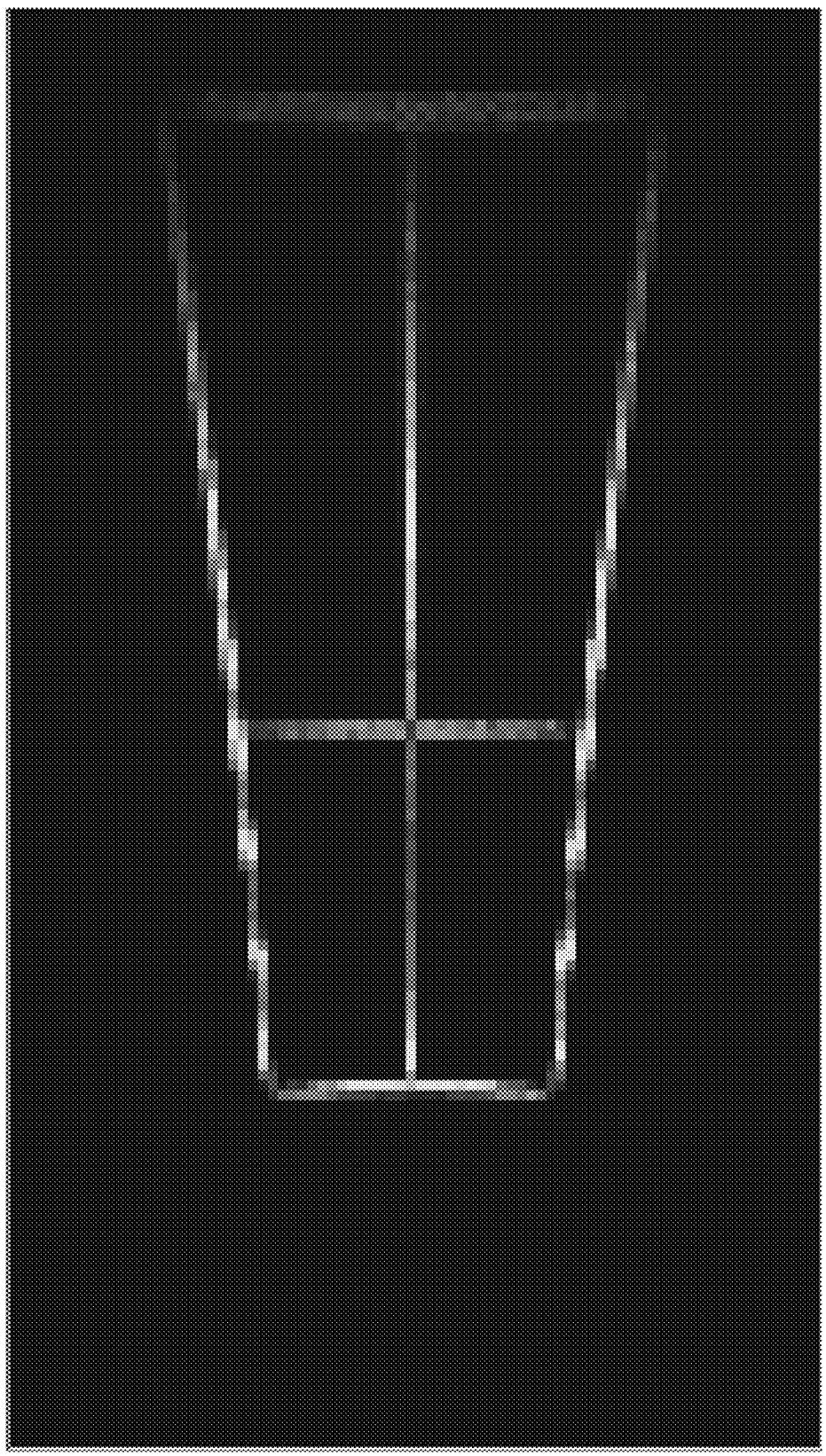
FIG. 1C is a schematic view showing a keystone distortion of the virtual image plane in FIG. 1A.

It is obtained, from FIG. 5A, that orientations of the observation surface 501' and the observation surface 116 of FIG. 1A are very close, and the following important properties can be achieved. The difference between the light paths on two sides of the virtual image can be eliminated. The optical axis of the virtual image is coaxial with the eye's optical axis. The sufficient included angle can be present between the light path of the projection system and the main light passing through the center of the virtual image. In addition, all optical surfaces of the full system are coaxial with each other, but the lateral projection effect of the off-axis design can be achieved. The off-axis characteristics come from the distribution of each valid region of the element.

To sum up, it is obtained that a field curvature virtual image display system must have the projection lens set capable of imaging the objective plane as the concave type field curvature virtual image surface, and that the image source is disposed in the partial region of the objective plane of the projection lens set.

Figure 5E:
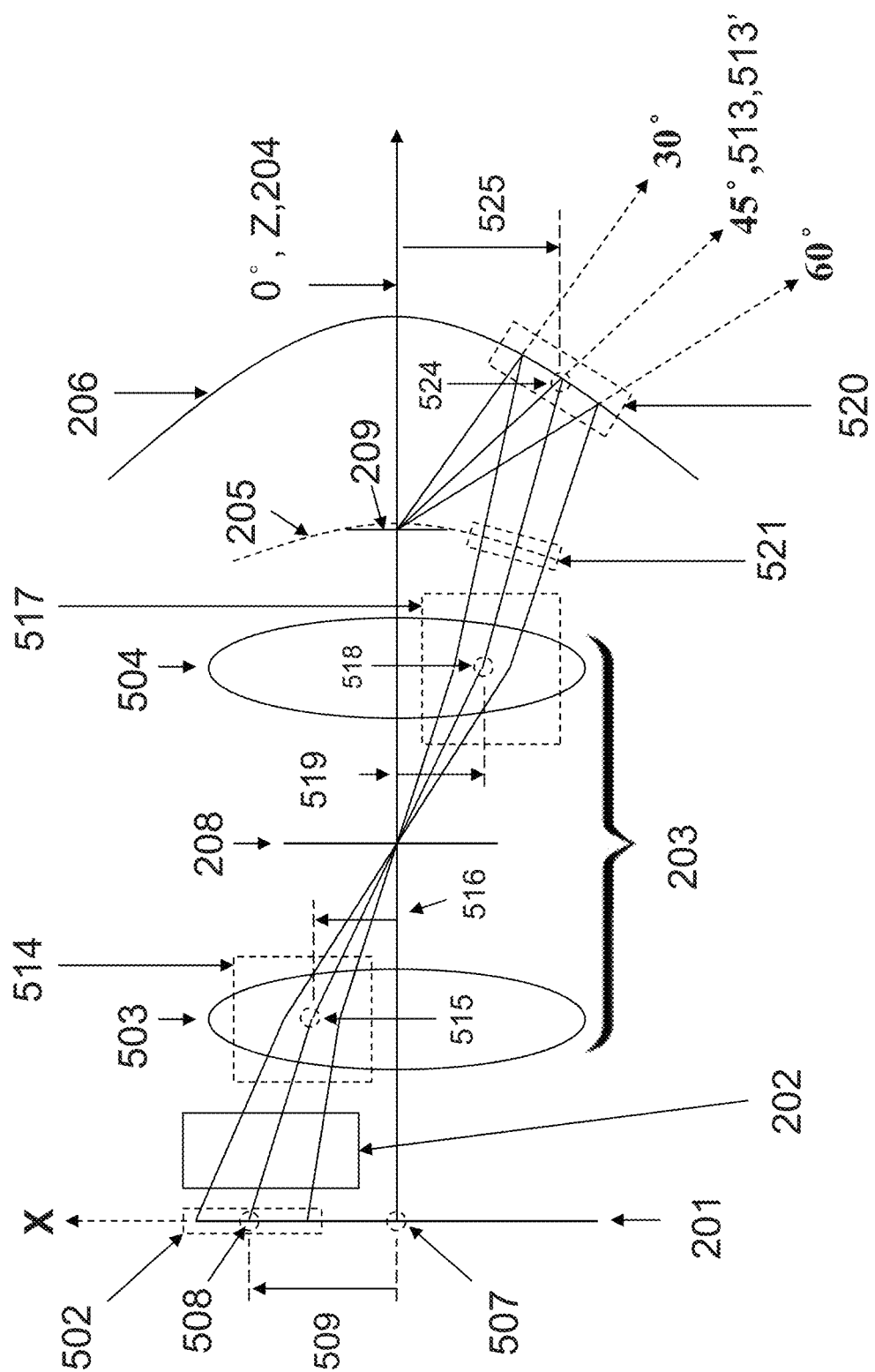
FIG. 5E is a characteristic schematic view showing the "field curvature virtual image display system."

Referring to FIGS. 5A and 5E, a field curvature virtual image display system 5000 of the invention is applicable to the projection lens set 500. The projection lens set 500 comprises: the image source 502 disposed in the partial region of the objective plane 201 of the projection lens set 500; the first imaging group 203 having a front lens group 503 and a back lens group 504; and the second imaging group 206 having a partial reflection and partial transmission surface 505 and an antireflection surface 506, wherein the second imaging group 206 functions as an image combiner in the field curvature virtual image display system 5000.

The optical axis of the objective plane is coaxial with the optical axis of the first imaging group 203 and coaxial with an optical axis 522. The optical axis of the second imaging group 206 is coaxial with an optical axis 523. In this embodiment, the optical axis 522 and the optical axis 523 are coaxial with the optical axis 204 of the system 5000. The objective plane 201 forms a real image surface 205 with the field curvature through the first imaging group 203, and the real image surface 205 forms a virtual image surface 207 with the concave type field curvature through the second imaging group 206.

The image source 502 is disposed in a partial region of the objective plane 201, so that the real image surface 205 only causes a real image area surface 521. Thus, the virtual image surface 207 also has only the virtual image area surface 501 to be displayed. An objective offset 509 is presented between a center 508 of a partial region, where the image source 502 is located, and a center 507 of the objective plane, so that an image offset 512 is present between the center 511 of the virtual image displayable region and the center 510 of the virtual image surface at the same time. Due to the field curvature property of the virtual image surface, when the optical axis 513' of the virtual image effective region, occurred in the system 500, is coaxial with the eye's optical axis 513, an included angle 527 is present between the optical axis 513' and the optical axis 204. The properties can make the system 5000 display the correct frame, and prevent the interference between the projection lens set 500 and the head tissue from occurring when the eye's optical axis 513 is coaxial with the optical axis 513' of the virtual image.

The first imaging group 203 comprises a pupil 208; the image source 502, the back focus prism (set) 202 and the front lens group 503 are disposed on the same first side of the pupil 208; and the back lens group 504 and the second imaging group 206 are disposed on the same second side of the pupil 208. Based on a light travelling direction, the image source 502 and the front lens group 503 are disposed in front of the pupil 208, and the back lens group 504 and the second imaging group 206 are disposed behind the pupil 208.

A region center 515 of a front-group valid region 514 forms an offset 516 with the first optical axis 204, and is biased toward the side where the image source 502 is located, and the optical element of the front lens group 503 further from the pupil 208 has the greater offset 516. A region center 518 of a rear-group valid region 517 forms an offset 519 with the optical axis 204, and deviates from the side where the image source 502 is located, and the optical element of the back lens group 504 further from the pupil 208 has the greater offset 519. A region center 524 of a second imaging group valid region 520 forms an offset 525 with the optical axis 204 and deviates from the side where the image source 502 is located. The optical element invalid region should be possibly cut off to prevent the interference and decrease the volume and weight.

According to the virtual image display system 5000, it is obtained that the field curvature virtual image display system of the invention has the following characteristics.

1. The field curvature virtual image display system is composes of a virtual image projection lens set, and its imaging surface is the virtual image surface having the concave type field curvature.
2. As shown in FIG. 5E, the virtual image display system 5000 is applicable to the projection lens set 500. The projection lens set 500 comprises the image source 502, the back focus prism (set) 202, the first imaging group 203 and the second imaging group 206. The first imaging group 203 comprises the front lens group 503, the first pupil 208 and the back lens group 504. The second imaging group 206 is an optical element having the partial reflection and partial transmission functions and functions as an image combiner.
3. The first imaging group 203 must form the real image 205 disposed within the focal length of the second imaging group 206 so that the virtual image is generated in the system.
4. As shown in FIG. 5E, the image source 502 is located in a partial region of the objective plane 201 of the virtual image projection system. The region center, where the image source 502 is located, has the sagittal or meridional offset with the optical axis 204 of the projection lens set 200. If its offset is in the sagittal direction, then the normal of the projection frame is held to rotate on the sagittal plane, so that the optical axis of the virtual image and the optical axis of the projection lens set are located on the sagittal plane, and an included angle is present between both of them. This state is referred to as the sagittal lateral projection in the field curvature virtual image projection system of the invention. If its offset is in the meridional direction, then the normal of the projection frame is held to rotate on the meridional plane, so that the optical axis of the virtual image and the optical axis of the projection lens set are disposed on the meridional plane, and an included angle is present between both of them. This state is referred to as the meridional lateral projection in the field curvature virtual image projection system of the invention. The region ratio of the image source 502 to the objective plane relates to the viewing angle range of the lateral projection frame. The region center offset of the image source 502 relates to the included angle between the optical axis 513' of the virtual image and the optical axis 204 of the projection lens set 200.
5. As shown in FIG. 5E, in addition to the pupil 208, the centers of the valid regions of other elements of the projection lens set 200 have their own offsets. The offset direction of the optical valid region of the element in front of the pupil 208 is the same as the offset direction of the image source, and the valid region of the element further from the pupil 208 has the greater offset. The offset direction of the optical valid region of the element in back of the pupil 208 is reverse to the offset direction of the image source, and the valid region of the element further from the pupil 208 has the greater offset. The invalid region of the element caused by the offset of the valid region of the element should be possibly cut off to prevent the interference and reduce the volume and the weight.
6. As mentioned in the fourth characteristic, when the sagittal lateral projection state is established, the longitudinal lines of the projection frame are curved. This state is referred to as the sagittal moon shape distortion in the field curvature virtual image projection system of the invention. When the meridional lateral projection state is established, the transversal lines of the projection frame are curved. This state is referred to as the meridional moon shape distortion in the field curvature virtual image projection system of the invention.

Figure 6A:
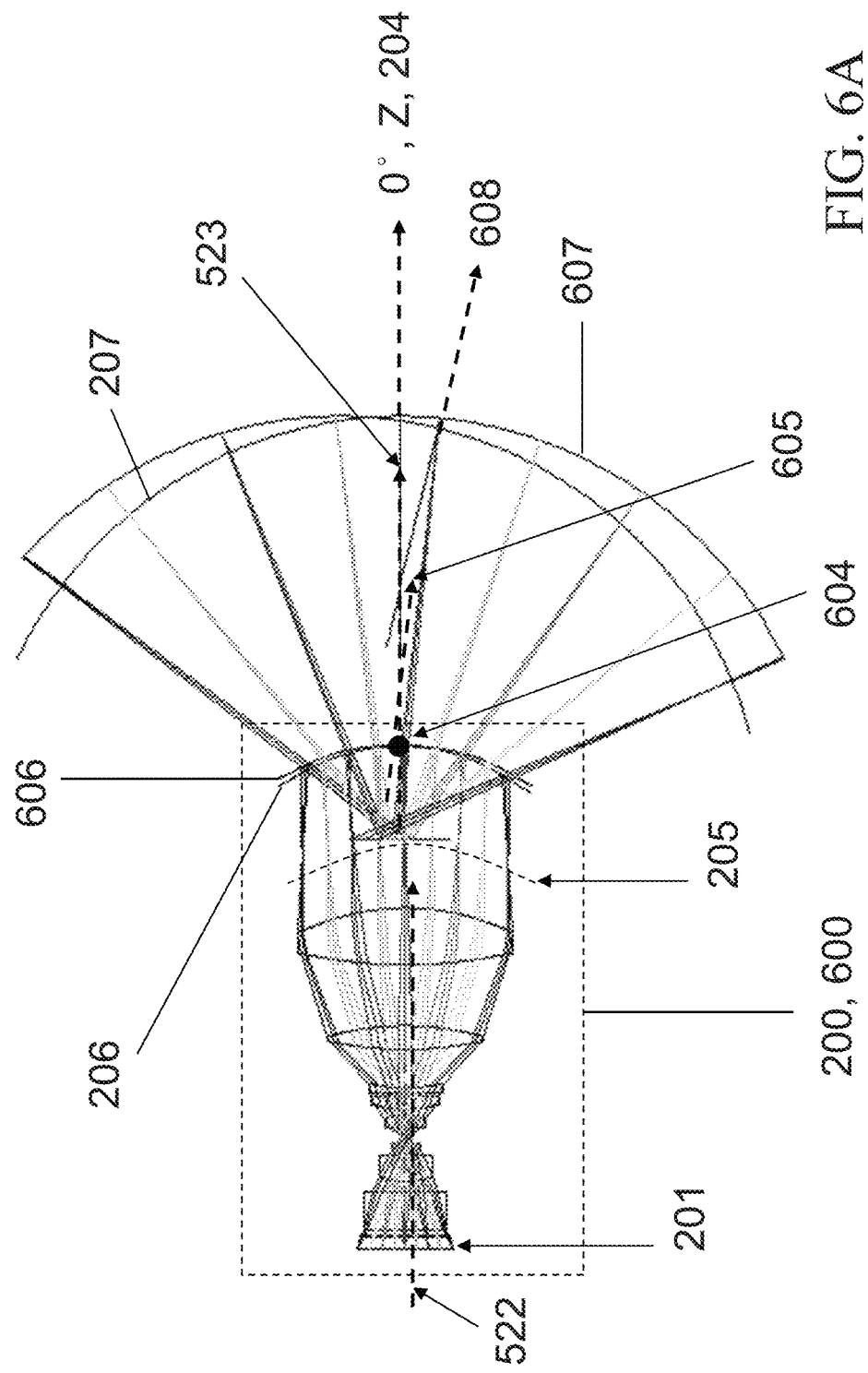
FIG. 6A is a schematic view showing a light path difference between the virtual image projection system 2000 having the virtual image surface 207 and a virtual image projection system 6000, which has a virtual image surface 607 and is transformed after the second imaging group is rotated and displaced.
Figure 6B:
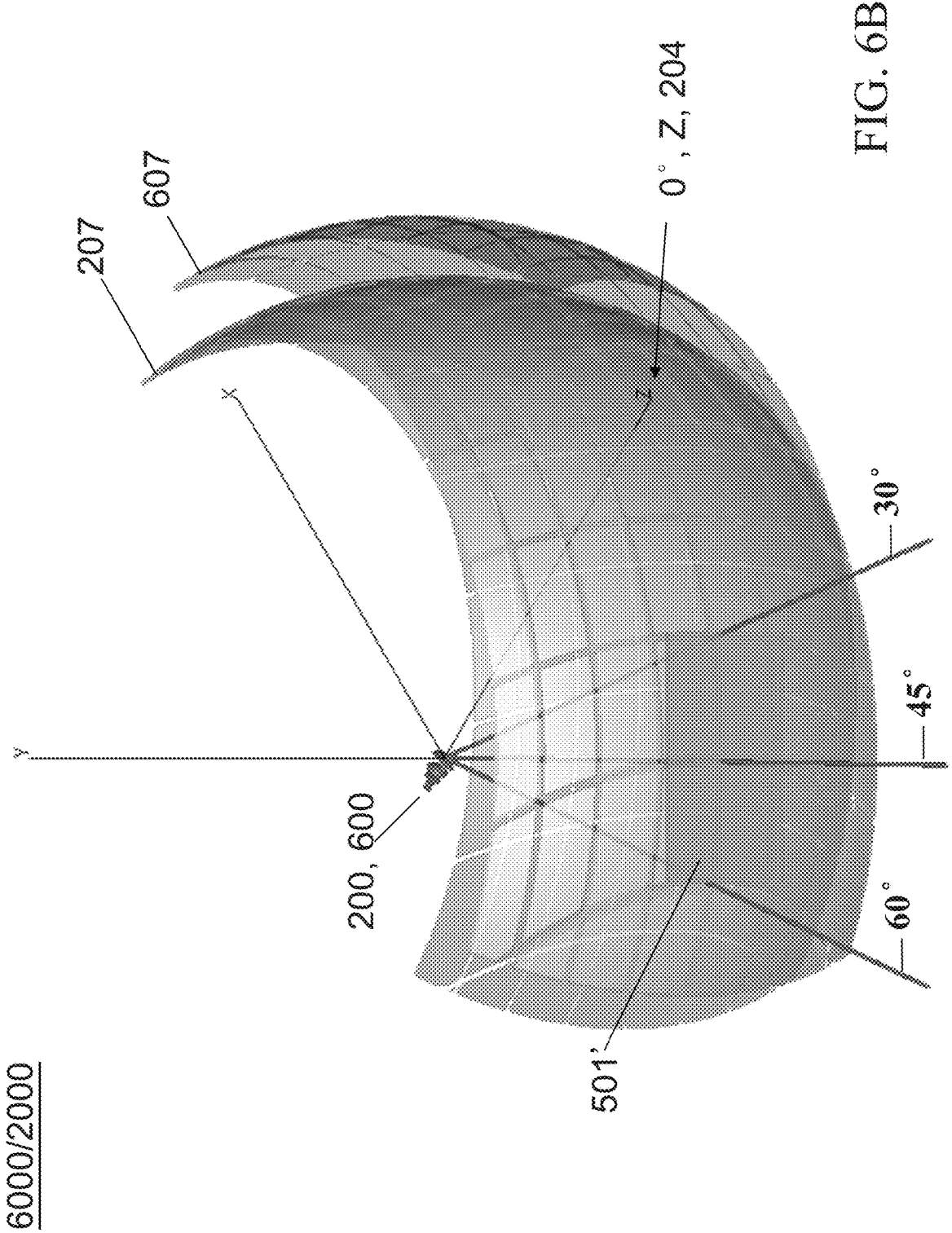
FIG. 6B is a schematic view showing a difference between three-dimensional models of the virtual image projection system 2000 having the virtual image surface 207 and the virtual image projection system 6000, which has the virtual image surface 607 and is transformed after the second imaging group is rotated and displaced.

The invention proposes a second view point of adjusting the position and the angle of the second imaging group of the projection lens set in the field curvature virtual image projection system, so that the second optical axis is not coaxial the first optical axis to change the field curvature property of the field curvature virtual image display system. As shown in FIG. 6A, after the second imaging group 206 is rotated by 3° in the sagittal direction with an apex 604 of the partial reflection and partial transmission surface serving as the center, the system has a new projection lens set 600, which comprises a second imaging group 606 having an optical axis 605. In this case, the position of the exit pupil is shifted by 14.5 mm, and another virtual image surface 607 having an optical axis 608 is generated. The virtual image surface 607 is rotated by 13.6° with the center of curvature of the virtual image surface 207, shifted to the position of the new exit pupil, serving as the center. FIG. 6A is modeled into FIG. 6B to show the stereoscopic effect. It is observed, from FIG. 6B, that the imaging result of the observation surface 501' corresponds to the virtual image surface 607 and thus has a different presentation. This effect provides a mechanism of adjusting the virtual image surface and also increases the degrees of freedom of the system optimization.

The invention proposes a third view point of introducing the toroidal surface into the partial reflection and partial transmission surface of the second imaging group of the "field curvature virtual image projection system." In addition, at least one toroidal surface is introduced into the back lens group of the first imaging group of the system so that it coordinates with the second imaging group having the toroidal surface, so that the field curvature surface of the field curvature virtual image display system has the sagittal/meridional non-symmetrical property.

Figure 7A:
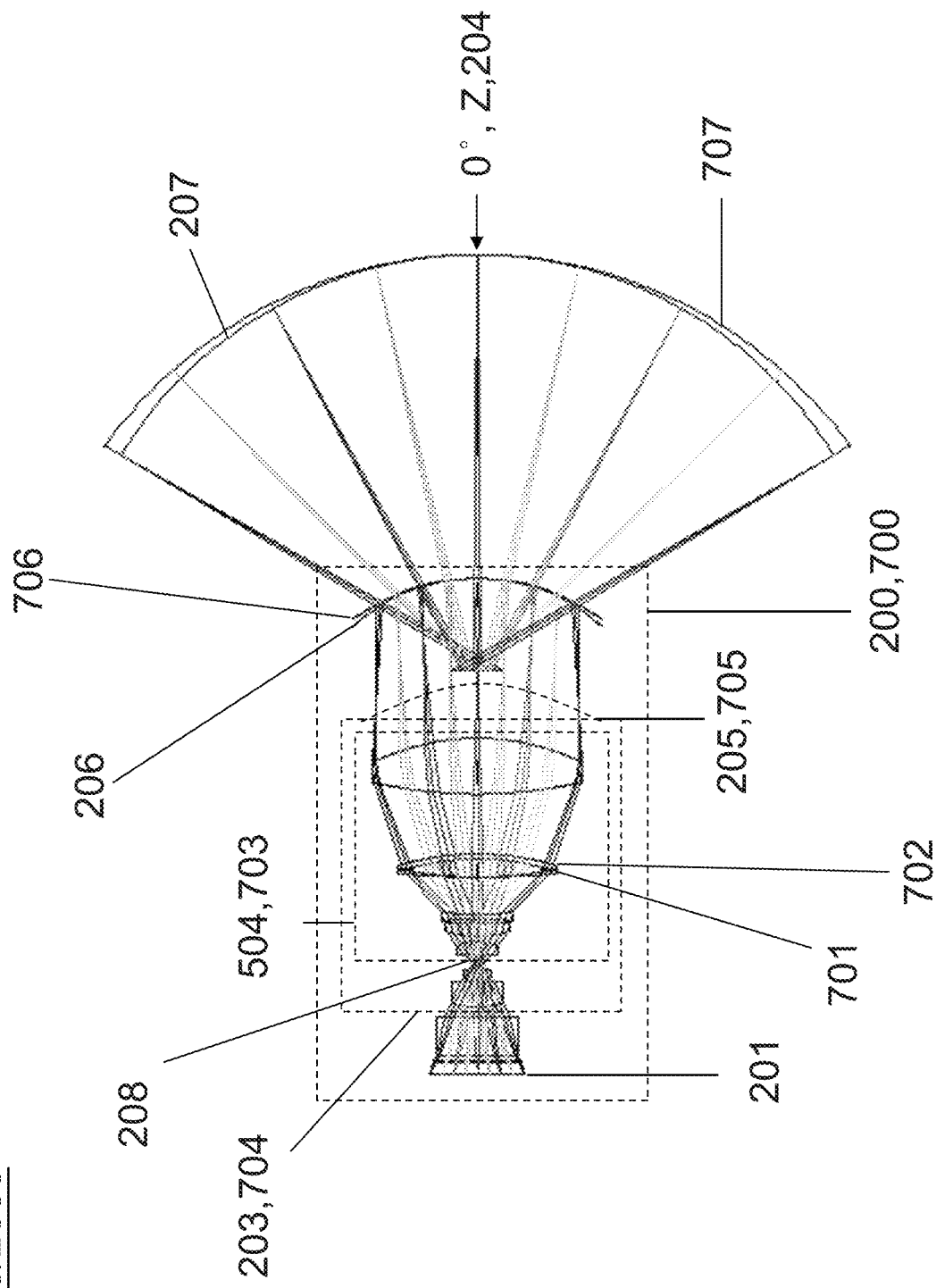
FIG. 7A is a schematic view showing a light path difference between the virtual image projection system 2000 having the virtual image surface 207 and a virtual image projection system 7000, which has a virtual image surface 707 and is transformed after the partial reflection and partial transmission surface in the second imaging group and at least an optical surface in the back lens group are modified from the circular symmetrical surface into the toroidal surface.
Figure 7B:
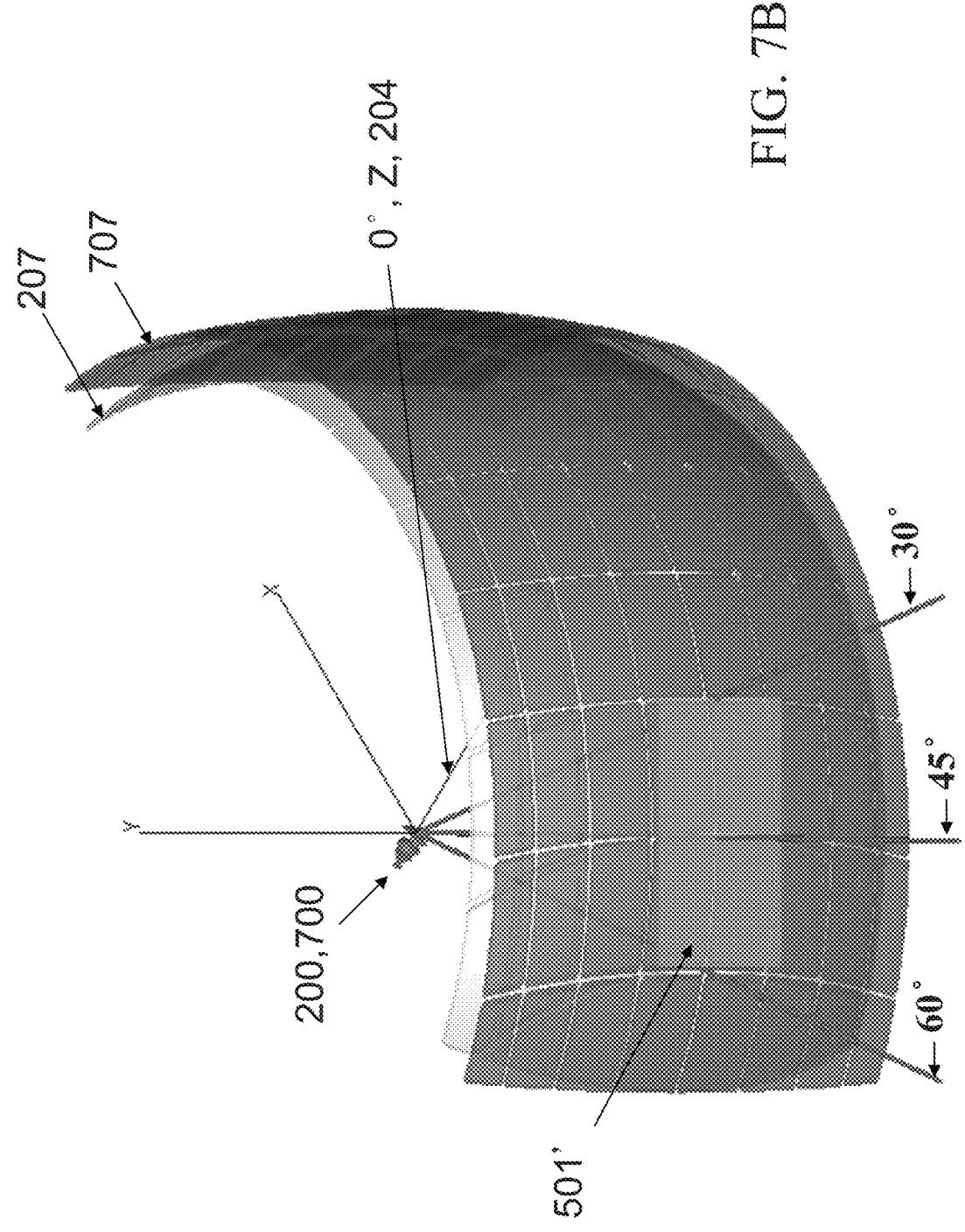
FIG. 7B is a schematic view showing a difference between three-dimensional models of the virtual image projection system 2000 having the virtual image surface 207 and the virtual image projection system 7000, which has the virtual image surface 707 and is transformed after the partial reflection and partial transmission surface in the second imaging group and at least an optical surface in the back lens group are modified from the circular symmetrical surface into the toroidal surface.

The curve equation applied to the surface of the optical element is as follows:

$$z = \frac{cr^2}{1+\sqrt{1-(1+k)cr^2}} + a_4 r^4 + a_6 r^6 + a_8 r^8 + a_{10} r^{10} + a_{12} r^{12} + a_{14} r^{14}$$

wherein c=curvature, r=radial coordinate, k=conic coefficient, and a4, a6, a8, a10, a12 and a14 are aspheric coefficients. If all the above-mentioned toroidal surfaces are used in the sagittal lateral projection, the curve equation of the toroidal surface on the sagittal plane may have a radius of curvature, a quadratic surface coefficient and an aspheric coefficient, while the curve equation on the meridional plane only has the radius of curvature. If being used in the meridional lateral projection, while the curve equation on the toroidal surface on the meridional plane may have the radius of curvature, the quadratic surface coefficient and the aspheric coefficient, while the curve equation on the sagittal plane only has the radius of curvature. Referring to FIG. 7A, a circular symmetry mirror 701 in the back lens group of the projection lens set 200 is replaced with a toroidal lens 702, and the second imaging group 206 of the projection lens set 200 is replaced with a second imaging group 706 having the partial reflection and partial transmission surface being a toroidal surface, and then the system has a new imaging group 700, which comprises a back lens group 703, a first imaging group 704, a real image 705 and a virtual image surface 707. FIG. 7A is modeled into FIG. 7B to show the stereoscopic effect. It is observed, from FIG. 7B, that the difference of the symmetrical and non-symmetrical properties of the virtual image surface 207 and the virtual image surface 707 in the sagittal/meridional direction can be obtained. This non-symmetrical effect is very good at optimizing the image distortion and the image's global clarity of the field curvature virtual image display system. The invention proposes a fourth view point of responding with the introduction of the reflective, transmissive and self-emissive image source when the field curvature virtual image display system has the sufficiently large back focus prism (set). Regarding the present technology, the reflective image sources mainly comprise a digital micromirror device (DMD) and a liquid crystal on silicon (LCOS); the transmissive image source mainly comprises a liquid crystal display (LCD); the self-emissive image sources mainly comprise an organic light emitting diode (OLED), a micro light emitting diode array (mLED) and the like.

Figure 8A:
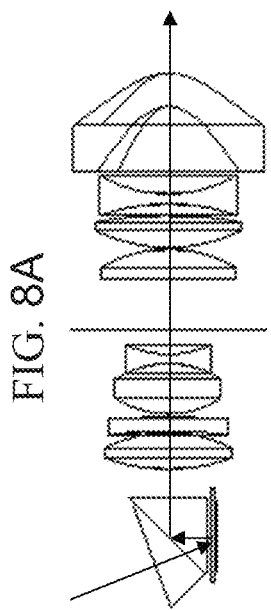
FIG. 8A is a schematic view showing a projection system coordinating with the digital micromirror device and the RTIR prism set.
Figure 8B:
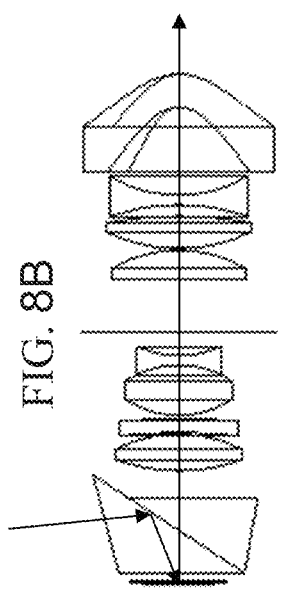
FIG. 8B is a schematic view showing a projection system coordinating with the digital micromirror device and the TIR prism set.
Figure 8C:
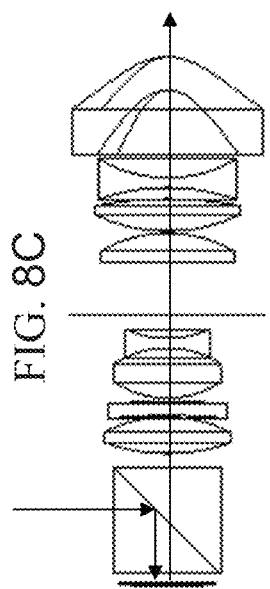
FIG. 8C is a schematic view showing a projection system coordinating with the liquid crystal on silicon and the square polarizing beam splitter.
Figure 8D:
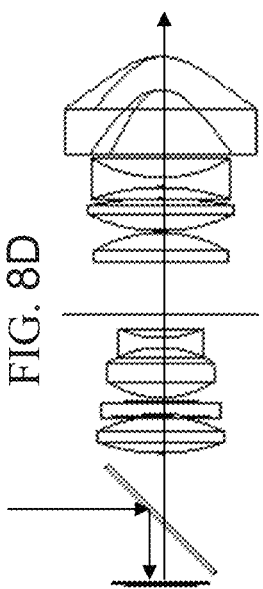
FIG. 8D is a schematic view showing a projection system coordinating with the liquid crystal on silicon and the cube polarizing beam splitter.

The virtual image display pertains to the scope of the projection system, wherein the human eye's optical system is comprised in the imaging system by making the system project the virtual image, and the overall optical system has the image source functioning as the object surface, and the retina functioning as the image surface. The ordinary projection systems may be classified into the illumination system and the imaging system, wherein the field curvature virtual image display system and the human eye's optical system are combined into the imaging system in the projection system; and the illumination system provides the light source for the image source and significantly affects the system efficiency and the frame uniformity. Various kinds of image sources need the illumination systems with the individual specifications to achieve the best effect of the system. The reflective image sources are mainly classified into the digital micromirror device (DMD) and the liquid crystal on silicon (Liquid Crystal on Silicon, LCOS), and have the advantages regarding the aperture ratio, the resolution and the optical efficiency. FIGS. 8A and 8B show the light operation mode of the digital micromirror device, and FIGS. 8C and 8D show the light operation mode of the liquid crystal on silicon. It is obtained, from the operation modes, that the system having the sufficiently large back focus prism (set) can satisfy both the requirements of the illumination systems of the two image sources.

It is to be additionally described that the need of designing the back focus prism (set) is only present when the field curvature virtual image display system needs to concurrently introduce the reflective image source, the transmissive image source and the self-emissive image source, and that the presence of the back focus prism (set) does not affect the field curvature virtual image display system itself. If the system only adopts the transmissive or self-emissive image source, such as LCD, OLED, mLED, the back focus prism (set) needs not to be introduced into the system.

Figure 9A:
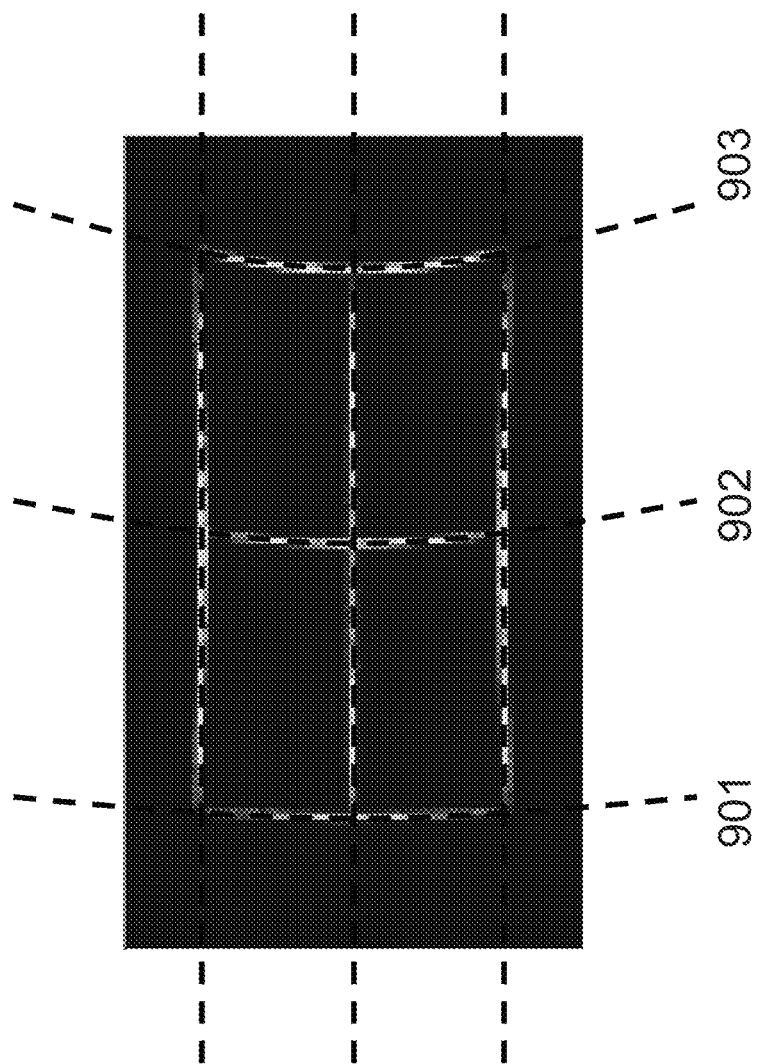
FIG. 9A is a schematic view showing the fitting of the moon shape distortion of the virtual image of FIG. 5D using the radius of curvature.

The invention proposes a fifth view point of adjusting the electronic signal of the image source to generate an early distortion to improve the phenomenon of the curved lines of the frame mentioned in the sixth characteristic of the first view point of the invention. Regarding the phenomenon of the curved lines of the frame occurred in the system, the electronic signal of the image source needs to be adjusted to generate an early distortion to improve a sagittal moon shape distortion or a meridional moon shape distortion, wherein the method of adjusting the electronic signal of the image source is to control the radius of curvature of the middle straight line of the frame to become infinity. It is observed from FIG. 5D that the frame has the slightly sagittal moon shape distortion. Referring to FIG. 9A, the curved lines occurred due to the distortions at the left boundary, the middle and the right boundary thereof have the absolute values of the radii of curvature represented by 901, 902 and 903, respectively. It is observed from FIG. 9A that the radii of curvature 901>902>903. Adjusting the electronic signal of the image source to make the absolute value of the radius of curvature 902 passing through the center of the virtual image frame become infinity to improve the moon shape distortion. As shown in FIGS. 9B-1 and 9B-2, the signal adjustment is utilized to shift all pixels of each row of the frame. When the radius of curvature 902 is adjusted to become infinity and the radius of curvature 902' so that the curve at the middle becomes the straight line state, the curved direction of the left boundary can be reversed and the curving extent of the right boundary can be decreased, so that the frame becomes geometrically symmetrical. Compared with the system where the keystone distortion occurs, the above-mentioned adjustment method can significantly decrease the pixel consumption and solve the problem of image distortion.

The invention proposes a sixth view point of making the second imaging group in the projection lens set of the field curvature virtual image projection system have diopters or have no diopter to satisfy the needs of a person with healthy eyesight, a myopic person and a hyperopic person upon observing the external environment. Referring to FIG. 5A, the second imaging group 206 in the system 5000 has the partial reflection and partial transmission surface 505 and the antireflection surface 506, so that the second imaging group 206 has diopters when the surface difference is present between the two surfaces.

The invention proposes a seventh view point of adjusting the back focus air gap of the field curvature virtual image projection system to make the person with healthy eyesight, the myopic person or the hyperopic person observe a clear virtual image of a system.

Figure 10A:
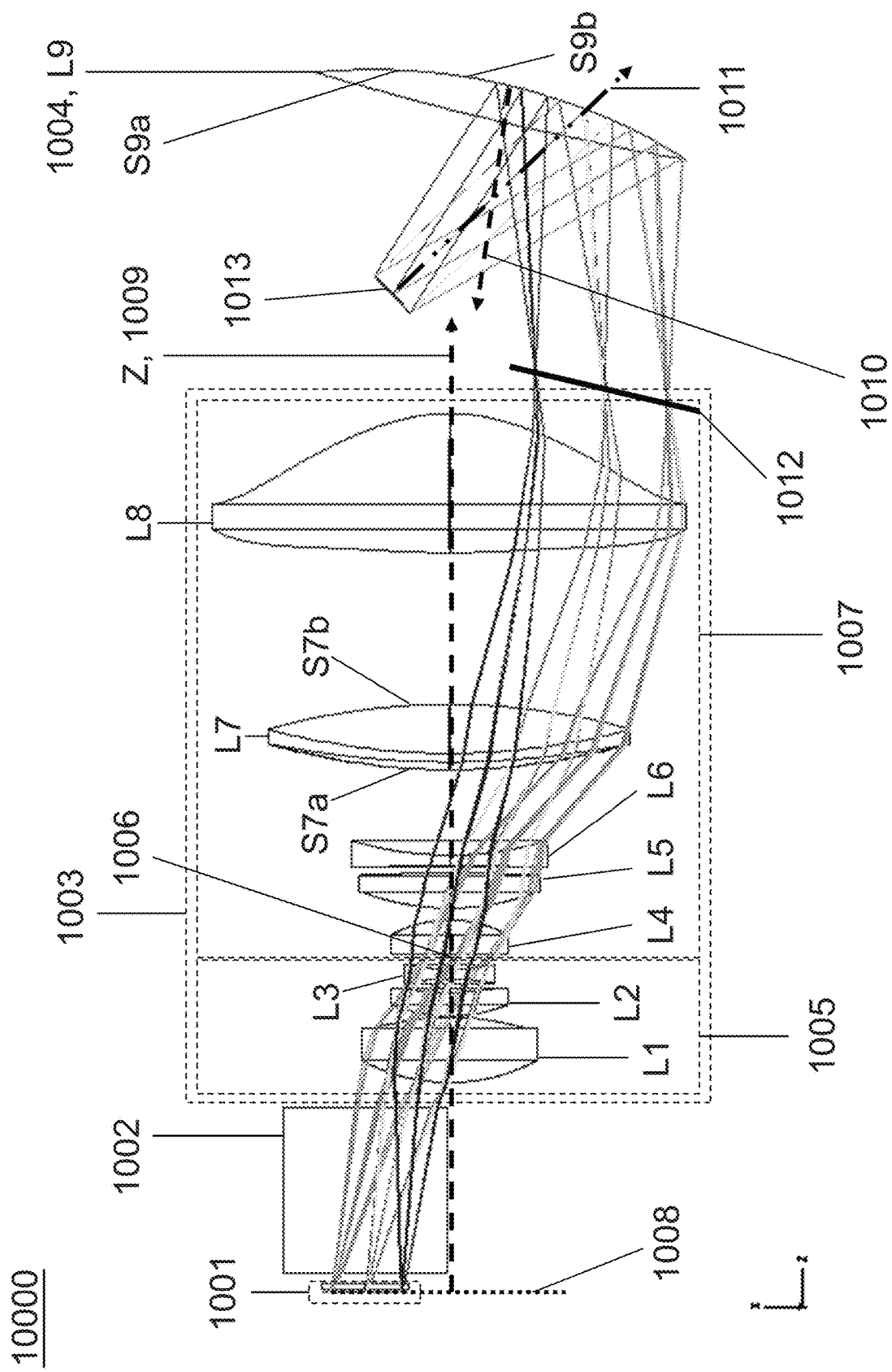
FIG. 10A is a schematic view showing the light path of the field curvature virtual image display system 10000 of the embodiment of the invention when the system's first optical axis is coaxial with the Z-axis and the back focus light path is the straight light path.

The invention proposes a field curvature virtual image display system 10000 functioning as an embodiment. As shown in FIG. 10A, the field curvature virtual image display system 10000 comprises an objective plane 1008, an image source 1001 disposed in a partial region of the objective plane 1008, a back focus prism (set) 1002, a first imaging group 1003 and a second imaging group 1004. The first imaging group 1003 comprises a front lens group 1005, a pupil 1006 and a back lens group 1007. Based on a light travelling direction, the elements in the front lens group 1005 comprise an aspheric lens L1, a spherical lens L2 and an aspheric lens L3 in order; the elements in the back lens group 1007 comprise a spherical lens L4, a spherical lens L5, a spherical lens L6, a toroidal lens L7 and an aspheric lens L8, wherein the toroidal lens L7 comprises a light input surface S7a and a light output surface S7b; and the pupil 1006 is disposed between the front lens group 1005 and the back lens group 1007. The first imaging group 1003 is coaxial with a first optical axis 1009. The second imaging group 1004 comprises a toroidal lens L9 having a second optical axis 1010 different from the first optical axis 1009. The toroidal lens L9 comprises a surface S9a facing the human eye and a surface S9b facing the external environment, wherein the surface S9a has the partial reflection and partial transmission functions and pertains to one portion of the virtual imaging system; and the surface S9b has the anti-reflective function and does not pertain to one portion of the virtual imaging system. The toroidal lens L9 in the system 10000 functions as an image combiner. An eye relief of 26 mm is present between the exit pupil 1013 of the system 10000 and the toroidal lens L9. The exit pupil 1013 has the maximum effective diameter of 5 mm and overlaps with the pupil of the human eye, and has an eye's optical axis 1011 different from the first optical axis 1009 and the second optical axis 1010.

According to the first view point of the invention, as shown in FIG. 10A, the objective plane 1008 of the imaging system is imaged, by the first imaging group 1003, into a real image 1012 disposed within the focal length of the second imaging group 1004 so that the system generates a virtual image surface having the concave surface type of field curvature. The area of the image source 1001 is located within a partial region of the objective plane 1008, so the virtual image frame is also located in a partial region of the virtual image surface having the concave surface type of field curvature. In FIG. 10A, the X-axis represents the system's sagittal direction, and the Y-axis represents the system's meridional direction. According to the fourth characteristic of the first view point of the invention, it is obtained that this embodiment relates to the sagittal lateral projection according to the offset from the center of the image source 1001 to the center of the objective plane 1008, wherein an included angle is formed between the first optical axis 1009 and the eye's optical axis 1011. In this embodiment, the included angle is 46.3°.

According to the second view point of the invention, as shown in FIG. 10A, displacement and rotation of the second optical axis 1010 relative to the first optical axis 1009 on the sagittal plane occur.

According to the third view point of the invention, as shown in FIG. 10A, the reflection surface S9a of the second imaging group 1004 is the toroidal surface. In addition, the surface S7a and the surface S7b of the toroidal lens L7 of the back lens group 1007 also pertain to the toroidal surface.

Figure 10B:
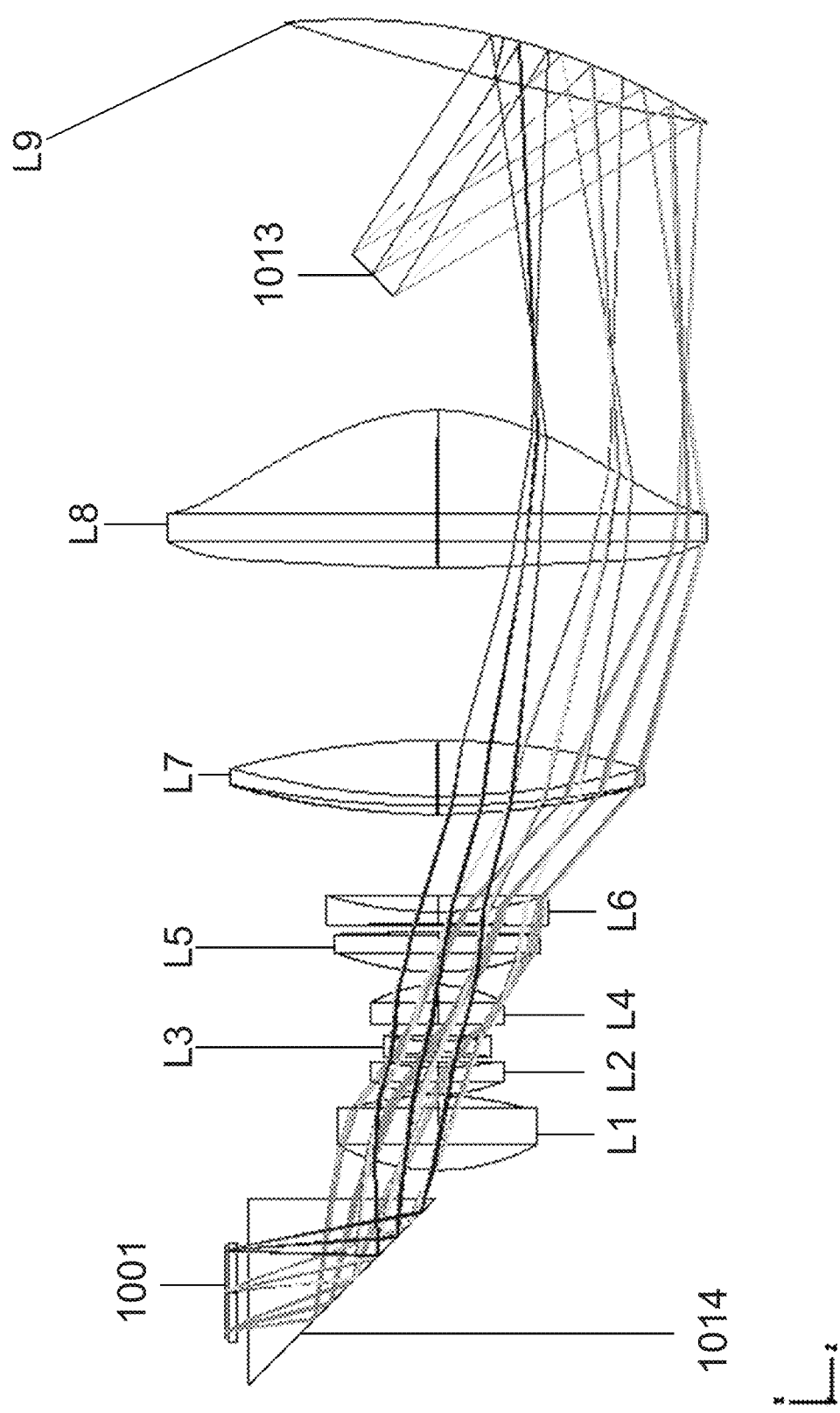
FIG. 10B is a schematic view showing the light path after the back focus prism of FIG. 10A is replaced with the right angle prism.
Figure 10C:
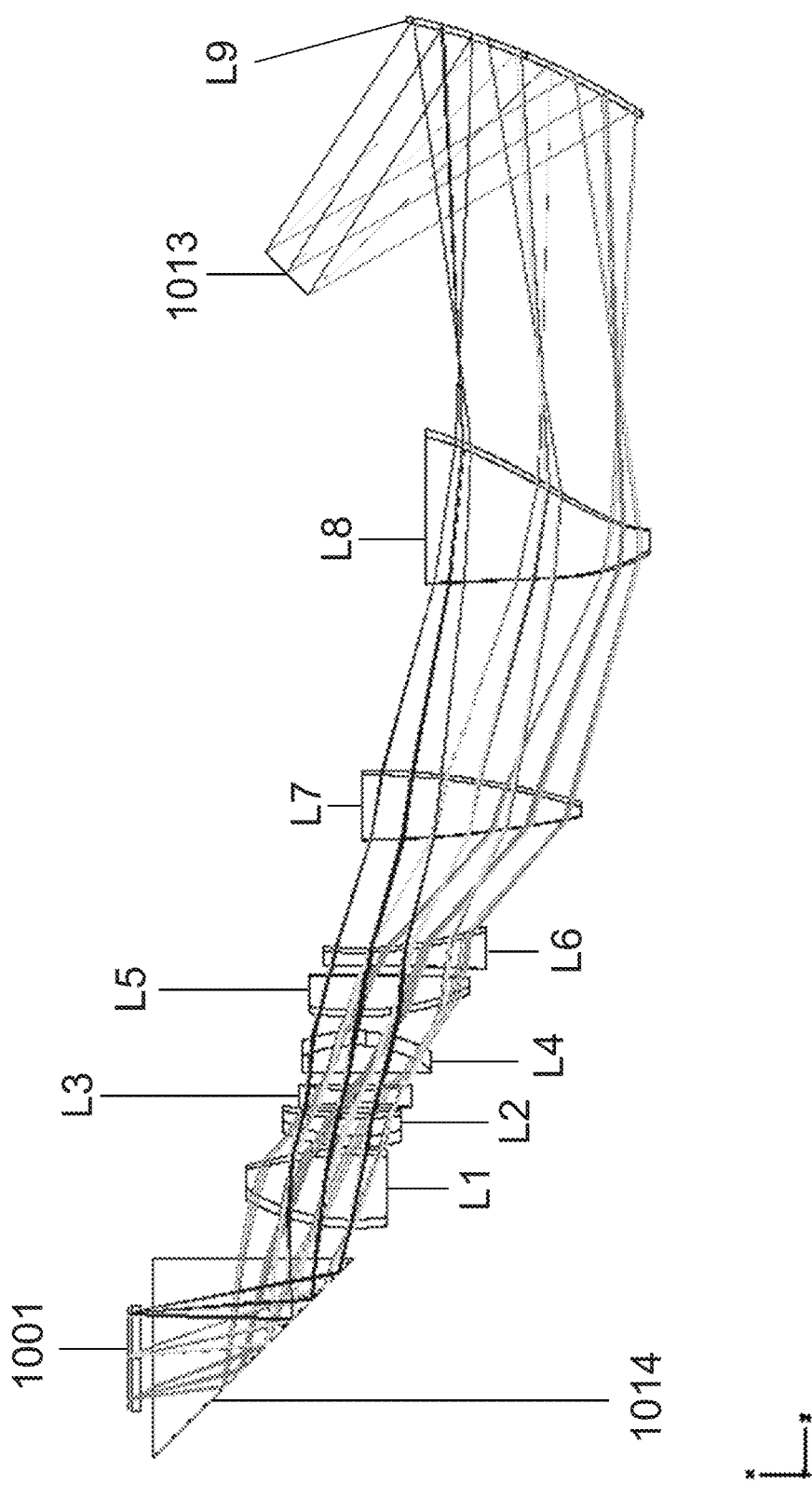
FIG. 10C is a is a schematic view showing the light path after the invalid region of the element in FIG. 10B is cut off.
Figure 10D:
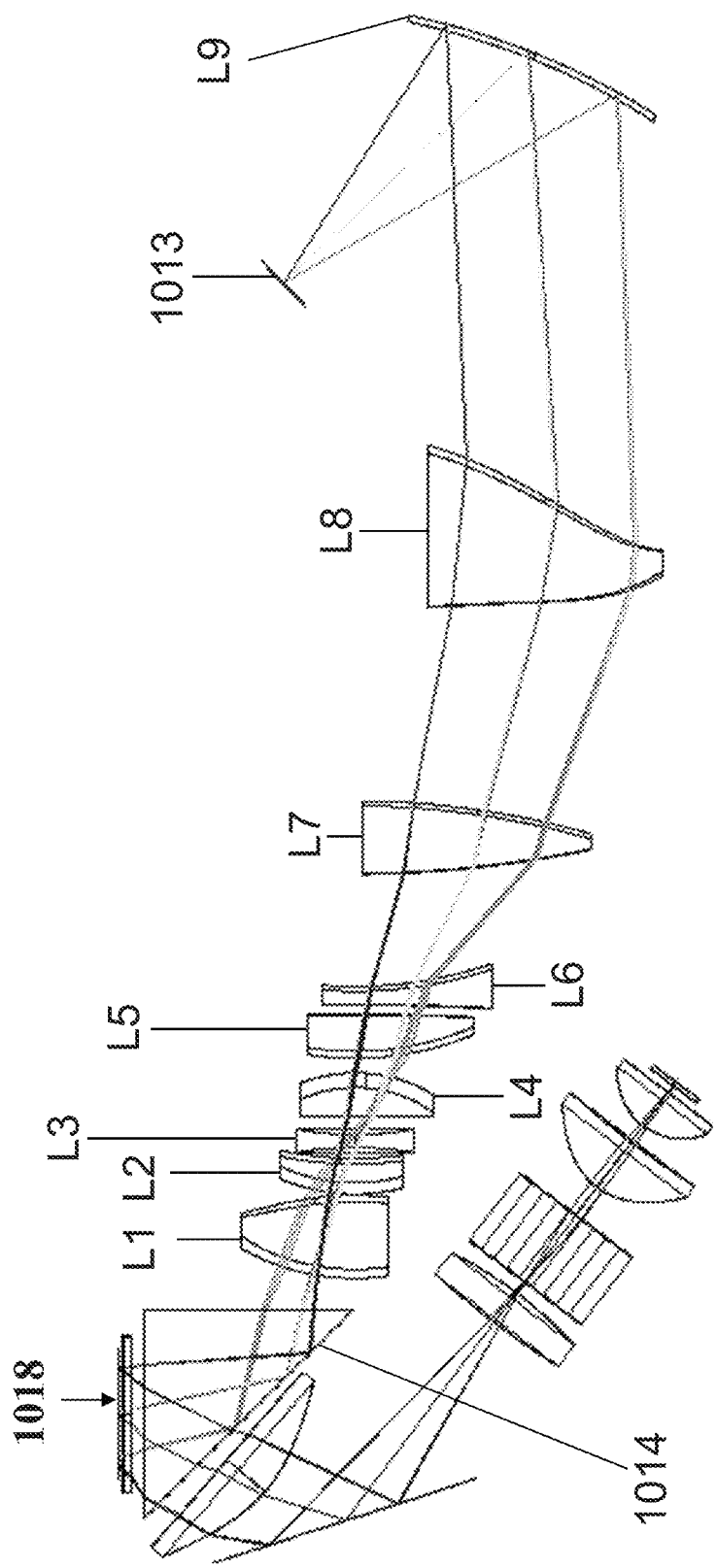
FIG. 10D is a schematic view showing the light path after FIG. 10C coordinates with the digital micromirror device and the illumination system thereof.
Figure 10E:
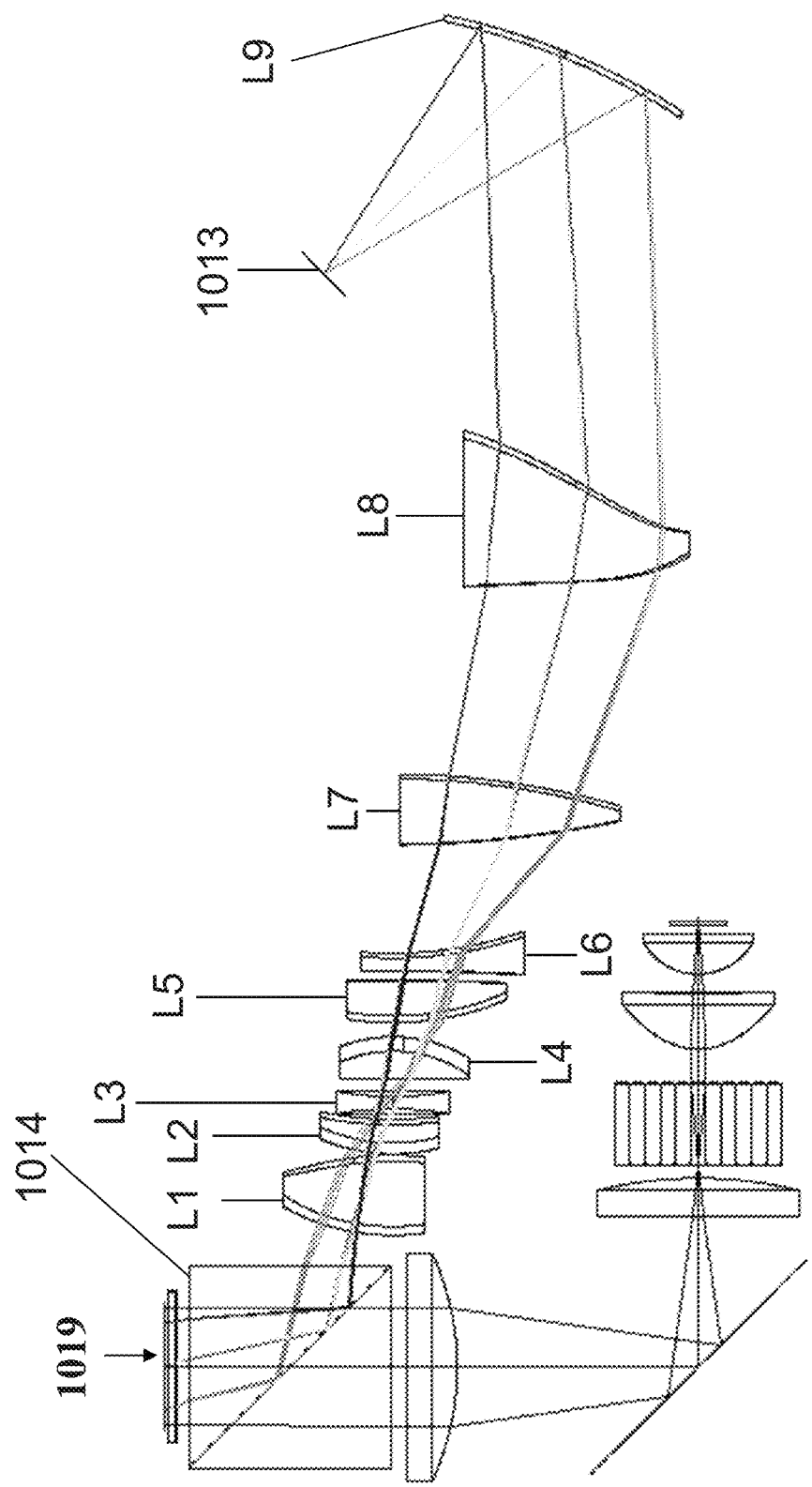
FIG. 10E is a schematic view showing the light path after FIG. 10C coordinates with the liquid crystal on silicon and the illumination system thereof.
Figure 10F:
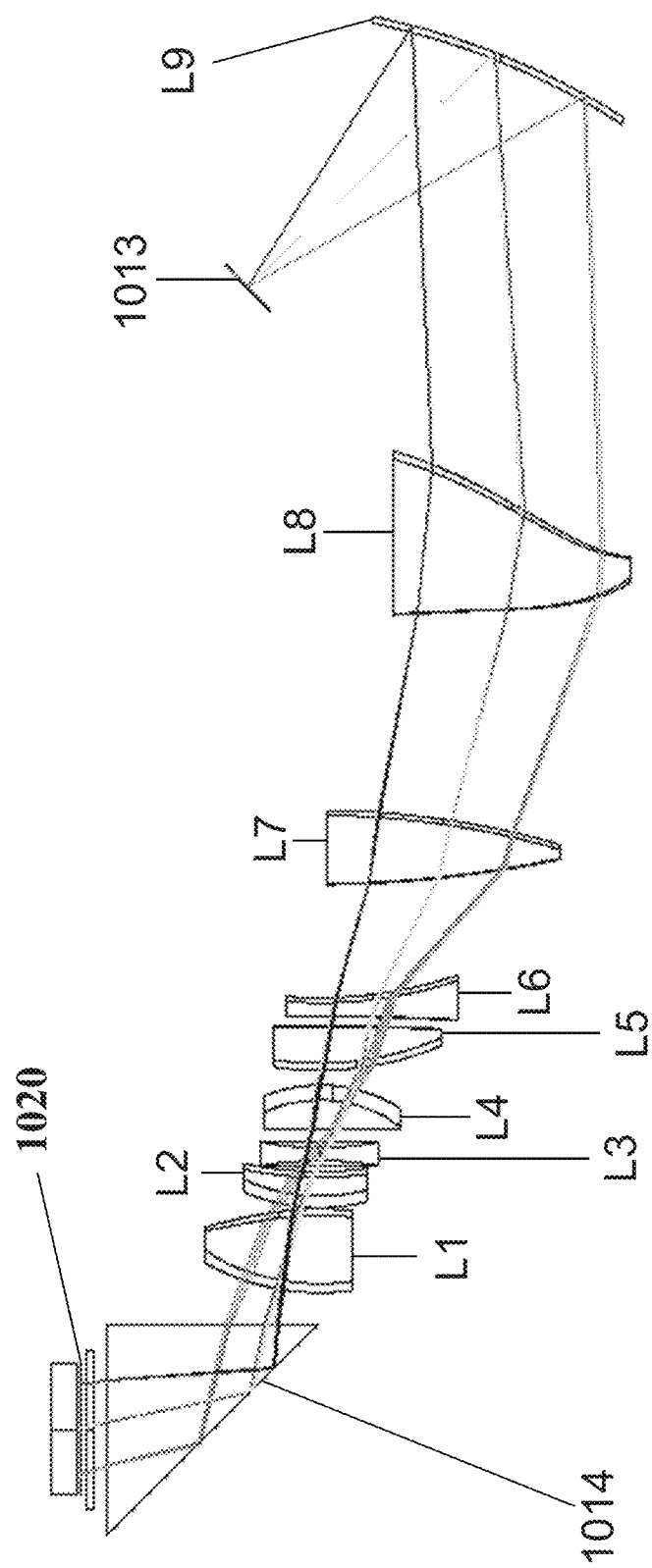
FIG. 10F is a schematic view showing the light path after FIG. 10C coordinates with the liquid crystal display and the illumination system thereof.
Figure 10G:
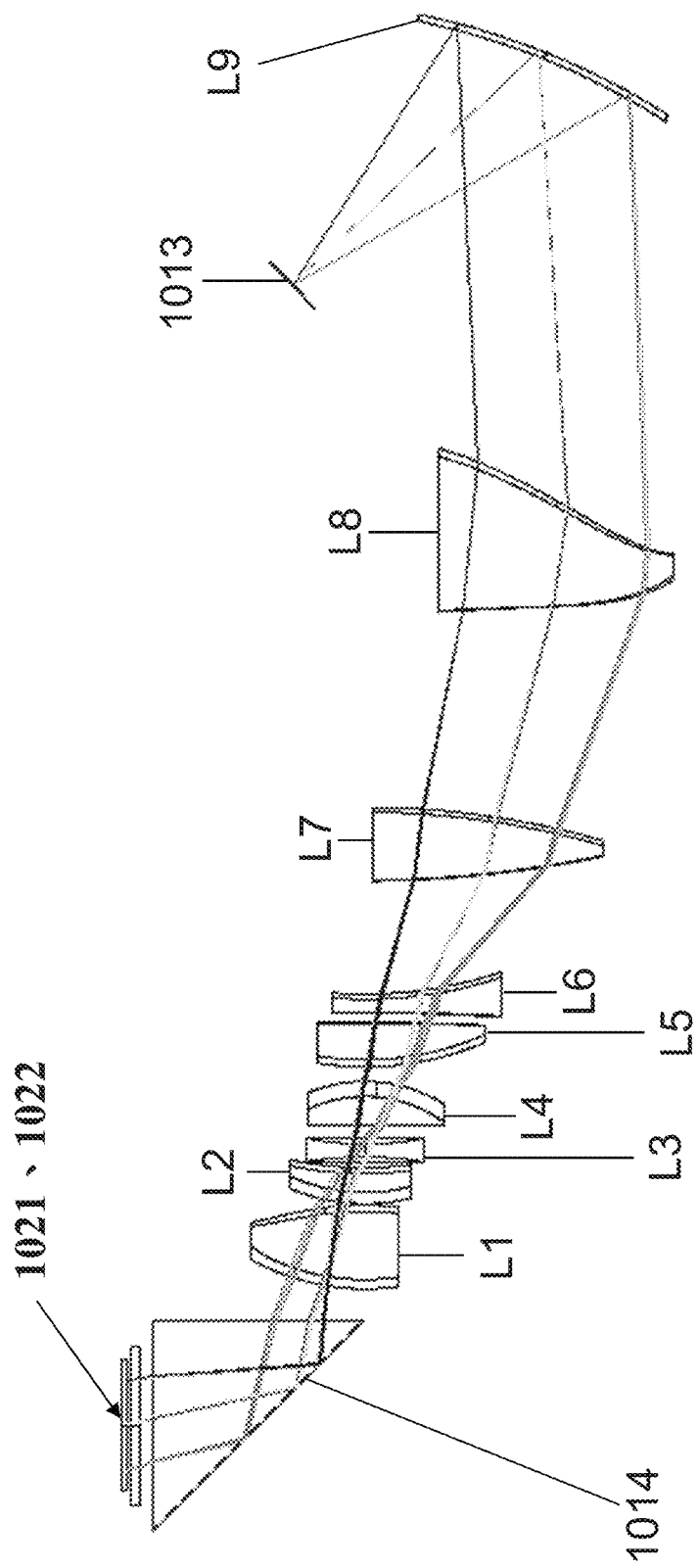
FIG. 10G is a schematic view showing the light path after FIG. 10C coordinates with the organic light emitting diode or the micro light emitting diode array.

According to the fourth view point of the invention, the back focus material of the system has the sufficient thickness to respond with the introduction of the reflective image source. The back focus material of FIG. 10A is created into a right angle prism, as shown in FIG. 10B, the light path of the field curvature virtual image display system 10000 is turned by 90° through a right angle prism 1014, and it is observed that all the light rays are indeed sufficient to pass through the right angle prism 1014. As shown in FIG. 10C and according to the fifth characteristic of the first view point of the invention, the invalid region of the element is cut off. FIG. 10D represents a specific implementation when a digital micromirror device (DMD) 1018 functioning as the image source is used in this embodiment. FIG. 10E represents one of the specific implementations when a liquid crystal on silicon (LCOS) 1019 functioning as the image source is used in this embodiment. FIG. 10F represents one of the specific implementations when a liquid crystal display (LCD) 1020 functioning as the image source is used in this embodiment. FIG. 10G represents one of the specific implementations when an organic light emitting diode (OLED) 1021 and a micro light emitting diode array (mLED) 1022 functioning as the image source are used in this embodiment. In the field curvature virtual image display system, the back focus length and material may have different design values according to the system requirements, and wherein the design values comprise other parameters, such as the field angle, the included angle between the first imaging group and the eye's optical axis and the eye relief so that a flexible adjustment space is obtained.

Figure 10H:
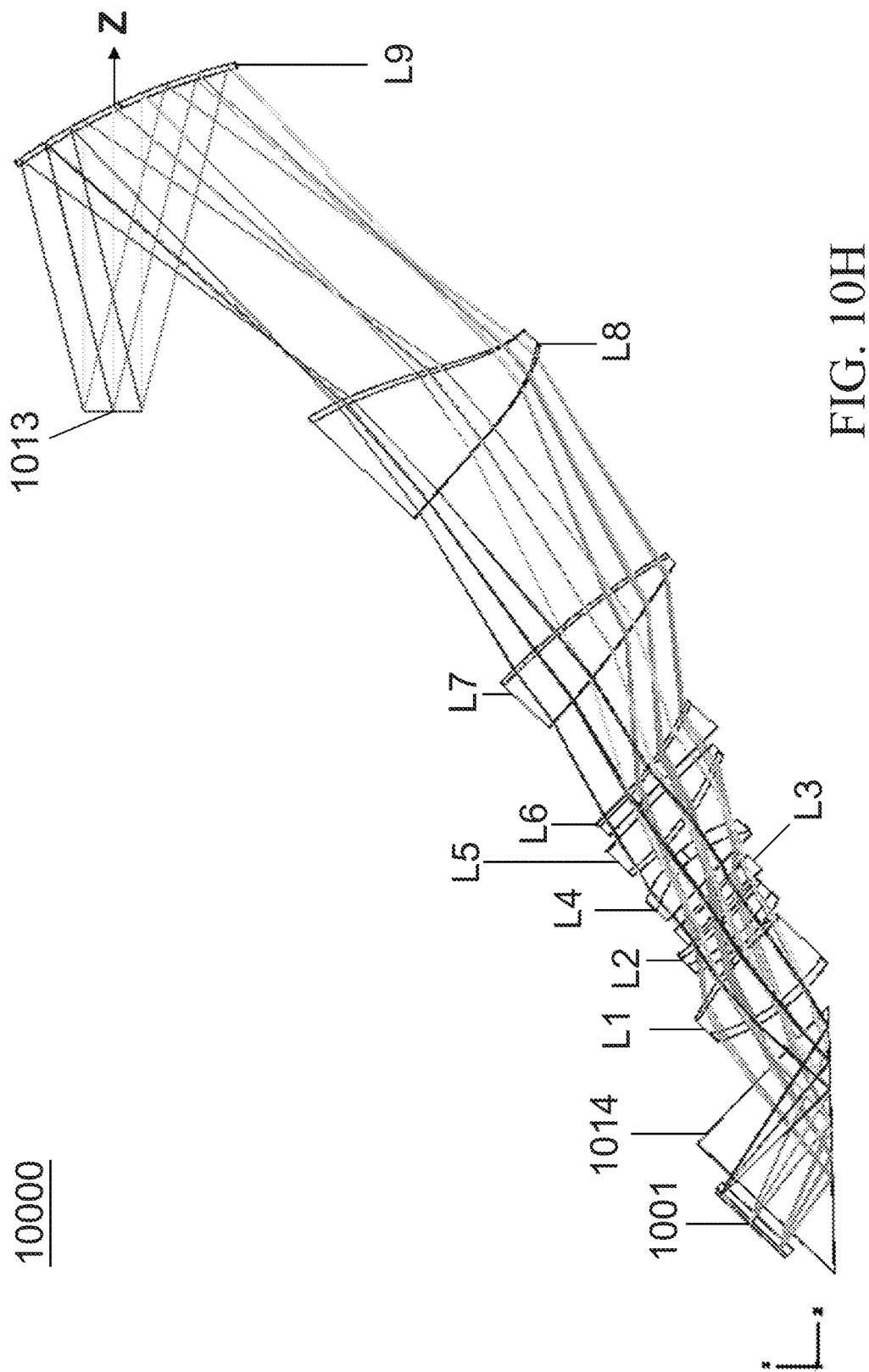
FIG. 10H is a schematic view showing the light path after the field curvature virtual image display system 10000 of FIG. 10C is rotated and displaced such that its exit pupil optical axis is coaxial with the Z-axis.
Figure 10I:
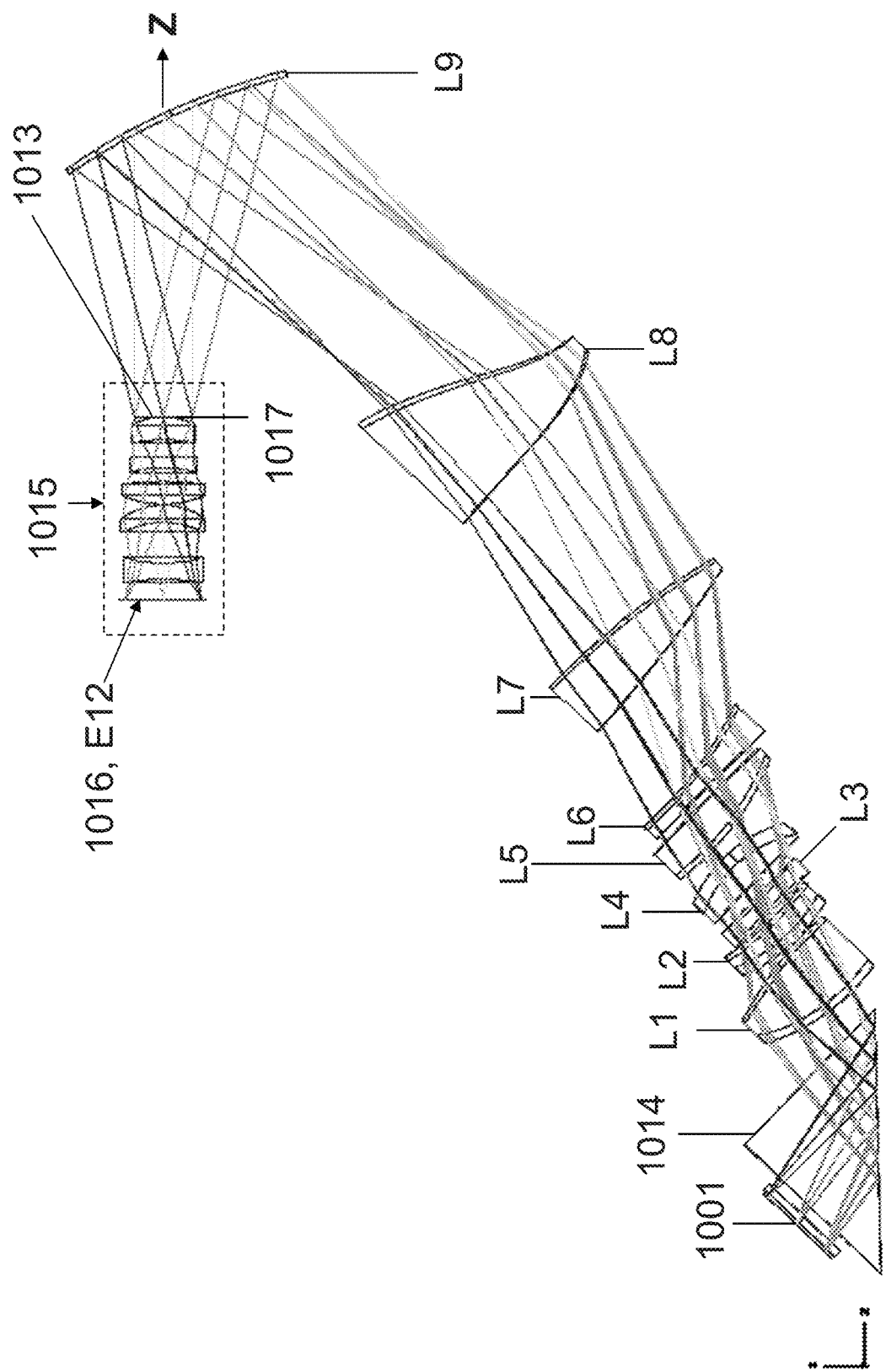
FIG. 10I is a schematic view showing a light path after an eye-like optical system 1015 is introduced into FIG. 10H to make the exit pupil of the field curvature virtual image display system 10000 overlap with the entrance pupil of the eye-like optical system.
Figure 10J:
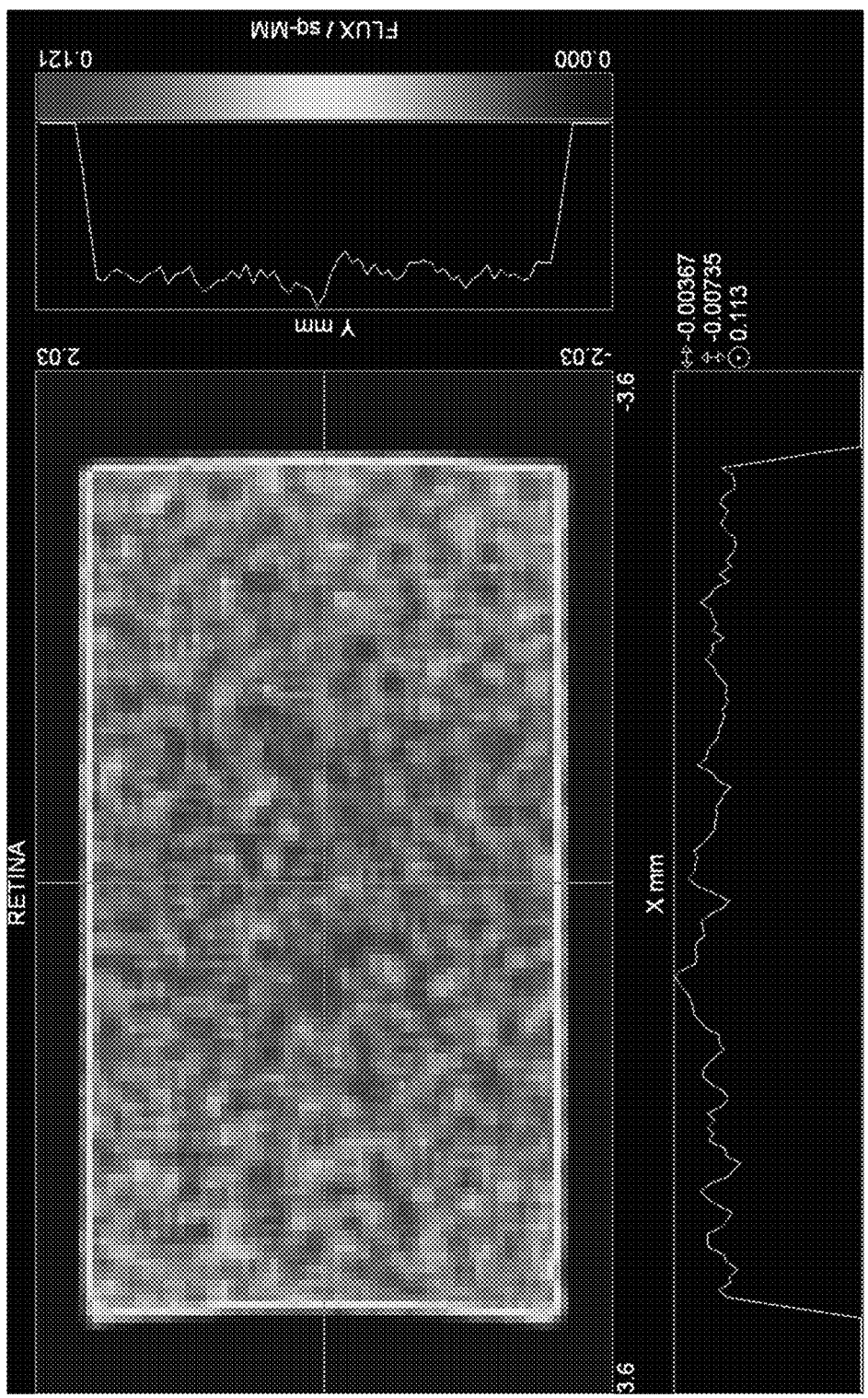
FIG. 10J is a simulation chart showing the global image and the illumination distribution when light tracing using the wavelength of 520 nm is performed on a retina-like surface 1016 of FIG. 10I.

It is essential to verify the field curvature virtual image display system 10000 using the true light tracing to perform the optical simulation. However, the virtual image cannot be received by the screen, the eye-like optical system capable of simulating the human eye function must be configured for the true light tracing, and the retina-like element in the eye-like optical system receives the virtual image. As shown in FIG. 10H, the eye's optical axis is firstly defined as directly to the positive Z-axis. Because the exit pupil must be coaxial with the eye, the field curvature virtual image display system 10000 is adjusted to rotate and displace until the exit pupil is coaxial with the Z-axis. Next, as shown in FIG. 10I, an eye-like optical system 1015 is introduced into the field curvature virtual image display system 10000, and the positions of the former entrance pupil and the later exit pupil overlap. After the model is established, the image source functions as the light source of the simulation system to perform the light tracing to obtain the light distribution on the surface of a retina-like element 1016 (E12), as shown in FIG. 10J, and the human eye observes the frame presenting the sagittal moon shape distortion. According to the fourth characteristic of the first view point of the invention, this embodiment relates to the sagittal lateral projection; according to the sixth characteristic of first view point of the invention, the virtual image generated through the image source in this embodiment presents the sagittal moon shape distortion, and the longitudinal lines of the frame are curved; according to the fifth view point of the invention, the sagittal moon shape distortion may utilize the electronic signal to perform the early distortion, so that the radius of curvature of the longitudinal line at the center of the frame becomes infinity to improve the distortion conditions of the full frame.

According to the six view point of the invention, the surface shape of the surface S9b is configured to coordinate with the surface S9a to make the toroidal lens L9 have diopters or have no diopter to satisfy the requirements of the person with healthy eyesight, the myopic person and the hyperopic person upon observing the external environment.

According to the seventh view point of the invention, the air gap between the image source 1001 and the aspheric lens L1 is adjusted so that the person with healthy eyesight, the myopic person and the hyperopic person can observe a clear virtual image of a system.

The parameter and the detailed layout of each of the elements from the virtual image surface to the image source in the field curvature virtual image display system 10000 of this embodiment are listed in Table 1. The parameter and the detailed layout of each of the elements from the virtual image surface to the retina-like element 1016 (E12) in the eye-like optical system are listed in Table 2.

TABLE 1

| Element | Surface | Optical Parameter | | Position/Direction | | Glass |
|---|---|---|---|---|---|---|
| Image | 0 | Radius | Infinity | Thickness | −10000 | |
| Stop | 1 | Radius | Infinity | Thickness | 22.132003 | |
| | | | | Decenter X | 6.975013 | |
| | | | | Tilt about Y | 33.037955 | |

TABLE 1-continued

| Element | Surface | Optical Parameter | | Position/Direction | | Glass |
|---|---|---|---|---|---|---|
| L9 | 2 | Radius | −56.618338 | Tilt about Y | −33.037955 | Mirror |
| | (Toroidal) | k | 0.605373 | Decenter X | −6.975013 | |
| | | 4th | 9.443675E−07 | Thickness | −22.132003 | |
| | | 6th | −2.065539E−09 | Thickness | −4.021234 | |
| | | 8th | 5.206919E−12 | Decenter X | −12.177862 | |
| | | 10th | −4.515460E−15 | Tilt about Y | 46.31651 | |
| | | Rotation | −49.013742 | | | |
| L8 | 3 | Radius | −17.894895 | Thickness | −13.491259 | E48R |
| | (Asphere) | k | −1.181412 | | | |
| | | 4th | 3.727658E−05 | | | |
| | | 6th | −1.218285E−07 | | | |
| | | 8th | 2.394888E−10 | | | |
| | | 10th | −1.497305E−13 | | | |
| L8 | 4 | | 89.710518 | Thickness | −14.759218 | |
| | (Asphere) | k | −12.490983 | | | |
| | | 4th | −2.013214E−05 | | | |
| | | 6th | 3.985655E−08 | | | |
| | | 8th | −1.705696E−12 | | | |
| | | 10th | −9.871562E−15 | | | |
| L7 | 5 | Radius | −65.786236 | Thickness | −5.570949 | L-LAM60 |
| | (Toroidal) | Rotation | −35.018314 | | | |
| L7 | 6 | Radius | 85.395283 | Thickness | −9.078914 | |
| | (Toroidal) | k | −3.020577 | | | |
| | | Rotation | −200.27881 | | | |
| L6 | 7 | Radius | 33.266389 | Thickness | −1 | N-LASF9 |
| L6 | 8 | Radius | −193.223169 | Thickness | −0.746089 | |
| L5 | 9 | Radius | −181.024606 | Thickness | −3.408173 | N-PK52A |
| L5 | 10 | Radius | 23.595515 | Thickness | −1.125203 | |
| L4 | 11 | Radius | −11.522298 | Thickness | −3.279703 | N-BK7 |
| L4 | 12 | Radius | −287.989858 | Thickness | −1.483254 | |
| L3 | 13 | Radius | 23.909386 | Thickness | −1 | POLYCARB |
| | (Conical) | k | 0.322136 | | | |
| L3 | 14 | Radius | −31.34214 | Thickness | −1.252287 | |
| | (Asphere) | k | 13.237412 | | | |
| | | 4th | −8.927648E−05 | | | |
| | | 6th | 7.770788E−07 | | | |
| | | 8th | −3.087387E−08 | | | |
| | | 10th | 8.167959E−10 | | | |
| L2 | 15 | Radius | 28.422161 | Thickness | −2.321091 | N-BK7 |
| L2 | 16 | Radius | 14.700679 | Thickness | −0.1 | |
| L1 | 17 | Radius | −23.909424 | Thickness | −6.383859 | E48R |
| | (Asphere) | k | −3.626439 | | | |
| | | 4th | 2.456344E−06 | | | |
| | | 6th | 3.251977E−08 | | | |
| | | 8th | 2.082992E−09 | | | |
| | | 10th | 1.000000E−12 | | | |
| L1 | 18 | Radius | 18.111336 | Thickness | −2.454559 | |
| | (Asphere) | k | 1.169103 | Decenter X | 8.178851 | |
| | | 4th | −2.298026E−05 | | | |
| | | 6th | −2.741352E−07 | | | |
| | | 8th | 1.336042E−09 | | | |
| | | 10th | 1.131613E−11 | | | |
| Prism | 19 | Radius | Infinity | Thickness | −8 | N-PK51 |
| | | | | Tilt about Y | 45 | |
| Prism | 20 | Radius | Infinity | Tilt about Y | 45 | (TIR) |
| | | | | Thickness | 8 | |
| Prism | 21 | Radius | Infinity | Thickness | 1 | |
| CG | 22 | Radius | Infinity | Thickness | 0.65 | B270 |
| CG | 23 | Radius | Infinity | Thickness | 0.3 | |
| Object | 24 | Radius | Infinity | — | | |

TABLE 2

| Element | Surface | Optical Parameter | | Position/Direction | | Glass |
|---|---|---|---|---|---|---|
| Image | E0 | Radius | Infinity | Thickness | 10000 | |
| Entrance Pupil | E1 | Radius | Infinity | Thickness | 0 | |
| EL1 | E2 | Radius | 5.493752 | Thickness | 2.021635 | N-BAK4 |
| | (Asphere) | k | −3.309628 | | | |
| | | 4th | 2.594518E−03 | | | |
| | | 6th | 4.371313E−05 | | | |
| | | 8th | −8.505970E−06 | | | |
| | | 10th | 7.900746E−07 | | | |

TABLE 2-continued

| Element | Surface | Optical Parameter | | Position/Direction | | Glass |
|---|---|---|---|---|---|---|
| EL1 | E3 | | 16.391415 | Thickness | 1.494945 | |
| | (Asphere) | k | −48.45117 | | | |
| | | 4th | 2.416813E−03 | | | |
| | | 6th | 1.689205E−05 | | | |
| | | 8th | −5.112436E−06 | | | |
| | | 10th | 1.056993E−06 | | | |
| EL2 | E4 | Radius | −48.505582 | Thickness | 0.905333 | N-SF6 |
| EL2 | E5 | Radius | 9.48541 | Thickness | 1.207873 | |
| EL3 | E6 | Radius | 24.759004 | Thickness | 1.954798 | N-LAK7 |
| EL3 | E7 | Radius | −8.857531 | Thickness | 0.079257 | |
| EL4 | E8 | Radius | 6.040043 | Thickness | 1.508081 | N-LAK7 |
| EL4 | E9 | Radius | 7.319155 | Thickness | 3.491897 | |
| EL5 | E10 | Radius | −90.298185 | Thickness | 1.413324 | N-SK2 |
| | (Asphere) | k | −65.612611 | | | |
| | | 4th | −4.735123E−03 | | | |
| | | 6th | −2.457321E−05 | | | |
| | | 8th | 1.651756E−05 | | | |
| | | 10th | −6.002100E−07 | | | |
| EL5 | E11 | Radius | 8.758766 | Thickness | 1.820418 | |
| | (Asphere) | k | −11.701601 | | | |
| | | 4th | −2.074143E−03 | | | |
| | | 6th | −1.404162E−04 | | | |
| | | 8th | 1.950823E−05 | | | |
| | | 10th | −5.562174E−07 | | | |
| Retina | E12 | Radius | Infinity | | | — |

The above-mentioned embodiments have comprise all the view points and characteristics proposed in the summary of the invention. In the following, various patterns and analysis data functioning as the evidence of performance of the field curvature virtual image display system 10000 will be provided.

Figure 11A:
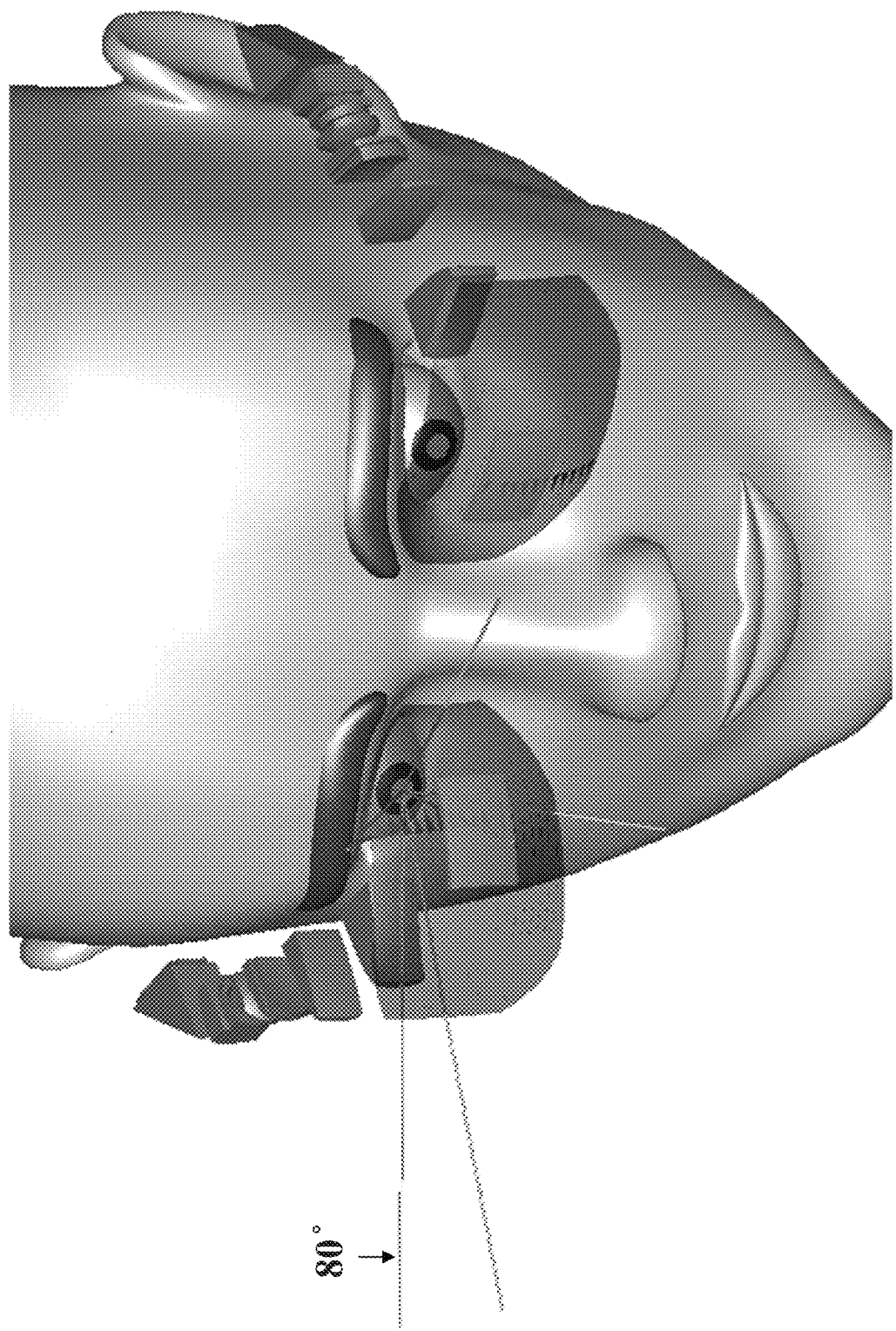
FIG. 11A shows a three-dimensional model diagram when the field curvature virtual image display system of the embodiment of the invention is worn on the standard-size head model.
Figure 11B:
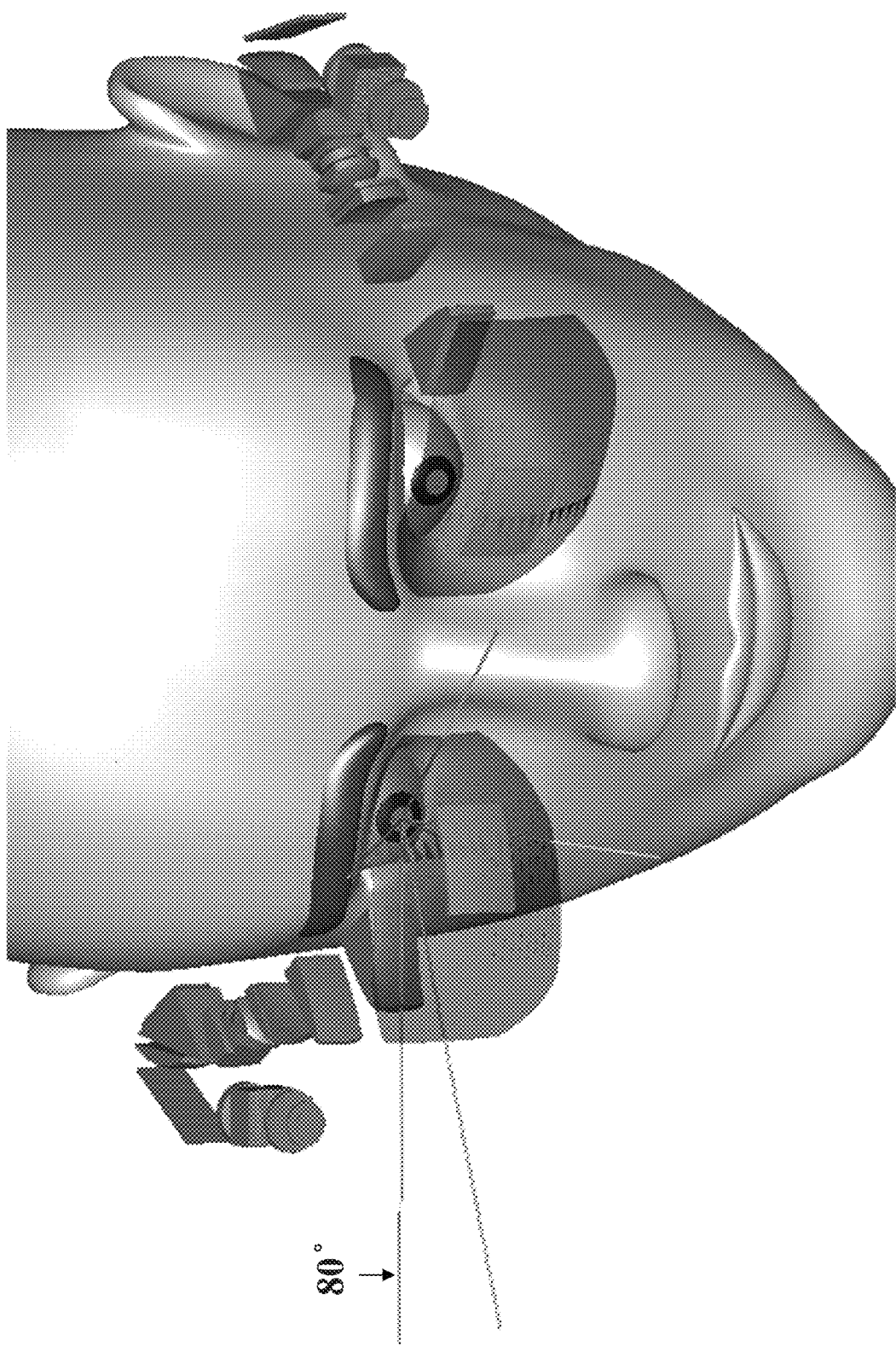
FIG. 11B shows a three-dimensional model diagram after the field curvature virtual image display system of the embodiment of the invention coordinates with the digital micromirror device and the illumination system thereof is worn on the standard-size head model.
Figure 11C:
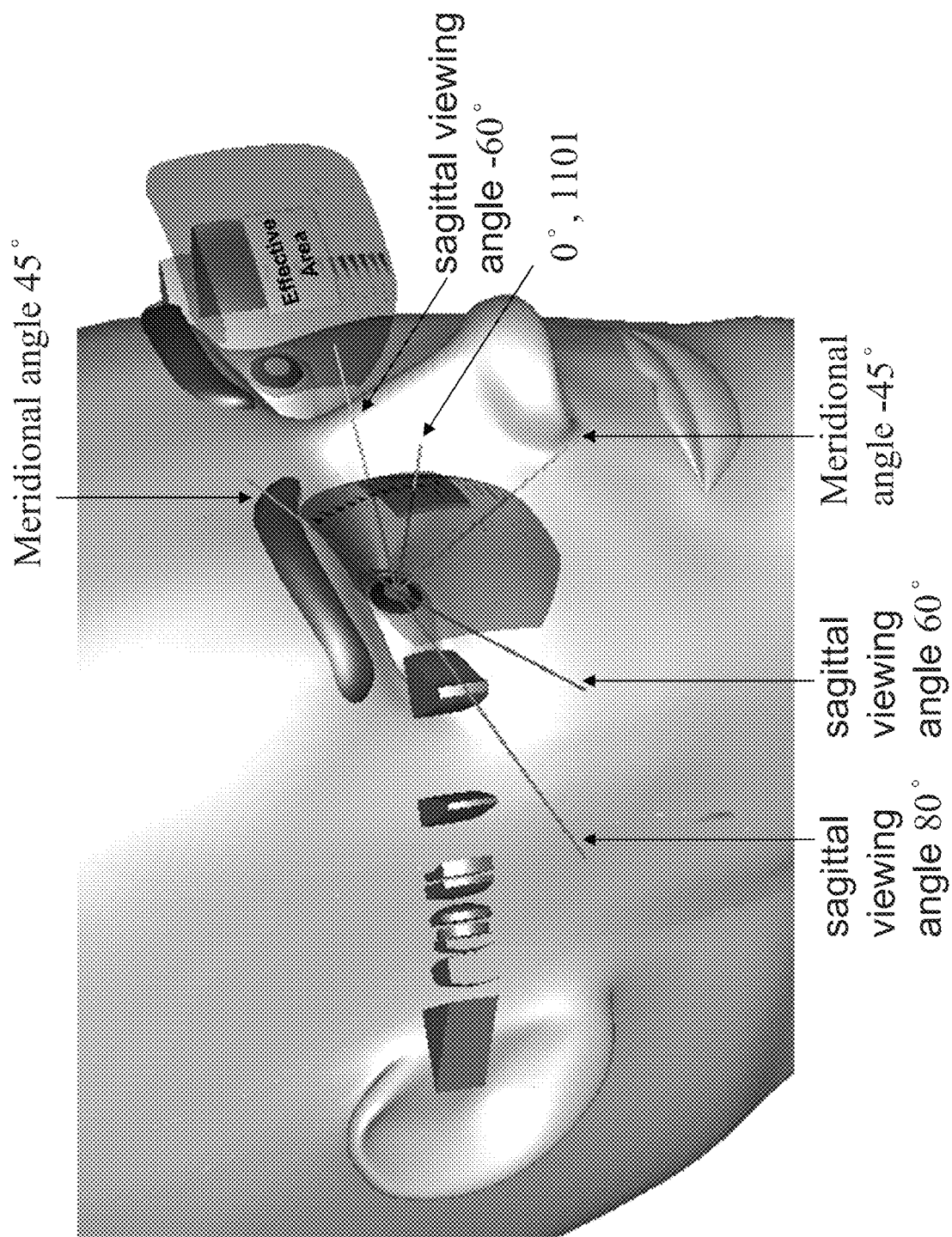
FIG. 11C is a schematic view showing the correlation between the image combiner of the field curvature virtual image display system of the embodiment of the invention and the human eye's viewing angle.

When this embodiment works with the image source, such as the liquid crystal display, the organic light emitting diode or the micro light emitting diode array, the overall system has the smaller volume. FIG. 11A shows the condition when the embodiment works with the organic light emitting diode and is worn on the standard-size head model. When this embodiment works with the image source, such as the digital micromirror device or the liquid crystal on silicon, the overall system has the larger volume. FIG. 11B shows the condition when this embodiment works with the digital micromirror device and is worn on the standard-size head model. It is observed from FIGS. 11A and 11B that the device cannot interfere with the head tissue, and the first imaging group also can avoid the lateral field of vision of the human eye to reach the angle of 80°. As shown in FIG. 11C, in order to stop the field of vision from encountering the visual obstruction caused by the lens edge in the wider range, the size of the image combiner can be enlarged to cover at least the sagittal viewing angle of ±60° and the meridional viewing angle of ±45°. In this case, the virtual image frame comes from a partial region of the image combiner, and an eye's optical axis 1101 passes through the virtual image and the center of the external environment field of vision.

Figure 12A:
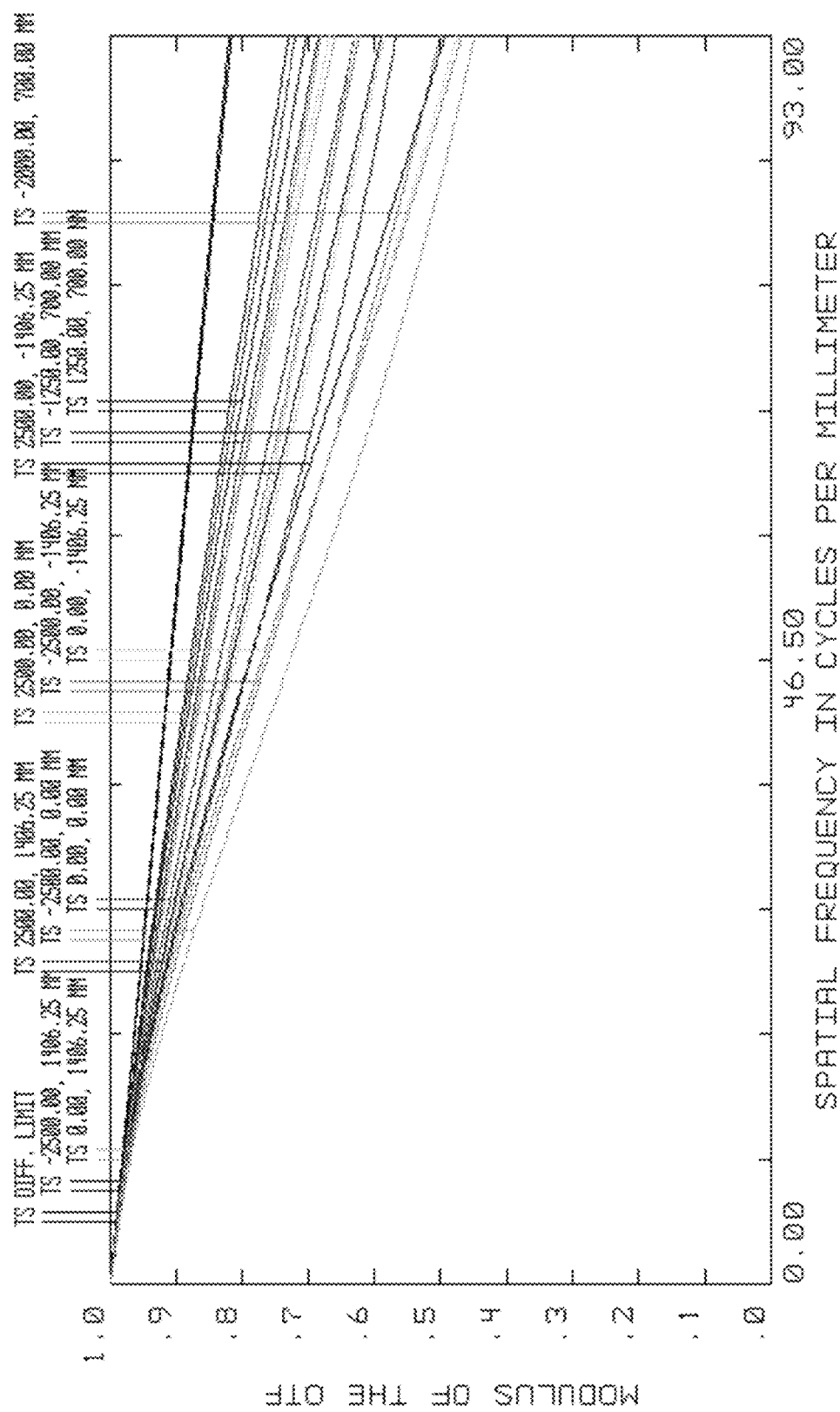
FIG. 12A is a modulation transfer function diagram showing the conjugate surface of the virtual image of the field curvature virtual image display system of the embodiment of the invention.
Figures 1, 12B:
Figures 2, 12B:
Figures 3, 12B:

FIG. 12A uses the modulation transfer function (MTF) to show the clarities at the center of the frame, the 50% field of the frame and the frame edge, wherein the MTF line pair is set as 93 lp/mm, which is converted into the pixel size of the image source equal to 5.4 microns, wherein the frame resolution is 720P. In addition, for the sake of prudence, the invention samples 121 sampling points at the averagely distributed positions of the full frame region to perform the three-wavelength true light tracing, as shown in the imaging simulation at the retina-like element 1016 (E12) in FIGS. 12B-1, 12B-2 and 12B-3, wherein the three wavelengths are 626 nm, 520 nm and 454 nm. Each sampling point tracks 8 million light rays, and the average error of simulation is 3.8%. It is observed from the above-mentioned simulation that the global three-color resolution can be accepted, and that the maximum color difference is about 3 microns disposed on the right side of the frame of 454 nm.

Figure 13A:
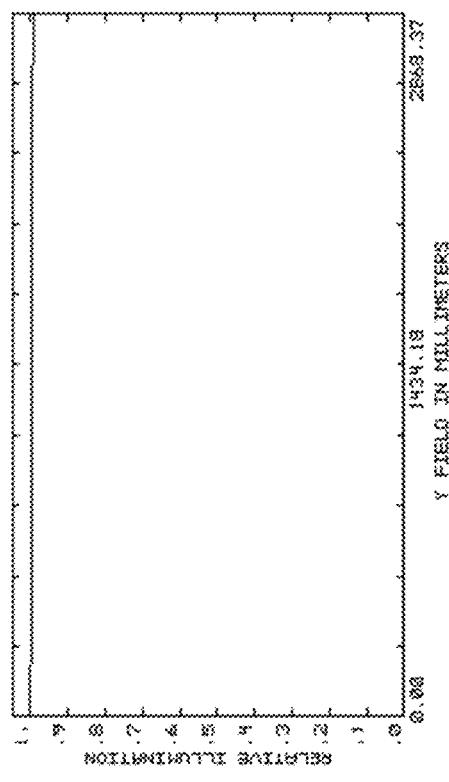
FIG. 13A is a relative illuminance map showing the field curvature virtual image display system 10000 of the embodiment of the invention in the +Y direction of the conjugate surface of the virtual image.
Figure 13C:
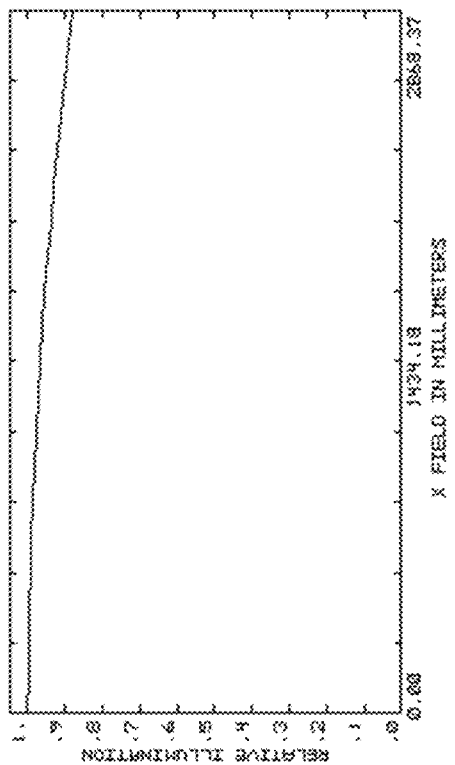
FIG. 13C is a relative illuminance map showing the field curvature virtual image display system 10000 of the embodiment of the invention in the +X direction of the conjugate surface of the virtual image.
Figure 13B:
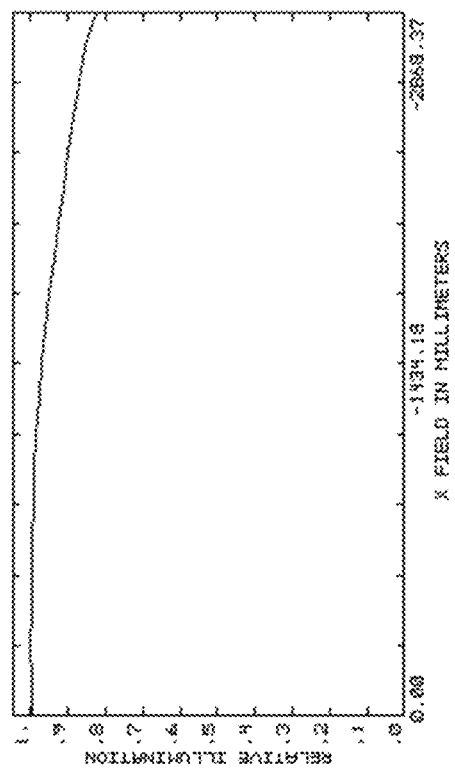
FIG. 13B is a relative illuminance map showing the field curvature virtual image display system 10000 of the embodiment of the invention in the −X direction of the conjugate surface of the virtual image.

The relative illuminations are shown in FIGS. 13A, 13B and 13C to represent the luminance descending extents of the frame from the center to the +Y, −X and +X directions, wherein the X-axis represents the sagittal direction of the frame and the Y-axis represents the meridional direction of the frame. Because +Y and −Y directions are symmetrical in this embodiment, the relative illuminance map in the −Y direction is omitted. It is observed from FIG. 13B that the frame luminance descends the most in the −X direction, but is still higher than 80% at the field of −100%. In addition, the fifth view point of the invention has mentioned the simulation of the illumination distribution of FIG. 10J at the retina-like element E12, wherein the simulation result thereof may also serve as the reference of the frame uniformity.

Figure 14A:
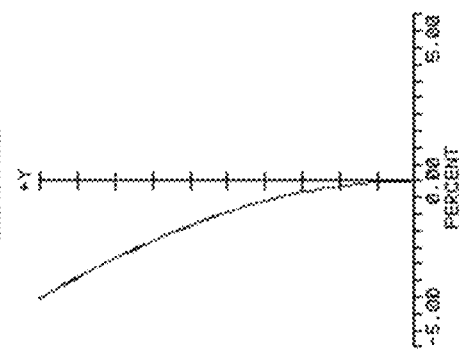
FIG. 14A shows the optical distortion of the field curvature virtual image display system 10000 of the embodiment of the invention in the +Y direction of the conjugate surface of the virtual image.
Figure 14C:
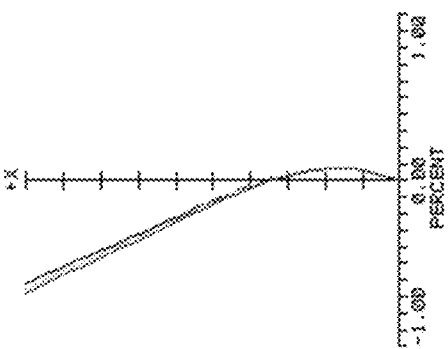
FIG. 14C shows the optical distortion of the field curvature virtual image display system 10000 of the embodiment of the invention in the +X direction of the conjugate surface of the virtual image.
Figure 14B:
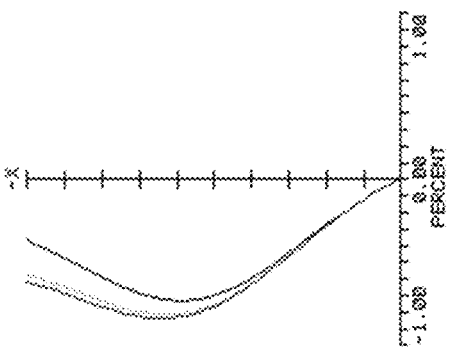
FIG. 14B shows the optical distortion of the field curvature virtual image display system 10000 of the embodiment of the invention in the −X direction of the conjugate surface of the virtual image.
Figure 14D:
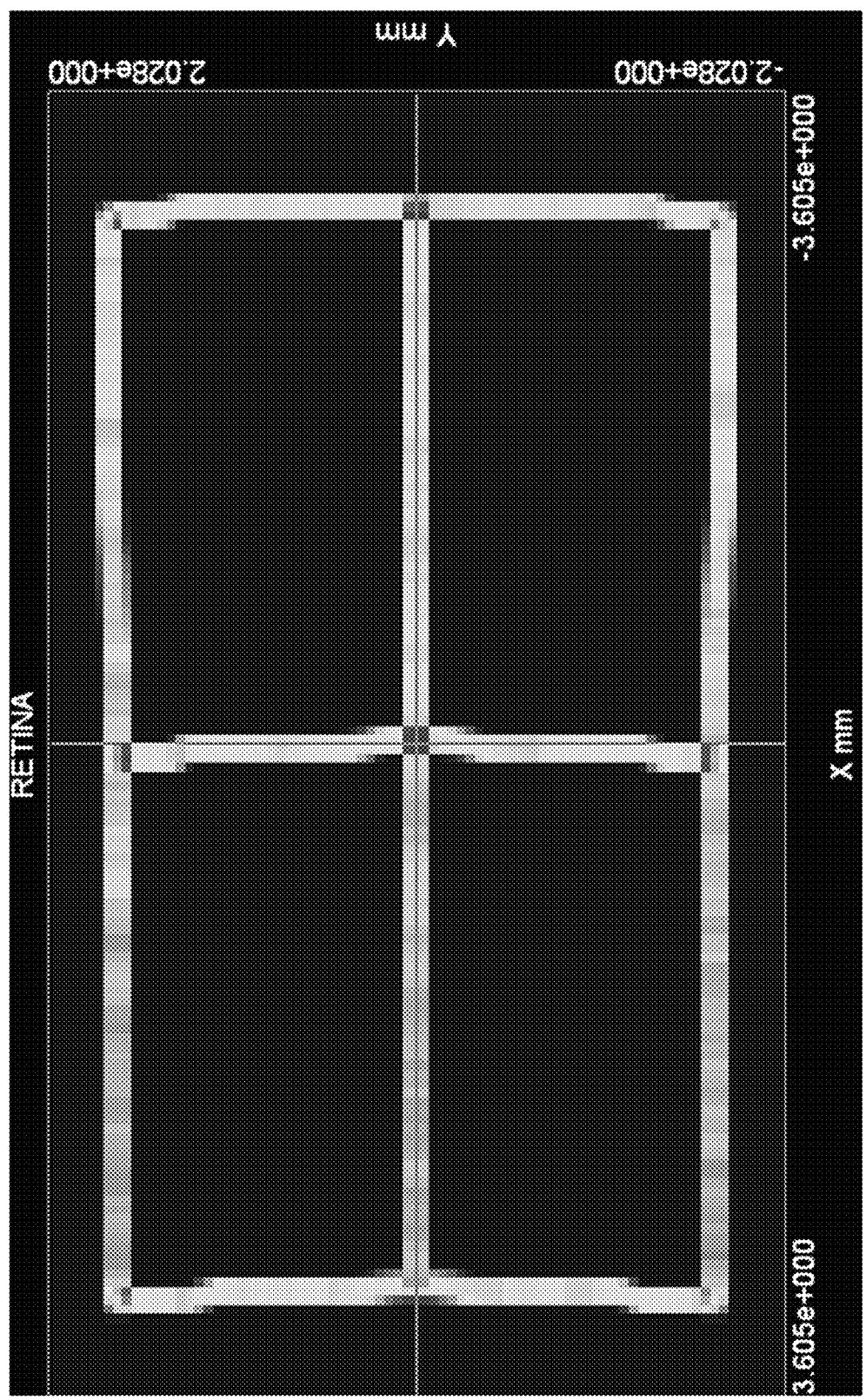
FIG. 14D is an image distortion simulation chart showing that light tracing using the wavelength of 520 nm is performed on the retina-like element after the field curvature virtual image display system 10000 of the embodiment of the invention is equipped with the eye-like optical system.

FIGS. 14A, 14B and 14C respectively representing the distortion extents of the frame from the center to the +Y, −X and +X directions, wherein the X-axis represents the sagittal direction of the frame and the Y-axis represents the meridional direction of the frame. Because the +Y and −Y directions are symmetrical, the distortion map in the −Y direction is omitted. It is observed from FIG. 14A that the frame distortion is most serious in the +Y direction, and is 3.535% at the field of 100%. In the display system, the TV distortion is more important. According to the distortion simulation of FIG. 14D at the retina-like element E12, it is obtained that the meridional TV distortion is about 1.2%, and the sagittal TV distortion is about 2.3%. According to the fifth view point of the invention, after the electronic signal of the image source is adjusted to generate an early distortion, the maximum TV distortion of the frame may be decreased to be lower than 1.2% in the condition where the consumption is about 1% quantity of all pixels.

Because all elements of the first imaging group of the invention are also coaxial with the objective plane of the image source, the production yield has the performance better than that of the prior art. Table 3 illustrates tolerance items and ranges set when the tolerance analysis of this embodiment is performed.

TABLE 3

| Tolerance type | Item | Specification |
|---|---|---|
| Centered Tolerance | Test plate fit | 3 fringes |
| | Center thickness | 0.02 mm |
| | Index of glass | 0.0005 |
| | Abbe number of glass | 0.5% |
| | Index of plastic | 0.002 |
| | Abbe number of plastic | 0.8% |
| | Irregularity | 1 fringe |

TABLE 3-continued

| Tolerance type | Item | Specification |
|---|---|---|
| Decentered Tolerance | Element Tilt | 1 arc min |
| | Element Wedge | 1 arc min |
| | Element Displacement/Roll | 0.02 mm |

Figure 15A:
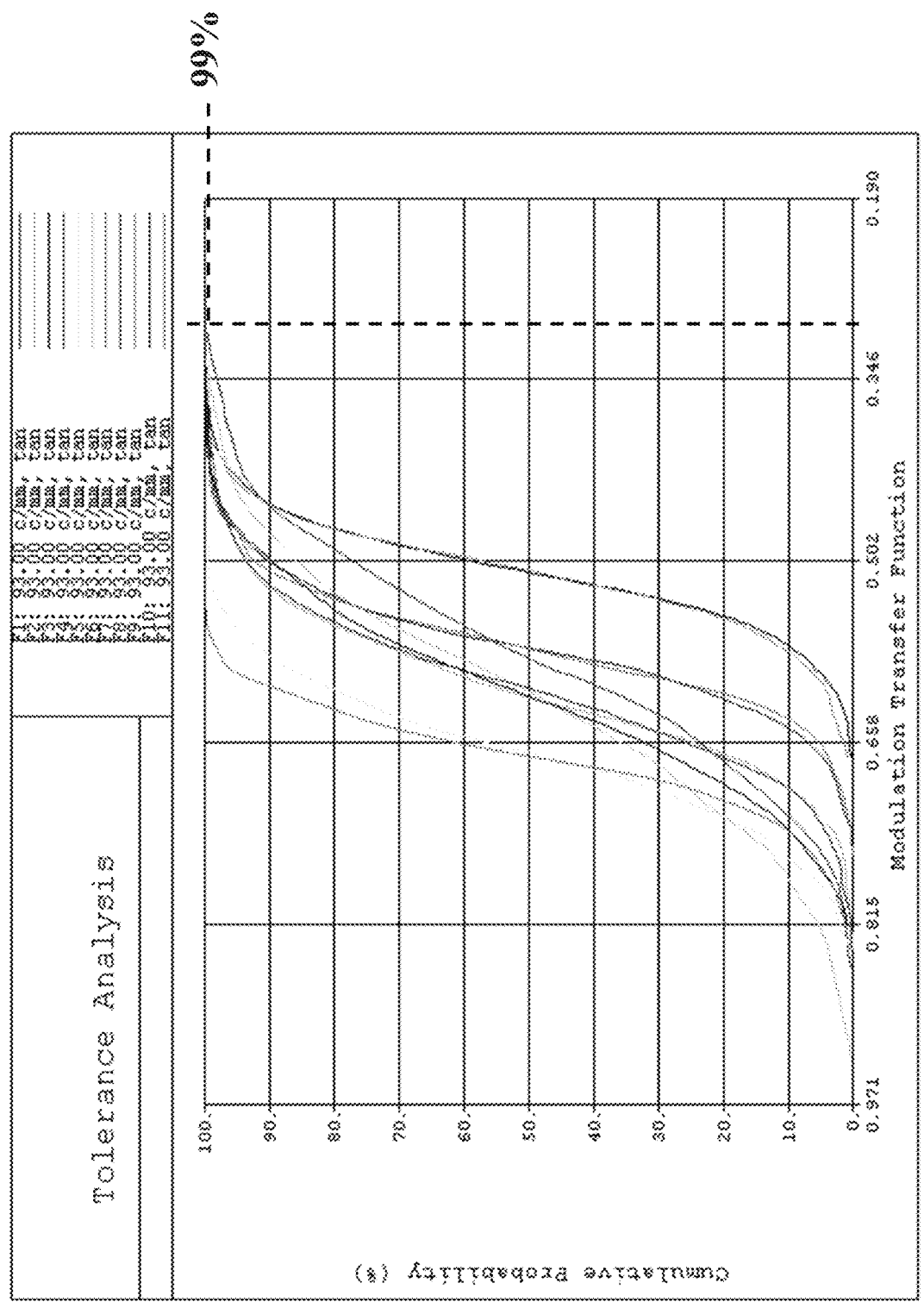
FIG. 15A is a tolerance analysis chart showing the tangential image clarity of the conjugate surface of the virtual image of the field curvature virtual image display system 10000 of the embodiment of the invention.
Figure 15B:
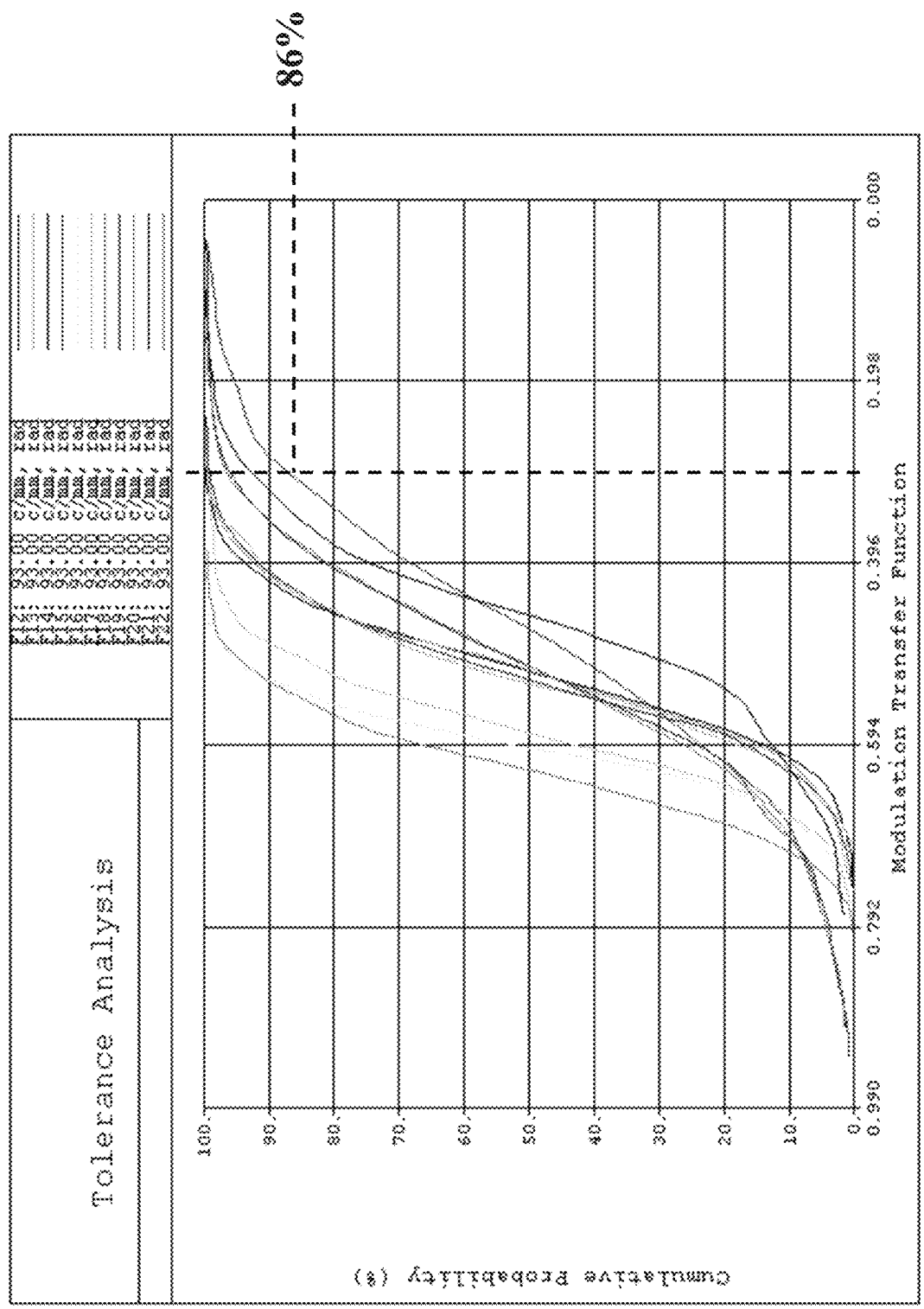
FIG. 15B is a tolerance analysis chart showing the radial image clarity of the conjugate surface of the virtual image of the field curvature virtual image display system 10000 of the embodiment of the invention.

FIGS. 15A and 15B show the relationships between the yield of the frame image clarity of the system and MTF, wherein the ordinate represents the yield, and the abscissa represents the MTF. FIG. 15A illustrates that the tangential image quality yield is about 99% based on the MTF of 30% functioning as the image clarity distinction between good and bad when the effective pupil diameter of the human eye of this embodiment reaches 4 mm. FIG. 15B illustrates that the radial image quality yield is about 86% based on the MTF of 30% functioning as the image clarity distinction between good and bad when the effective pupil diameter of the human eye of this embodiment reaches 4 mm.

The illumination system significantly affects the projection system efficiency, wherein the efficiency simulation of the illumination system may be the evidence when this embodiment works with the digital micromirror device. The parameters and the detailed layouts of the elements from the LED light source to the digital micromirror device are listed in Table 4.

TABLE 4

| Element | Surface | Optical Parameter | | Position/Direction | | Glass |
|---|---|---|---|---|---|---|
| LED | A0 | Radius | Infinity | Thickness | −0.245 | |
| LED CG | A1 | Radius | Infinity | Thickness | −0.35 | B270 |
| LED CG | A2 | Radius | Infinity | Thickness | −0.663902 | |
| C1 | A3 | Radius | Infinity | Thickness | −3.189904 | N-F2 |
| C1 | A4 | Radius | 4.999083 | Thickness | −1.587538 | |
| C2 | A5 | Radius | 70.247413 | Thickness | −4.36922 | POLYCARB |
| C2 | A6 | Radius | 5.105161 | Thickness | −2.657954 | |
| | (Conic) | k | −0.992737 | | | |
| Lens Array | A7 | Radius | −2.264358 | Thickness | −6.567838 | E48R |
| Lens Array | A8 | Radius | 2.264358 | Thickness | −1 | |
| C3 | A9 | Radius | −32.891478 | Thickness | −2.853538 | N-BK7 |
| C3 | A10 | Radius | 70.010263 | Thickness | −19.143323 | |
| | | | | Tilt about Y | 36.999998 | |
| | | | | Tilt about Y | 17.82637 | |
| M1 | A11 | Radius | Infinity | Tilt about Y | −17.82637 | Mirror |
| | | | | Tilt about Y | 90 | |
| | | | | Thickness | 3.556712 | |
| | | | | Decenter X | −4.846488 | |
| | | | | Tilt about Y | −45 | |
| | | | | Decenter X | 3.723308 | |
| | | | | Tilt about Y | 4.313576 | |
| C4 | A12 | Radius | 11.262646 | Thickness | 3.834454 | POLYCARB |
| | (Conic) | k | −3.581919 | | | |
| C4 | A13 | Radius | Infinity | Thickness | 1.3 | |
| | | | | Tilt about Y | −4.313576 | |
| | | | | Decenter X | −3.723308 | |
| Prism | 20 | Radius | Infinity | Tilt about Y | 45 | N-PK51 |
| | | | | Thickness | 8 | |
| Prism | 21 | Radius | Infinity | Thickness | 1 | |
| CG | 22 | Radius | Infinity | Thickness | 0.65 | B270 |
| CG | 23 | Radius | Infinity | Thickness | 0.3 | |
| Object | 24 | Radius | Infinity | Thickness | | |

In the above-mentioned example, three colors of LEDs function as the light source and comprise the red light LED with the wavelength of 626 nm, the green light LED with the wavelength of 520 nm and the blue light LED with the wavelength of 454 nm. The light-emitting surfaces of the three LEDs must commonly pertain to the plane with the area range of 1.609 mm×1.094 mm, that is, the three LEDs pertain to the same package. The efficiency simulation results are listed in Table 5.

TABLE 5

| DMD | |
|---|---|
| Source (lm) | 1.0000 |
| Geometric eff. | 0.2657 |
| C1 | 0.9900 |
| C2 | 0.9700 |
| LA | 0.9700 |
| C3 | 0.9900 |
| C4 | 0.9700 |
| Panel | 0.7350 |
| Prism | 0.9801 |
| L1-L8 | 0.8948 |
| Combiner | 0.0400 |
| Retina (lm) | 0.0061 |
| Image area on Retina (m²) | 5.0758E−06 |
| Eye solid angle (cd) | 0.1364 |
| Retina (Nitt) | 8853.0212 |

The retina-like element 1016 (E12) may obtain 26.57% of geometric optical efficiency. In addition, it is necessary to consider different extents of luminous flux attenuation (see Table 3) inevitably occur when the light actually travels to encounter various interfaces. Thus, when the total output luminous flux of the light source composed of the three colors of LEDs is 1 lumen, and the reflective surface of the image combiner has the reflectivity of about 4%, the luminous flux finally reaching the retina-like element E12 is 0.0061 lumens, wherein the reflectivity of the reflective surface of the image combiner of about 4% is the reflectivity generated by the material interface of the image combiner. If reflectivity needs to be increased or decreased, the optical coating can be done. As shown in FIG. 10H, the real image imaging system composed of the eye-like optical system 1015 and this embodiment has a magnification power, so the real image area on the retina-like element 1016 (E12) may be determined according the magnification power and the size of the image source. In addition, the solid angle of the light beam imaged on the retina-like element 1016 (E12) may be determined according to the dimension of the entrance pupil and the effective focal length of the eye-like optical system 1015. The luminance is defined as $L \equiv \phi/(A \cdot \Omega)$, where L=luminance, $\phi$=luminous flux, A=light distribution area, $\Omega$=solid angle. It is obtained that the retina-like element 1016 (E12) can see the virtual image with the luminance of about 8853 nits. When the eye-like optical system 1015 is replaced with the real human eye, the same luminance may also be observed. In this manner, the luminance values of the virtual image can be derived and listed in Table 6 when this embodiment works with various image sources and the illumination systems thereof.

TABLE 6

| Image source type | Light source (1 lm) | L (nit) |
|---|---|---|
| DMD | 3 color LEDs in 1 package | 8853.0212 |
| LCOS | 3 color LEDs in 1 package | 3884.4562 |
| LCD | Backlight | 243.4651 |

TABLE 6-continued

| Image source type | Light source (1 lm) | L (nit) |
|---|---|---|
| OLED | Self-emitting | 1485.1398 |
| mLED | Self-emitting | 1485.1398 |

As listed in Table 6, it is obtained that various types of image sources correspond to different light sources. In the condition where the light source outputs the constant luminous flux of 1 lumen, the luminance of the virtual image may have several times to several tens of times of differences. Although the system working with the digital micromirror device and liquid crystal on silicon has the larger volume, the light utilization efficiency thereof is relatively higher, wherein the system working with the liquid crystal on silicon needs to use the polarized light, the efficiency consumption of more than 50% is caused. Although no mounted illumination system is needed in the liquid crystal display or the organic light emitting diode and the micro light emitting diode array with the self-emissive property and the volume is smaller, the too wide light-emitting angle causes the relatively lower light utilization efficiency. The liquid crystal display adopting the backlight module shows the lowest luminance because the panel efficiency is not high. Thus, the invention can make the user observe the frame having the luminance of 8853 nits and the sagittal field angle approaching 30° when the highest efficiency is reached, the three colors of LED light sources have the total output of 1 lumen and the reflective surface of the image combiner has no coating. It is worth mentioning that the LED television wall used in the daytime has the luminance specification greater than 5000 nits.

What is claimed is:

1. A field curvature virtual image display system applicable to a projection lens set, the field curvature virtual image display system comprising:
    an image source disposed in a partial region of an objective plane of the projection lens set;
    a first imaging group having a front lens group and a back lens group; and
    a second imaging group having a partial reflection and partial transmission surface and an antireflection surface and functioning as an image combiner in the system;
    wherein the objective plane and the first imaging group are coaxial with a first optical axis of the system; the second imaging group is coaxial with a second optical axis of the system; the objective plane forms a real image surface having a concave type field curvature through the first imaging group; the real image surface forms a virtual image surface having a concave type field curvature through the second imaging group; the image source is disposed in a partial region of the objective plane so that a partial region of the virtual image surface can be displayed; an objective offset is present between a center of a partial region where the image source is disposed and a center of the objective plane, so that a displayable region of the virtual image surface and a center of the virtual image surface concurrently generate an image offset; an included angle is formed between an optical axis of a virtual image occurred in the system and the first optical axis according to a field curvature property of the virtual image surface and the image offset of the displayable region of the virtual image surface; and the properties make the system display a correct frame, and concurrently prevent an interference between the projection lens set and a head tissue when an optical axis of one human eye is coaxial with the optical axis of the virtual image; and wherein the first imaging group comprises:

the front lens group, a pupil and the back lens group;

wherein the image source and the front lens group are disposed on a first side relative to the pupil; the back lens group and the second imaging group are disposed on a second side relative to the pupil; and the image source and the front lens group are disposed in front of the pupil, and the back lens group and the second imaging group are disposed behind the pupil based on a light travelling direction;

wherein a center of a valid region of each of optical elements of the first imaging group exclusive of the pupil has an offset; an offset direction of the valid region of the optical element in front of the pupil is the same as an offset direction of the image source, and the offset of the valid region of the element further from the pupil is larger; the offset direction of the valid region of the optical element disposed behind the pupil is reverse to the offset direction of the image source, and the offset of the valid region of the element further from the pupil is larger; and the invalid region of the element caused by the offset of the valid region of the element may be cut off to prevent interference and reduce a volume and a weight.

2. The field curvature virtual image display system according to claim 1, wherein the partial reflection and partial transmission surface optimizes an image quality by translating and rotating the second optical axis.

3. The field curvature virtual image display system according to claim 1, wherein when the projection lens set has a back focus prism (set) with a sufficient thickness, the projection lens set can accommodate illumination systems of reflective, transmissive and self-emissive image sources.

4. The field curvature virtual image display system according to claim 3, wherein the system can carry a digital micromirror device (DMD) and an illumination system of the DMD, a liquid crystal on silicon (LCOS) and an illumination system of the LCOS, a liquid crystal display (LCD) and an illumination system of the LCD, an organic light emitting diode or a micro light emitting diode array.

5. The field curvature virtual image display system according to claim 1, wherein when the frame has a moon shape distortion with a curved line, an electronic signal of the image source can be adjusted to generate an early distortion to improve a sagittal moon shape distortion or a meridional moon shape distortion.

6. The field curvature virtual image display system according to claim 5, characterized in that a method of adjusting the electronic signal of the image source is to control a radius of curvature of a longitudinal line at a middle of the frame to be infinity to adjust the sagittal moon shape distortion; or to control a radius of curvature of a transversal line at the middle of the frame to be infinity to adjust the meridional moon shape distortion.

7. The field curvature virtual image display system according to claim 1, wherein the second imaging group comprises:

a partial reflection and partial transmission surface and an antireflection surface;

wherein a shape of the antireflection surface coordinates with a shape of the partial reflection and partial transmission surface to make the second imaging group have or have no diopter for a person with healthy eyesight, a myopic person and a hyperopic person to observe an external environment.

* * * * *